(12) United States Patent
Reznik et al.

(10) Patent No.: US 11,153,582 B2
(45) Date of Patent: Oct. 19, 2021

(54) OPTIMAL MULTI-CODEC ABR LADDER DESIGN

(71) Applicant: Brightcove Inc., Boston, MA (US)

(72) Inventors: Yuriy Reznik, Seattle, WA (US);
Xiangbo Li, Scottsdale, AZ (US);
Justin Greer, Waunakee, WI (US);
Abhijith Jagannath, Seattle, WA (US);
Karl O. Lillevold, Seattle, WA (US)

(73) Assignee: BRIGHTCOVE INC., Boston, MA (US)

( * ) Notice: Subject to any disclaimer, the term of this patent is extended or adjusted under 35 U.S.C. 154(b) by 0 days.

(21) Appl. No.: 16/746,641

(22) Filed: Jan. 17, 2020

(65) Prior Publication Data

US 2020/0236372 A1     Jul. 23, 2020

Related U.S. Application Data

(60) Provisional application No. 62/793,577, filed on Jan. 17, 2019.

(51) Int. Cl.
*H04N 19/00* (2014.01)
*H04N 19/36* (2014.01)
(Continued)

(52) U.S. Cl.
CPC ............ *H04N 19/36* (2014.11); *H04N 19/12* (2014.11); *H04N 19/124* (2014.11); *H04N 19/147* (2014.11); *H04N 19/152* (2014.11); *H04N 19/154* (2014.11); *H04N 19/162* (2014.11); *H04N 19/172* (2014.11); *H04N 19/184* (2014.11); *H04N 19/196* (2014.11); *H04N 19/197* (2014.11); *H04N 19/198* (2014.11); *H04N 19/61* (2014.11); *H04N 19/85* (2014.11)

(58) Field of Classification Search
None
See application file for complete search history.

(56) References Cited

U.S. PATENT DOCUMENTS 5,506,844 A * 4/1996 Rao .................. H04J 3/1688
370/468
6,188,792 B1 * 2/2001 Chujoh ............. H04N 19/176
375/E7.027

(Continued)

FOREIGN PATENT DOCUMENTS

CA          2395605 C      6/2001

OTHER PUBLICATIONS

Ozer et al. Apple Got It Wrong: Encoding Specs for HEVC in HLS, Nov. 21, 2017.*

(Continued)

*Primary Examiner* — Frank F Huang
(74) *Attorney, Agent, or Firm* — Kilpatrick Townsend & Stockton LLP

(57) ABSTRACT

Techniques are disclosed for the creation of multi-codec encoding profiles (or encoding ladders), which define quality and bitrate for each of the streams made available to clients for streaming a video. In particular, optimization techniques may take into account a quality rate function of each of the codecs when determining the encoding ladder. Additional considerations may include a network bandwidth distribution and/or a distribution of client types.

21 Claims, 17 Drawing Sheets

(51) Int. Cl.
| | |
|---|---|
| H04N 19/154 | (2014.01) |
| H04N 19/12 | (2014.01) |
| H04N 19/184 | (2014.01) |
| H04N 19/61 | (2014.01) |
| H04N 19/196 | (2014.01) |
| H04N 19/172 | (2014.01) |
| H04N 19/162 | (2014.01) |
| H04N 19/152 | (2014.01) |
| H04N 19/147 | (2014.01) |
| H04N 19/124 | (2014.01) |
| H04N 19/85 | (2014.01) |

(56) References Cited

U.S. PATENT DOCUMENTS

| | | | | |
|---|---|---|---|---|
| 7,352,809 | B2* | 4/2008 | Wenger | H04N 7/152 348/14.1 |
| 7,720,157 | B2* | 5/2010 | Lia | H04N 7/152 375/240.24 |
| 9,591,316 | B2* | 3/2017 | Bar Bracha | H04N 19/152 |
| 9,894,130 | B2* | 2/2018 | Hassan | H04N 21/23418 |
| 10,178,140 | B2* | 1/2019 | Reznik | H04L 65/602 |
| 2003/0112333 | A1* | 6/2003 | Chen | H04N 19/60 348/192 |
| 2003/0219070 | A1* | 11/2003 | Turaga | H04N 17/004 375/240.03 |
| 2010/0040137 | A1* | 2/2010 | Chiang | H04N 19/115 375/240.02 |
| 2011/0142124 | A1* | 6/2011 | Huang | H04N 19/61 375/240.02 |
| 2013/0268961 | A1* | 10/2013 | Miles | H04N 21/2402 725/32 |
| 2013/0286868 | A1* | 10/2013 | Oyman | H04W 36/38 370/252 |
| 2013/0322521 | A1* | 12/2013 | Jang | H04N 19/36 375/240.02 |
| 2014/0328382 | A1* | 11/2014 | Lee | H04N 19/164 375/240.01 |
| 2016/0219248 | A1 | 7/2016 | Reznik et al. | |
| 2017/0195674 | A1* | 7/2017 | Kim | H04N 19/115 |
| 2018/0160161 | A1* | 6/2018 | Reznik | H04N 21/8456 |
| 2019/0019316 | A1* | 1/2019 | Govindasamy | G06T 15/005 |
| 2019/0171893 | A1* | 6/2019 | Gupta | A61B 5/7264 |
| 2019/0281302 | A1* | 9/2019 | Zhang | H04N 19/176 |

OTHER PUBLICATIONS

Aaron, et al., "Per-title encode optimization," https://medium.com/netflix-techblog/per-title-encode-optimization-7e99442b62a2, Dec. 15, 2015, 14 pages, Netflix technology blog.

Apple Inc., "HLS authoring specification for Apple devices," https://developer.apple.com/documentation/http_live_streaming/hls_authoring_specification_for_apple_devices, 16 pages, Sep. 2018.

Conklin, et al., "Video coding for streaming media delivery on the internet," IEEE Transactions on Circuits and Systems for Video Technology, vol. 11, No. 3, pp. 269-281, Mar. 2001.

Girod, et al., "Advances in channel-adaptive video streaming," Wireless Communications and Mobile Computing, vol. 2, No. 6, pp. 573-584, Sep. 2002.

Hesse; Stephan, "Design of scheduling and rate-adaptation algorithms for adaptive HTTP streaming", In Proc. SPIE 8856, Applications of Digital Image Processing XXXVI, 88560M, 2013, 9 pages, downloaded from https://spiedigitallibrary.org/conference-proceedings-of-spie on Sep. 25, 2017.

ISO/IEC 14496-10:2003, "Information technology—Coding of audio-visual objects—Part 10: Advanced Video Coding," Dec. 2003, Retrieved from: https://www.iso.org/standard/37729.html on Jan. 8, 2020, 3 pages.

ISO/IEC 23008-2:2013, "Information technology—High efficiency coding and media delivery in heterogeneous environments—Part 2: High efficiency video coding," Dec. 2013. Retrieved from: https://www.iso.org/standard/35424.html Jan. 8, 2020, 3 pages.

ISO/IEC 23009-1:2012, "Information technology—Dynamic adaptive streaming over HTTP (DASH)—Part 1: Media presentation description and segment formats," Feb. 2012. Retrieved from: https://www.iso.org/obp/ui/#iso:std:iso-iec:23009:-1:ed-3:v1:en, Jan. 8, 2020.

Karlsson, et al., "Initial field performance measurements of LTE," Ericsson review, vol. 3, 2008, 7 pages.

Reznik, et al., "Optimal design of encoding profiles for ABR streaming," in Proceedings of the 23rd Packet Video Workshop, New York, NY, USA, 2018, PV '18, pp. 43-47, ACM.

Reznik; Yuriy, "Optimal multi-codec ABR ladder design", Brightcove research note, Mar. 10, 2018, 5 pages.

Russell; Gabe, "Context Aware Encoding Improves Video Quality While Cutting Costs", https://www.brightcove.com/en/blog/2017/05/context-aware-encoding-improves-video-quality-while-cutting-costs, Brightcove blog, May 22, 2017, 7 pages.

Wang, et al., "Video quality assessment based on structural distortion measurement," Signal Processing: Image Communication, vol. 19, No. 2, pp. 121-132, 2004.

Wu, et al., "Streaming video over the internet: approaches and directions," IEEE Transactions on Circuits and Systems for Video Technology, vol. 11, No. 3, pp. 282-300, Mar. 2001.

"X264 open source encoder project", https://www.videolan.org/developers/x264.html, 5 pages, retrieved Jan. 8, 2020.

"X265 open source encoder project", https://www.x265.org/, 3 pages. retrieved Jan. 8, 2020.

YUV video sequences, https://media.xiph.org/video/derf/, 19 pages, retrieved Jan. 8, 2020.

International Search Report and Written Opinion for PCT/US2020/014169 dated Apr. 2, 2020, all pages.

DASH-IF, "Guidelines for Implementation: DASH-IF Interoperability Points", version 4.0, Dec. 2016, https://dash-industry-forum.github.io/docs/DASH-IF-IOP-v4.0-clean.pdf, 168 pages.

Nocedal, et al., Numerical Optimization, Springer-Verlag, New York, NY, USA, 2006, 183 pages.

Ultra HD Forum, "Ultra HD Forum phase B guidelines," https://ultrahdforum.org/wp-content/uploads/Ultra-HD-Forum-Phase-B-Guidelines-v1.0.pdf, Apr. 2018, 78 pages.

\* cited by examiner

OPTIMAL MULTI-CODEC ABR LADDER DESIGN

CROSS-REFERENCES TO RELATED APPLICATIONS

This application claims the benefit of U.S. Provisional Application No. 62/793,577, filed Jan. 17, 2019, entitled "Optimal Multi-Codec ABR Ladder Design," which is assigned to the assignee hereof and incorporated by reference herein in its entirety.

BACKGROUND

Adaptive Bit Rate (ABR) streaming is a method of streaming video content in which a bitrate of the video stream provided to a streaming client can be adjusted during playback to accommodate changes in available network bandwidth. To enable this functionality, an ABR streaming system may encode source content into multiple streams of different bitrates. This way, the streaming client can switch between different streams while streaming the video, effectively receiving a composite stream that adjusts to available network bandwidth.

The composition of streams into which the source content is encoded may be determined by the ABR streaming system. In traditional ABR streaming systems, this determination is typically made independently for each codec. In other words, for each codec, a whole new set of streams is produced, covering the range of bitrates as needed for adaptation to networks. This results in much higher encoding and delivery costs. However, because many streaming clients are now capable of switching between streams of different codecs, such inefficiencies can be minimized by finding optimal multi-codec composition of streams sufficient for ABR delivery.

BRIEF SUMMARY

Techniques described herein provide for the creation of multi-codec encoding profiles (or encoding ladders) which define quality and bitrate for each of the streams made available to clients for streaming a video. In particular, optimization techniques may take into account a quality-rate function of each of the codecs when determining the encoding ladder. Additional considerations may include a network bandwidth distribution and/or a distribution of client types.

An example method for creating a multi-codec encoding ladder, according to this description, comprises obtaining, by a computer system, source content comprising a video, and generating an encoding ladder for the source content each video stream of a plurality of video streams defined by the encoding ladder includes a respective bitrate and a respective codec of a plurality of codecs for encoding the source content. The encoding ladder includes a first video stream and a second video stream of a first codec, wherein the first video stream and the second video stream have respective bitrates of $R_1^1$ and $R_1^2$ and respective quality values of $Q_1^1$ and $Q_1^2$, and a third video stream of a second codec having a bitrate of $R_2^1$ and a quality value of $Q_2^1$, such that $R_1^1 < R_2^1 < R_1^2$ and $Q_1^1 < Q_2^1 < Q_1^2$.

An example computer system for creating a multi-codec encoding ladder, according to this description, comprises a memory and one or more processing units communicatively coupled with the memory. The one or more processing units are configured to obtain source content comprising a video and generate an encoding ladder for the source content, such that each video stream of a plurality of video streams defined by the encoding ladder includes a respective bitrate and a respective codec of a plurality of codecs for encoding the source content, and such that the encoding ladder includes a first video stream and a second video stream of a first codec, wherein the first video stream and the second video stream have respective bitrates of $R_1^1$ and $R_1^2$ and respective quality values of $Q_1^1$ and $Q_1^2$, and a third video stream of a second codec having a bitrate of $R_2^1$ and a quality value of $Q_2^1$, where $R_1^1 < R_2^1 < R_1^2$ and $Q_1^1 < Q_2^1 < Q_1^2$.

An example non-transitory computer-readable medium, according to this description, has instructions stored therewith for creating a multi-codec encoding ladder. The instructions, when executed by one or more processing units, cause the one or more processing units to obtain source content comprising a video, and generate an encoding ladder for the source content, such that each video stream of a plurality of video streams defined by the encoding ladder includes a respective bitrate and a respective codec of a plurality of codecs for encoding the source content, and the encoding ladder includes a first video stream and a second video stream of a first codec, wherein the first video stream and the second video stream have respective bitrates of $R_1^1$ and $R_1^2$ and respective quality values of $Q_1^1$ and $Q_1^2$ and a third video stream of a second codec having a bitrate of $R_2^1$ and a quality value of $Q_2^1$, such that $R_1^1 < R_2^1 < R_1^2$ and $Q_1^1 < Q_2^1 < Q_1^2$.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Figure 1:
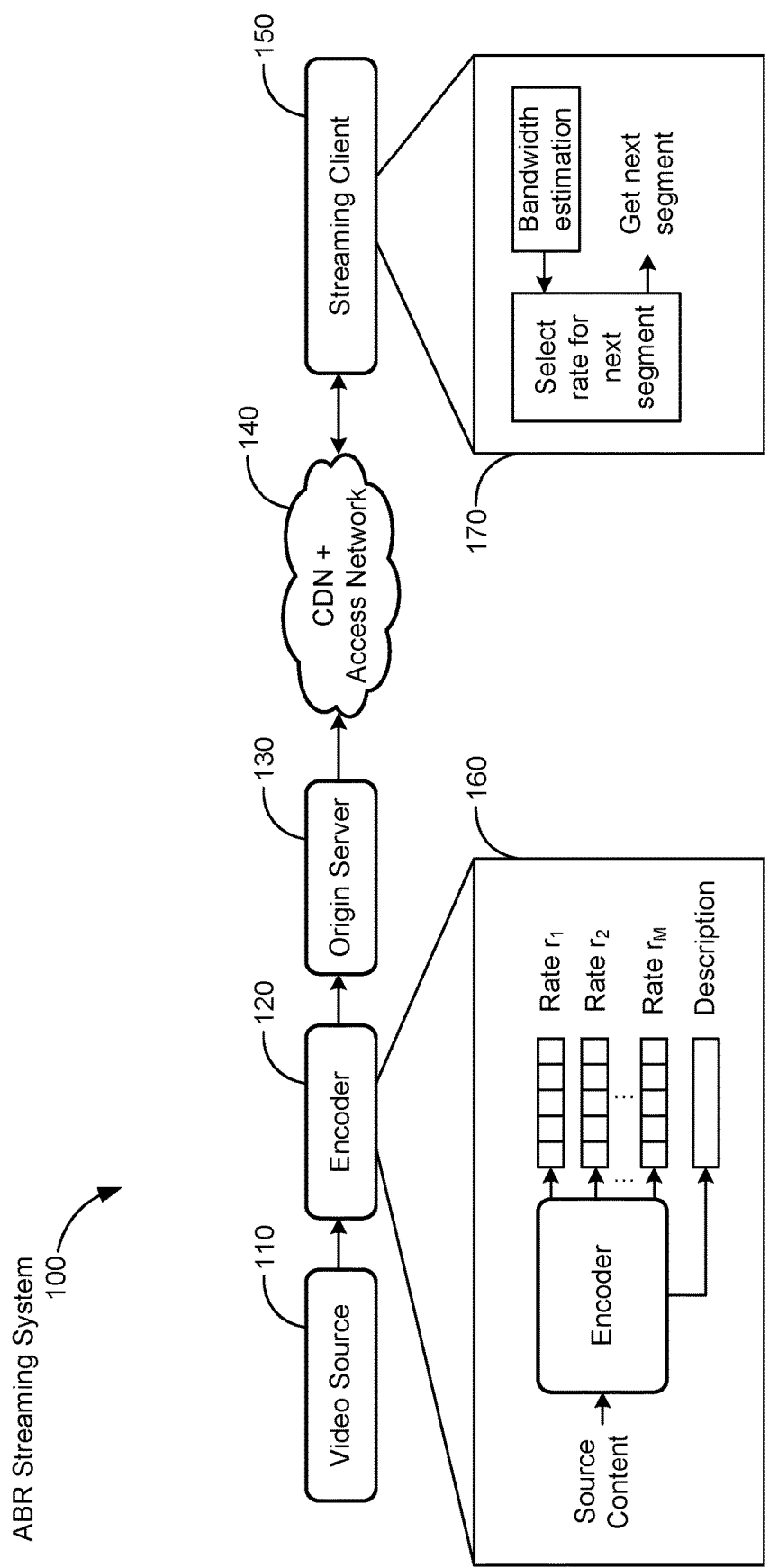
FIG. 1 is an ABR streaming system, according to an embodiment.

FIG. 1 is an ABR streaming system 100, according to an embodiment. The ABR streaming system 100 comprises a video source 110, encoder 120, origin server 130, Content Delivery Network (CDN)+network access 140, and a streaming client 150. As a person of ordinary skill in the art will appreciate, different embodiments can have different numbers of each of the components illustrated. For example, CDN+network access can service many streaming clients 150 (e.g., dozens, hundreds, thousands, or more).

To enable source content (e.g., one or more media files) stored at a video source 110 to be distributed to one or more streaming clients 150, the encoder 120 can encode the source content into multiple streams having different bitrates. (As shown in callout 160, for example, the encoder may encode the source content to provide M bitrates and a separate description.) Each encoded stream can incorporate random access points (e.g. intraframe (I)-frames or Instantaneous Decoder Refresh (IDR)-frames in encoded video), allowing switching between the streams. Such streams are subsequently placed on the origin server 130, and further pushed to the CDN+network access 140 (which may not only include the CDN, but also one or more data communication networks, such as the Internet) for scaling delivery to streaming clients 150.

During the playback, each streaming client 150 can monitor the rate at which encoded content is arriving. (As shown in callout 170, for example, the streaming client can estimate bandwidth, then select the appropriate rate for the next segment, in view of the bandwidth, before getting the next segment.) If such rate becomes insufficient for continuous playback, the client switches to a lower bitrate stream. This can prevent buffering. On the other hand, if such rate is greater than the bitrate of the current stream, the client may switch to a higher bitrate stream, delivering better quality to the end user. Such switching mechanism has since become widely adopted and is incorporated in all modern streaming protocols, such as HyperText Transfer Protocol (HTTP) Live Streaming (HLS), MPEG Dynamic Adaptive Streaming over HTTP (DASH), and more.

Figure 2:
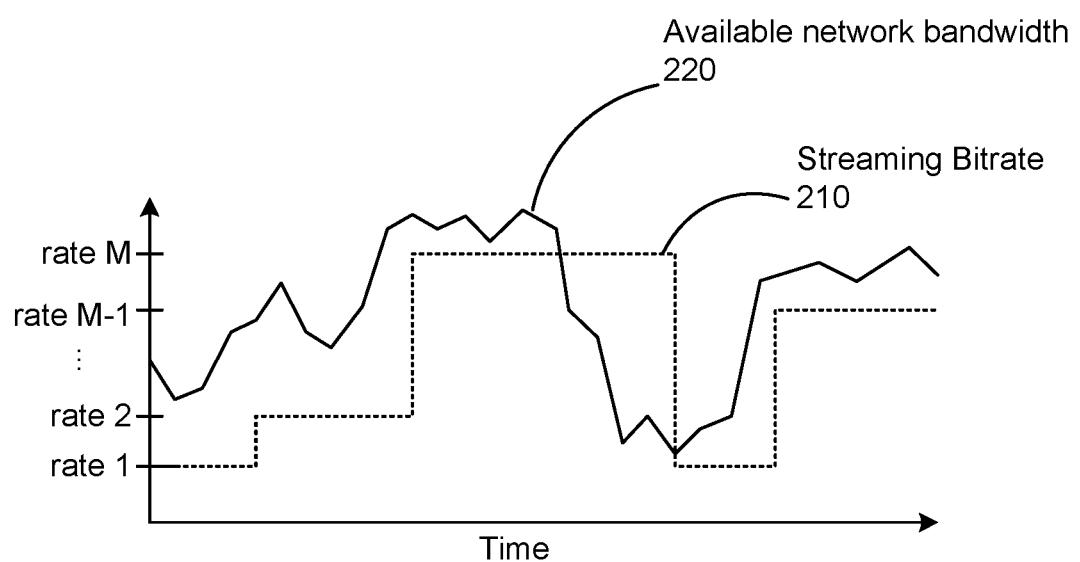
FIG. 2 is a graph plotting available network bandwidth and streaming rate of a client.

The resulting streaming bitrate of video to the streaming client 150 therefore adapts to changes in available network bandwidth over time. As illustrated by the graph in FIG. 2, for example, the streaming bitrate 210 can increase when available network bandwidth 220 increases and similarly decrease once the available network bandwidth 220 decreases. These changes in the streaming bitrate 210 are due to the streaming client 150 switching from a stream having a first bitrate to a stream having a second bitrate. Thus, the more streams (of different bitrates) created by an encoder 120 for a given source content, the more fine-tuned the changes in the streaming bitrates 210 can be.

The composition of characteristics of video streams used for ABR streaming, such as their bitrates, resolutions, codec constraints, etc. is commonly called an encoding profile or ladder. Example encoding ladders for High Efficiency Video Coding (HEVC) and H.264/MPEG-4 AVC (or simply "H.264") codecs can be found in Table 1 below, which is found in the Apple® HLS deployment guidelines.

TABLE 1

| H.264 and HEVC encoding ladders. | | | |
| --- | --- | --- | --- |
| HEVC/H.265 | H.264.AVC | Resolution | Frame rate |
| 145 | 145 | 416 × 234 | ≤30 fps |
| 350 | 365 | 480 × 270 | ≤30 fps |
| 660 | 730 | 640 × 360 | ≤30 fps |
| 990 | 1100 | 768 × 432 | ≤30 fps |
| 1700 | 2000 | 960 × 540 | Same as source |
| 2400 | 3000 | 1280 × 720 | Same as source |
| 3200 | 4500 | Same as source | Same as source |
| 4500 | 6000 | Same as source | Same as source |
| 5800 | 7800 | Same as source | Same as source |

In recent years, it was also discovered that the performance of ABR streaming systems 100 can be improved by using dynamic ladder generators, which create custom encoding ladders in consideration of rate-distortion characteristics of the content and/or properties of networks used for delivery of streams. Such approaches have become known as "per-title", "content-aware encoding", and "context-aware encoding" techniques. Additional information regarding ladder generators for ABR streaming can be found in U.S. patent application Ser. No. 15/829,723 entitled "Optimization of Encoding Profiles for Media Streaming," (referred to herein as "the '723 application") which is hereby incorporated by reference in its entirety for all purposes.

Until fairly recently, encoding ladders for ABR streaming would have only one codec. (Most often, the codec would be H.264, which was ubiquitous and supported by most existing devices over the last decade.) However, with the introduction of more codecs, such as VP9, HEVC, and AV1, ABR streaming systems 100 typically have to re-encode source content entirely for every additional supported codec, producing a new ABR ladder with all streams encoded using the new codec to help ensure the content can be streamed to different devices supporting different codecs. Current versions of streaming guidelines (HLS guidelines and DASH-IF implementation guidelines, for example), define one ladder (a set of streams having certain bitrates and resolutions) for H.264, and another for HEVC.

As described earlier, the deployment of multiple codecs for ABR streaming is currently done based on the assumption that each codec has a separate ABR encoding ladder and a corresponding separate set of streams. ABR streaming system 100, therefore, would generate an encoding ladder for H.264 separate from the encoding ladder for HEVC.

Problematically, however, the use of such single-codec encoding ladders is fundamentally sub-optimal, for at least the following three reasons.

First, with separate ladder generation there may be no means for finding proper balance between number of renditions to be allocated to ABR encoding ladders associated with each codec. An encoder 120 may therefore produce as many renditions as deemed necessary for each codec, without consideration of the fact that the usage of such codecs across a population of viewers can be different. For example, the number of streaming clients 150 supporting HEVC-encoded video may be much smaller than the number of streaming clients 150 supporting H.264. And in ABR streaming systems 100 in which a certain total budget is provided for the number of renditions that can be produced, allocating more to H.264 may have a more significant overall effect on the total quality delivered to end users.

Second, based on characteristics of the content, the coding gains of HEVC vs H.264 can vary significantly. In turn, this can impact the balance of how many renditions for each codec should be used. For example, in one extreme scenario, when HEVC does not deliver any gains, the optimal ABR ladder design may not allocate any renditions to HEVC because all HEVC-capable streaming clients 150, can also decode H.264. Thus switching to H.264 would not reduce reach of the system.

Third, many new streaming clients 150 are capable of switching between streams having both H.264 and HEVC codecs. Given this switching capability, it is highly likely that such client should be able to achieve better performance than clients that select only H.264 or HEVC streams, because more streams are available. (Again, as noted in regard to FIG. 2, if more streams are available, the streaming bitrate 210 could use more fine-tuned steps to adjust to changes in the available network bandwidth 220. This higher granularity can make the ABR streaming system 100 more efficient.)

The embodiments described herein provide an optimized solution for ABR profile/ladder generation for multiple codec ladders. That is, the techniques provided describe an optimal multi-codec ABR streaming ladder generator, implemented as software or hardware or combination of thereof, and ABR streaming system incorporating such ladder generator. Among the advantages provided by the techniques herein are better quality and/or lower operational costs of ABR streaming system.

Figure 3:
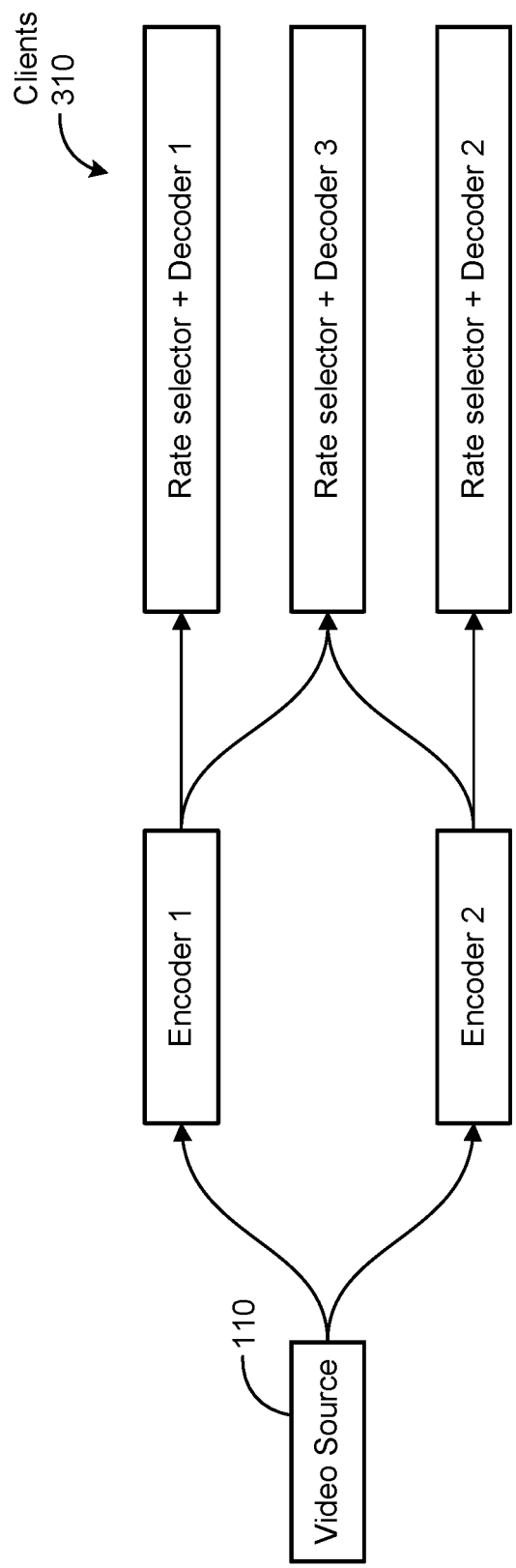
FIG. 3 is a conceptual diagram of an ABR streaming system comprising a video source, two types of encoders, and three types of decoders with associated rate selectors, according to an embodiment.

FIG. 3 is a conceptual diagram of an ABR streaming system comprising a video source 110, two types of encoders (encoder 1 and encoder 2), and three types of clients 310 comprising decoders (decoder 1, decoder 2, and decoder 3) with associated rate selectors, according to an embodiment. It can be noted that encoders shown in FIG. 3 may correspond to a type of encoder 120 of FIG. 1, which may be executed by one or more computers that intake source content from the video source 110 (which may also comprise one or more computers). Moreover, each of the clients 310 may each correspond with a different type of streaming client 150 of FIG. 1, which may be executed by an end-user device (computer, mobile phone, television, etc.). (It can be noted that the terms "client" and "decoder" are often used interchangeably herein when referring to the mathematical descriptions of the ABR streaming systems described below.) In this embodiment, and for purposes of establishing a mathematical description of an embodiment, decoders 1 and 2 can only decode streams produced by encoders 1 and 2 respectively. Decoder 3 can select and decode steams produced by either encoder 1 or encoder 2.

As used herein, the term "single codec client" refers to clients (such as clients comprising decoders 1 or 2) capable of decoding video streams encoded with a single codec (e.g., from either encoder 1 or encoder 2). Similarly, the term "dual-codec client" refers to clients (such as clients comprising decoder 3) capable of switching between video streams encoded with two different codecs (e.g., video streams encoded by either encoder 1 or encoder 2). Similarly, the term "switching client" may be used to refer to decoders capable of decoding video having streams encoded with two or more codecs (from two or more encoders).

To provide a mathematical description of the ABR streaming system of FIG. 3, the variable R is used to denote bitrates, and Q is used to denote quality values achievable by video codecs. Here, quality values Q are normalized, such that value Q=0 represents worst possible quality, and Q=1 represents ideal reconstruction. A well-known example of quality metric satisfying such constraints is the Structural Similarity Index Measure (SSIM) metric, but in principle it could be any other metric with certain normalization applied, such as Peak-Signal-to-Noise Ratio (PSNR), Multi-Scale SSIM (MS-SSIM), or Video Multimethod Assessment Fusion (VMAF).

For a given source content, encoders 1 and 2 will each produce a set of encoded streams with (quality, rate) characteristics as follows:

$$\mathcal{L}_1 = \{(R_1^i, Q_1^i), i=1, \ldots, n_1\} \tag{1}$$

and $$\mathcal{L}_2 = \{(R_2^i, Q_2^i), i=1, \ldots, n_2\}, \tag{2}$$

Where the sub-indices 1 and 2 in both cases indicate codec type, and $n_1$ and $n_2$ are the number of streams produced by encoder 1 and encoder 2, respectively.

Here, the performance of codecs is modeled by certain quality-rate functions: $Q_1(R)$ and $Q_2(R)$. The above (quality, rate) points (corresponding to different streams) can be understood as samples taken from these functions:

$$Q_1^i = Q_1(R_1^i), i=1, \ldots, n_1 \tag{3}$$

and $$Q_2^i = Q_2(R_2^i), i=1, \ldots, n_2. \tag{4}$$

Sets $\mathcal{L}_1$ and $\mathcal{L}_2$ are encoding ladders for codecs of type 1 and 2 respectively. The union of both sets $\mathcal{L} = \mathcal{L}_1 \cup \mathcal{L}_2$ is a "dual-codec ladder."

For convenience of notation, such ladders can always be augmented by zero point:

$$(R^0, Q^0) = (0, 0) \tag{5}$$

which is the same for both codecs.

In practice, one of the video parameters that may also be changed at different bitrates is resolution. For the embodiments described herein, resolutions may be done optimally and can be assumed to be captured by quality-rate models for each codec. In other words, given a set of allowed resolutions S and quality-rate models $Q_1(S, R)$, obtained for each specific resolution $S \in \mathcal{S}$, final quality rate model $Q_1(R)$ can be defined such that $$Q_1(R) = \sup_{S \in \mathcal{S}} Q_1(S, R). \quad (6)$$

Most modern streaming protocols such as HLS or DASH are based on using Transmission Control Protocol (TCP) as the underlying transport protocol. In turn, TCP implements retransmissions, eliminating packet loss and masking many natural statistics as specific for each type of physical network. However, what still is observable at the TCP level are variations of transmission rate or bandwidth available at each instance of time.

Therefore, for purposes of mathematical modeling, a network can be considered as a continuous random variable R with certain given probability density function p(R).

In practice, such bandwidth density function p(R) may be different for different devices and their respective access networks. For example, when considering mobile clients connected over 4G/Long-Term Evolution (LTE) network, known throughput measurements of TCP traffic over LTE can be used. More generally, such distributions can be measured experimentally considering each specific streaming deployment and they of course will be different for different devices, CDNs, delivery regions, etc.

Defining models of clients can be done as follows. At every instance of time, given certain available network bandwidth R, decoders 1 and 2 of FIG. 3 (single codec clients) select bitrates from ladders $\mathcal{L}_1$ and $\mathcal{L}_2$ respectively, according to:

$$R_1^{selected}(R) = \max_{\substack{i=0,\ldots,n_1 \\ R_1^i \leq R}} R_1^i \quad (7)$$

and $$R_2^{selected}(R) = \max_{\substack{i=0,\ldots,n_2 \\ R_2^i \leq R}} R_2^i. \quad (8)$$

In other words, decoders 1 and 2 pick maximum ladder rate $R^i$ that is less or equal to available network bandwidth R.

The quality achieved by each decoder respectively, therefore will be:

$$Q_1^{selected}(R) = \max_{\substack{i=0,\ldots,n_1 \\ R_1^i \leq R}} Q_1^i \quad (9)$$

and $$Q_2^{selected}(R) = \max_{\substack{i=0,\ldots,n_2 \\ R_2^i \leq R}} Q_2^i. \quad (10)$$

While in practice, rate selection algorithms in streaming clients may be more complex, the above-described selection models nevertheless can be adequate for studying average performance of streaming systems.

With respect to decoder 3 (in FIG. 3), for each bandwidth value R, the decoder 3 can pick both the bitrate and codec that delivers best quality:

$$Q_3^{selected}(R) = \max(Q_1^{selected}(R), Q_2^{selected}(R)). \quad (11)$$

This can be accomplished by using the following rate selection rule:

$$R_3^{selected}(R) = \begin{cases} R_1^{selected}(R), & \text{if } Q_1^{selected}(R) \geq Q_2^{selected}(R) \\ R_2^{selected}(R), & \text{otherwise.} \end{cases} \quad (12)$$

Figure 4A:
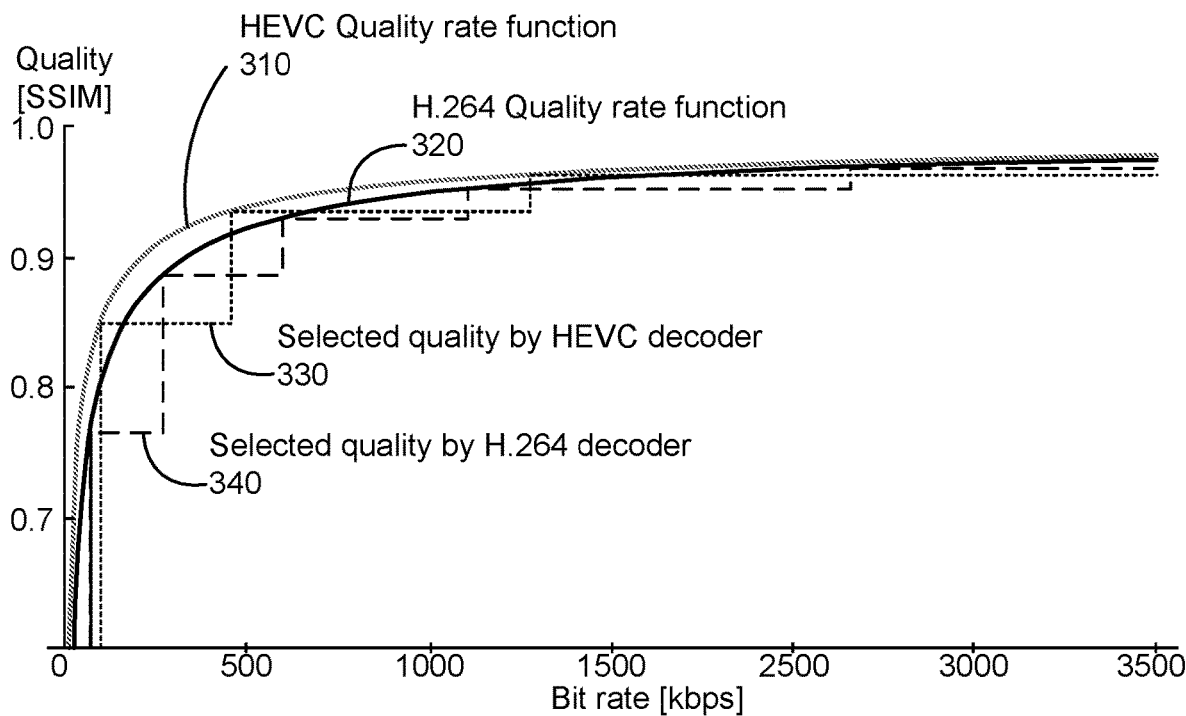
FIGS. 4A and 4B are illustrations of graphs showing the quality of video that different decoders (e.g., of FIG. 3) are able to achieve for various bitrates, according to an embodiment.
Figure 4B:
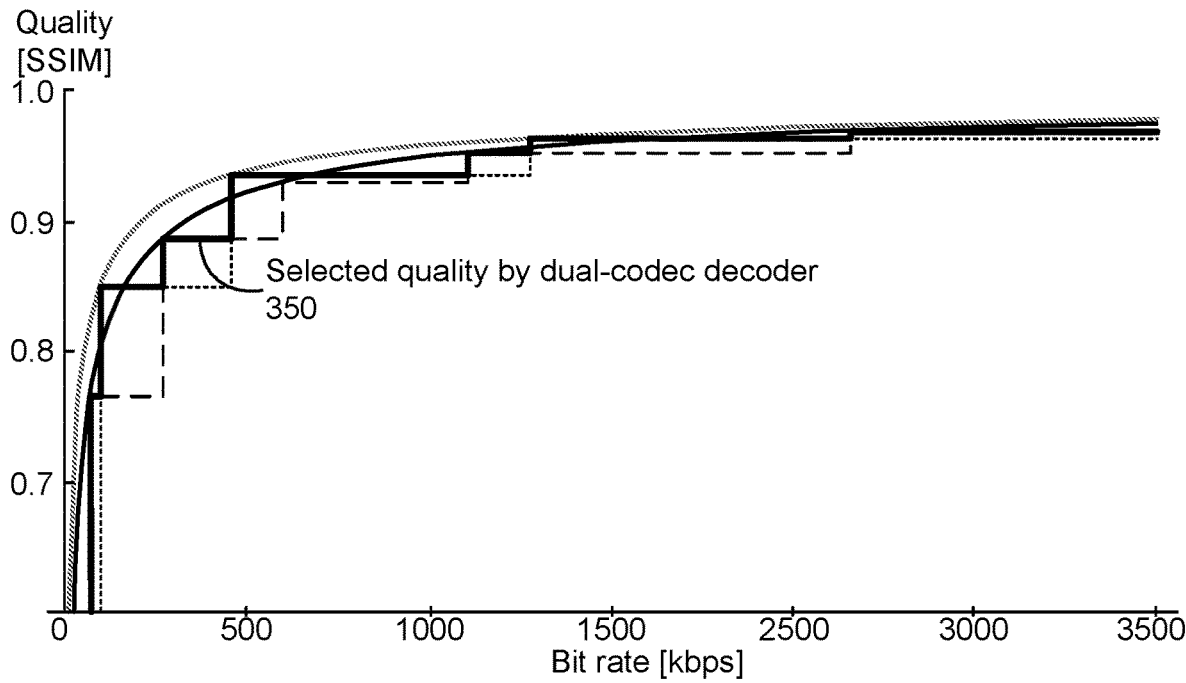

These concepts are illustrated in FIGS. 4A and 4B for H.264 and HEVC codecs.

FIGS. 4A and 4B are illustrations of graphs showing the quality of video that different clients/decoders are able to achieve for various bitrates. In FIG. 4A, the HEVC quality rate function 310 ($Q_{HEVC}(R)$) and an H.264 quality rate function 320 ($Q_{H.264}(R)$) are plotted, illustrating the quality (SSIM) achievable for a given source content over bitrates spanning from 0 to 3500 Kbps. It can be observed that the plot of the HEVC quality rate function 310 goes above that of the H.264 quality rate function 320, implying that HEVC is more efficient for the given source content.

As bitrate increases, each of the selected quality by the HEVC decoder 330 and the selected quality by the H.264 decoder 340 show steps of increasing quality, indicating where the respective decoder switches from a stream having a lower bitrate/quality to a stream with a higher bitrate/quality. For example, the encoding ladder for H.264 includes five bitrate points: 71, 268, 595, 1108, and 2149 kbps respectively, resulting in the staircase-like function shown by the selected quality by the H.264 decoder 340. The encoding ladder for HEVC includes three bitrate points: 93, 459, and 1275 kbps respectively, resulting in the staircase-like function shown by the selected quality by the HEVC decoder 330. (The HEVC decoder selects only between 3 HEVC rates available.)

FIG. 4B shows the selected quality by the dual-codec decoder 350, overlaid on the graph of FIG. 4A. As can be seen, the selected quality by the dual-codec decoder 350 partially coincides with the steps of both H.264 and HEVC decoders, picking best quality available at each rate. It makes seven steps total, alternating between both codecs. This allows dual-codec decoder/client to adapt to changing network bandwidth more accurately, thus achieving better network utilization than decoders working only with H.264 or HEVC streams. Importantly, however, the dual-codec decoder can also skip some of the points at which it does not make sense to switch because there would be no gain in quality. For example, instead of using 595 kbps H.264 point (which has a lower quality than 459 kbps HEVC), the dual-codec decoder stays at 459 kbps HEVC.

Based on this, a condition can be formulated when a dual-codec decoder/client achieves better performance. Given ladders $\mathcal{L}_1$ (1) and $\mathcal{L}_2$ (2) of streams encoded using first and second codec respectively, consider now 2 indices i and j, such that: $R_1^i < R_2^j < R_1^{i+1}$ and $Q_1^i < Q_2^j < Q_1^{i+1}$. If this condition is satisfied, then the point j from the second codec ladder becomes selectable, and that it increases total number of steps and accuracy of adaptation achievable by the dual-codec decoder/client. In a special case, as illustrated in FIG. 4B, such points could be i=1, and j=1, indicating that the above condition is satisfied even for the very first pair of points in the ladder: $R_1^1 < R_2^1 < R_1^2$ and $Q_1^1 < Q_2^1 < Q_1^2$, where $R_1^1$ and $R_1^2$ are the bitrates of first two streams encoded used first codec, $Q_1^1$ and $Q_1^2$ are their respective quality values, and where $R_2^1$ and $Q_2^1$ is the bitrate and quality value respectively of the first stream encoded using second codec.

Average quality achievable by dual-codec ABR streaming system can be determined as follows. Given the above-described rate selection rules, and by assuming that network bandwidth is modeled as a continuous random variable R with probability density function p(R), the expressions for average quality achievable by three types of decoders in the streaming system can be written as follows:

$$\overline{Q}_1 = \int_0^\infty Q_1^{selected}(R) p(R) dR, \quad (13)$$

$$\overline{Q}_2 = \int_0^\infty Q_2^{selected}(R) p(R) dR, \quad (14)$$

and $$\overline{Q}_3 = \int_0^\infty \max(Q_1^{selected}(R), Q_2^{selected}(R)) p(R) dR. \quad (15)$$

Here, $\overline{Q}_1$ is the average quality achievable by client that can only decode the first codec. Likewise, $\overline{Q}_2$ is the average quality achievable by client that can only decode the second codec. $\overline{Q}_3$ is the average quality achievable by client that can decode both codecs and switch between streams in $\mathcal{L}_1$ and $\mathcal{L}_2$.

Finally, by assuming that $\pi = \{\pi_1, \pi_2, \pi_3\}$, $\pi_1 + \pi_2 + \pi_3 = 1$ is the distribution describing presence of clients of each kind in overall population of clients, the overall average quality achievable by the streaming system can be expressed as:

$$\overline{Q}_\Sigma = \pi_1 \overline{Q}_1 + \pi_2 \overline{Q}_2 + \pi_3 \overline{Q}_3. \quad (16)$$

Figure 5:
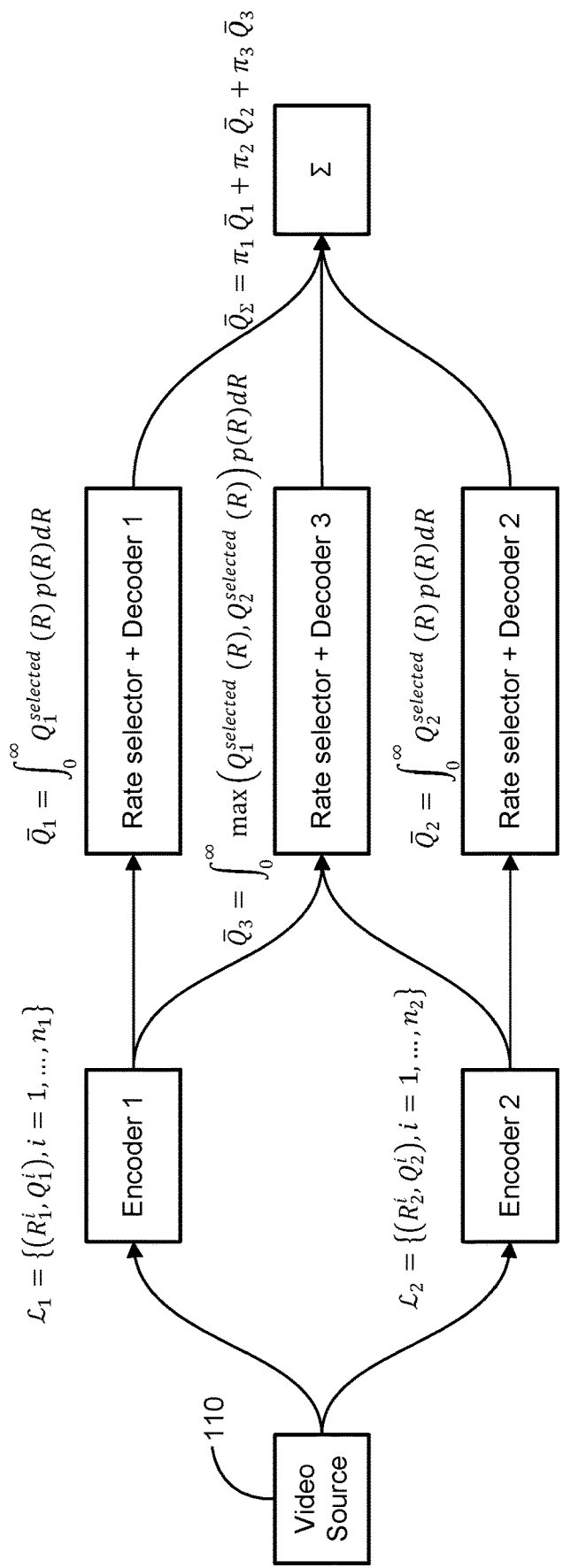
FIG. 5 is a conceptual diagram of an ABR streaming system used in an example embodiment.

The overall flow of the above definitions arriving at final average quality expression of equation (16) is illustrated in FIG. 5.

In view of equations (1)-(16), and observing that average quality value $\overline{Q}_\Sigma$ can be understood as a function of network bandwidth density p(R), client distribution π, number of points n, and sets of rates used in the ladder, an encoding ladder optimization problem can be set up as follows:

Given:
the total number of ladder points n,
limits for all rate points: $R_{min}$, $R_{max}$;
maximum limits for first rate points: $R_{max}^1$,
quality-rate functions for both codecs and content $Q_1(R)$, $Q_2(R)$
network bandwidth density p(R), and
distribution of clients π, Find:
numbers $\hat{n}_1$, $\hat{n}_2$, such that $\hat{n}_1 + \hat{n}_2 = n$, and
ladder rates, $\hat{R}_1^1, \ldots, \hat{R}_1^{\hat{n}_1}$ and $\hat{R}_2^1, \ldots, \hat{R}_2^{\hat{n}_2}$.
such that overall quality $\overline{Q}_\Sigma$ delivered by the streaming system is maximal. That is:

$$\overline{Q}_\Sigma\left(p, \pi, n, \hat{R}_1^1, \ldots, \hat{R}_1^{\hat{n}_1}, \hat{R}_2^1, \ldots, \hat{R}_2^{\hat{n}_2}\right) = \quad (17)$$

$$\max_{\substack{n_1 + n_2 = n \\ R_{min} \leq R_1^1 \leq \ldots \leq R_1^{n_1} \leq R_{max} \\ R_{min} \leq R_2^1 \leq \ldots \leq R_2^{n_2} \leq R_{max} \\ R_1^1, R_2^1 \leq R_{max}^1}} \overline{Q}_\Sigma(p, \pi, n, R_1^1, \ldots, R_1^{n_1}, R_2^1, \ldots, R_2^{n_2}).$$

As easily noticed, the problem described in equation (17) is a non-linear constrained optimization problem, where certain complications are added by the fact that $\overline{Q}_\Sigma(p, \pi, n, R_1^1, \ldots, R_1^{n_1}, R_2^1, \ldots, R_2^{n_2})$ is not differentiable (due to the use of max operator in quality decision for mixed client), and the fact that the choice of integers $\hat{n}_1 + \hat{n}_2 = n$ falls in the discrete domain while the rest is potentially continuous.

All constraints introduced in (17) can be used in practical settings. For example, the maximum rate limit $R_{max}$ can prevent allocation of bitrates beyond those that are physically achievable. The minimum rate limit $R_{min}$ is usually related to a minimum quality level at which streaming as service is even feasible. The limit on maximum first rate in the ladder $R_{max}^1$ is typically used to limit start-up time and/or buffering probability of clients, etc. In practice, several additional constraints may also be introduced.

The problem formulated in equation (17) is operating with streaming system with n total streams. However, if the number of streams is allowed to approach infinity the resulting quality limits at the outputs of each decoder become:

$$Q_1^* = \int_0^\infty Q_1(R) p(R) dR, \quad (18)$$

$$Q_2^* = \int_0^\infty Q_2(R) p(R) dR, \quad (19)$$

and $$Q_3^* = \int_0^\infty \max(Q_1(R), Q_2(R)) p(R) dR. \quad (20)$$

The overall quality limit for entire system becomes:

$$Q_\Sigma = \pi_1 Q_1^* + \pi_2 Q_2^* + \pi_3 Q_3^*. \quad (21)$$

The relative distances between ideal quality values and best average qualities achievable for n-point system (referred to as "quality gaps") can be defined as follows:

$$\xi_1 = \frac{Q_1^* - \overline{Q}_1}{Q_1^*}, \xi_2 = \frac{Q_2^* - \overline{Q}_2}{Q_2^*}, \xi_3 = \frac{Q_3^* - \overline{Q}_3}{Q_3^*}, \xi_\Sigma = \frac{Q_\Sigma^* - \overline{Q}_\Sigma}{Q_\Sigma^*}. \quad (22)$$

Quality gap metrics can be useful for understanding how well a system with finite number of rate points behaves relative to infinite case, and how many ladder points are practically sufficient. For example, to find sufficient number of points n, the system may check if:

$$\xi_\Sigma(p, \pi, n, \hat{R}_1^1, \ldots, \hat{R}_1^{\hat{n}_1}, \hat{R}_2^1, \ldots, \hat{R}_2^{\hat{n}_2}) \leq \xi_{max} \quad (23)$$

where $\hat{R}_1^1, \ldots, \hat{R}_1^{\hat{n}_1}, \hat{R}_2^1, \hat{R}_2^{\hat{n}_2}$ are rate points found by solving (1) for a given n, and where $\xi_{max}$ is maximum allowed quality gap (that is suboptimality) of the system. For example, in practical context, $\xi_{max}$ may be set to 1 or 2%.

In addition to average quality, the average bandwidth consumed by each client can be expressed as:

$$\overline{R}_1 = \int_0^\infty R_1^{selected}(R) p(R) dR, \quad (24)$$

$$\overline{R}_2 = \int_0^\infty R_2^{selected}(R) p(R) dR, \quad (25)$$

and $$\overline{R}_3 = \int_0^\infty R_3^{selected}(R) p(R) dR. \quad (26)$$

The average bandwidth consumed by the entire system, consequently becomes:

$$\overline{R}_\Sigma = \pi_1 \overline{R}_1 + \pi_2 \overline{R}_2 + \pi_3 \overline{R}_3. \quad (27)$$

In the infinite case all these expressions converge to the average bandwidth of the network:

$$R^* = \int_0^\infty R p(R) dR. \quad (28)$$

In other words, increasing the number of ladder points (streams) has the effect of both increasing average quality and average bandwidth consumed by streaming system. Both quantities have natural limits.

In principle, given all above definitions, and considering that in practice bandwidth is usually a factor in operating costs of the streaming system, the problem of optimal ladder design may also be formulated as one of minimization of average bandwidth:

$$\overline{R}_\Sigma\left(p, \pi, n, \hat{R}_1^1, \ldots, \hat{R}_1^{\hat{n}_1}, \hat{R}_2^1, \ldots, \hat{R}_2^{\hat{n}_2}\right) = \quad (29)$$

$$\max_{\substack{n_1+n_2=n \\ R_{min} \leq R_1^1 \leq \ldots \leq R_1^{n_1} \leq R_{max} \\ R_{min} \leq R_2^1 \leq \ldots \leq R_2^{n_2} \leq R_{max} \\ R_1^1, R_2^1 \leq R_{max}^1}} \overline{R}_\Sigma(p, \pi, n, R_1^1, \ldots, R_1^{n_1}, R_2^1, \ldots, R_2^{n_2}).$$

$$\overline{Q}_\Sigma\begin{pmatrix} p, \pi, n, \hat{R}_1^1, \ldots, \hat{R}_1^{\hat{n}_1} \\ \hat{R}_2^1, \ldots, \hat{R}_2^{\hat{n}_2} \end{pmatrix} \geq Q_{min}$$

where $Q_{min}$ is a certain limit on quality to be achieved by the system.

However, it can be noted, that these problems are related and, in a number of cases, produce exactly the same solutions. Thus, if for a given n and all other constraints, the quality limit is selected to match the solution of problem (17), i.e.: $Q_{min} = \overline{Q}_\Sigma(p, \pi, n, \hat{R}_1^1, \ldots, \hat{R}_1^{\hat{n}_1}, \hat{R}_2^1, \ldots, \hat{R}_2^{\hat{n}_2})$ which is the best quality achievable in such a system, then the solution of problem (29) will produce same exact ladders $\hat{R}_1^1, \ldots, \hat{R}_1^{\hat{n}_1}, \hat{R}_2^1, \ldots, \hat{R}_2^{\hat{n}_2}$ as in the problem (17). Moreover, both problems (17) and (29) belong to same class, where the choice of the number of streams to be allocated to each codec falls in the domain of discrete optimization, while the rest can be generally understood as a constrained continuous domain optimization problem.

More generally, an ABR streaming system with k codecs and m clients may be considered, in which distributions of network bandwidth p and types of clients π are known, and where as optimization criterion we define a certain figure of merit function:

$$\Phi(p, \pi, n, R_1^1, \ldots, R_1^{n_1}, \ldots, R_k^1, \ldots, R_k^{n_k}), \quad (30)$$

which captures performance of the entire system. In special cases, as explained earlier, such figure of merit function may coincide with average quality or average bandwidth in the ABR system, or it could be a more complex function using both quality and bandwidth expressions as components.

Then, and under certain additional conditions, the optimization problem becomes one of finding numbers $\hat{n}_1, \ldots, \hat{n}_k$ such that $\hat{n}_1 + \ldots + \hat{n}_k = n$, and ladder rates $\{\hat{R}_1^1, \ldots, \hat{R}_1^{\hat{n}_1}\}, \ldots, \{\hat{R}_k^1, \ldots, \hat{R}_k^{\hat{n}_k}\}$ such that overall performance delivered by the streaming system is maximal:

$$\Phi\left(p, \pi, n, \hat{R}_1^1, \ldots, \hat{R}_1^{\hat{n}_1}, \hat{R}_k^1, \ldots, \hat{R}_k^{\hat{n}_k}\right) = \quad (31)$$

$$\max_{\substack{n_1 + \ldots n_k = n \\ \text{other constraints}}} \Phi(p, \pi, n, R_1^1, \ldots, R_1^{n_1}, R_k^1, \ldots, R_k^{n_k}).$$

The overall number of points n may also be subject to certain constraints, e.g. such that $$n_{min} \leq n \leq n_{max}, \text{ and } \Xi(p, \pi, n, \hat{R}_1^1, \ldots, \hat{R}_1^{\hat{n}_1}, \ldots, \hat{R}_k^1, \ldots, \hat{R}_k^{\hat{n}_k}) \leq \Xi_{max} \quad (32)$$

where $\Xi(p, \pi, n, \hat{R}_1^1, \ldots, \hat{R}_1^{\hat{n}_1}, \ldots, \hat{R}_k^1, \ldots, \hat{R}_k^{\hat{n}_k})$ is some additional performance criterion that is used to decide how many ladder points are sufficient for the system, and where the rate values for ladder points for each codec $\hat{R}_1^1, \ldots, \hat{R}_1^{\hat{n}_1}, \ldots, \hat{R}_k^1, \ldots, \hat{R}_k^{\hat{n}_k}$ come as solutions of problem (31).

Figure 6:
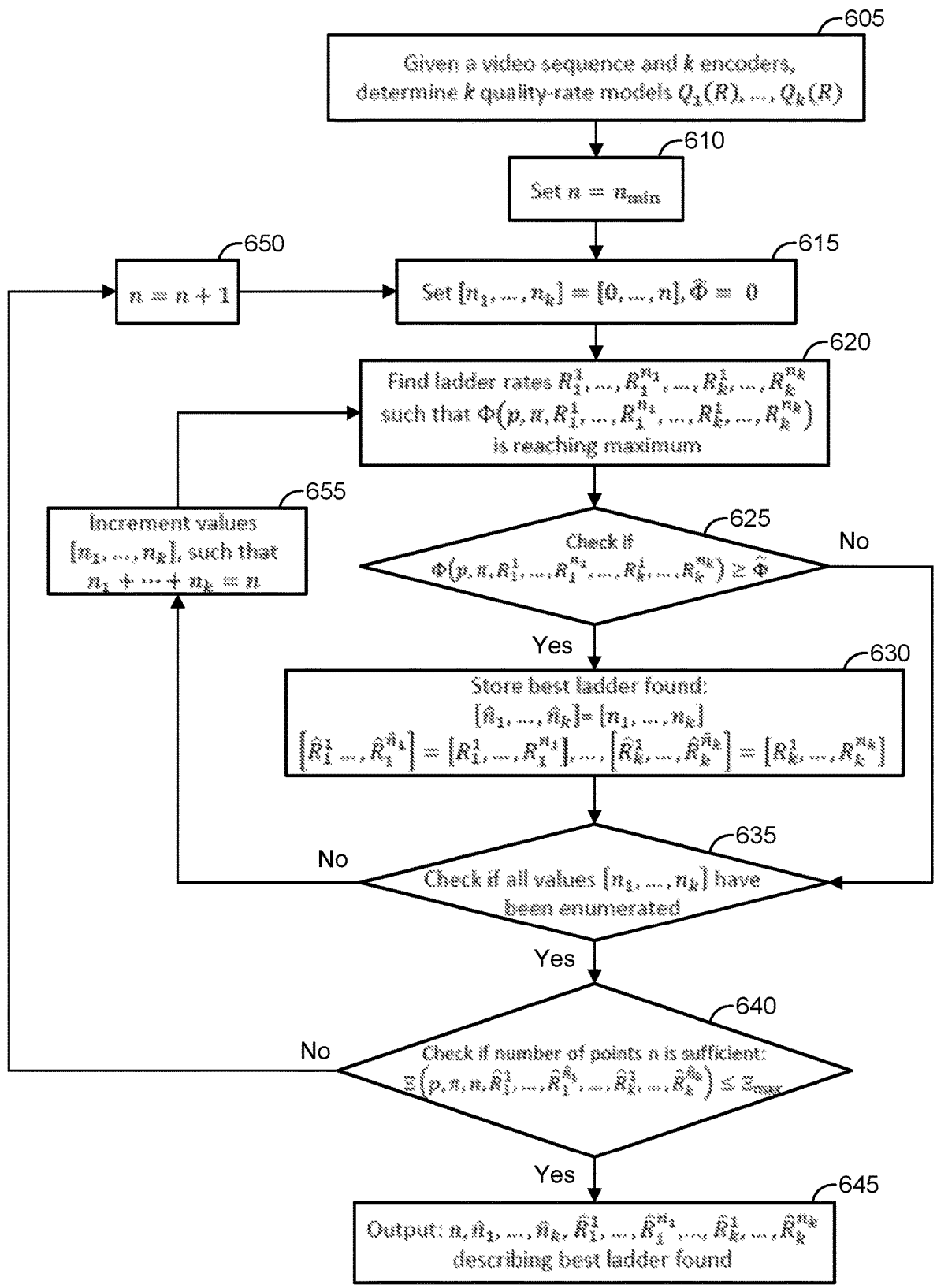
FIG. 6 is a flow diagram showing the main steps of a method for determining an optimized multi-codec encoding ladder, according to an embodiment.

FIG. 6 is a flow diagram showing the main steps of a method for determining an optimized multi-codec encoding ladder, according to an embodiment, in which the problem defined by equations (31) and (32) is solved. Specific examples of practical multi-codec systems and solutions for each found by application of the proposed method are included below. Some or all of the functions shown in the blocks of FIG. 6 may be performed by an encoder 120 (which, as previously noted, may be executed by a computer server).

The method of FIG. 6 can start at block 605, which includes a process of defining models of quality-rate functions for k given codecs, and content. As discussed in the '723 application, this may be done, for example, by running one or more probe encodings by each codec, and then fitting model curves through (quality, rate) points obtained after each probe.

The combination of functions of blocks 610, 640, and 650, describes a loop for finding sufficient value of encoding ladder points (or total number of streams) n. The combination of functions of blocks 615, 635, and 655 describes a loop for finding numbers of streams allocated to each codec: $n_1, \ldots, n_k$. The combination of such numbers, must satisfy $n_1 + \ldots + n_k = n$, where n at this point is given by the prior loop.

The functionality of block 620 describes a process of finding encoding ladder rates for each codec: $R_1^1, \ldots, R_1^{n_1}, \ldots, R_k^1, \ldots, R_k^{n_k}$, such that figure of merit function $\Phi(p, \pi, R_1^1, \ldots, R_1^{n_1}, \ldots, R_k^1, \ldots, R_k^{n_k})$ is reaching maximum, subject to some additional conditions, such as conditions on range or rates, etc. This functionality effectively solves the subset of the problem (31) above, where numbers n and $n_1, \ldots, n_k$ are fixed. Such an optimization problem may, in principle, be a continuous domain non-linear constrained optimization problem, and for which a number of effective numerical techniques are available. For example, in cases when $\Phi(p, \pi, R_1^1, \ldots, R_1^{n_1}, \ldots, R_k^1, \ldots, R_k^{n_k})$ is continuous and differentiable with respect to rates $R_1^1, \ldots, R_1^{n_1}, \ldots, R_1^k, \ldots R_k^{n_k}$, it can be solved by application of sequential dynamic programming.

The figure of merit function $\Phi(p, \pi, R_1^1, \ldots, R_1^{n_1}, \ldots, R_k^1, \ldots, R_k^{n_k})$ used at block 620 internally may rely on models of quality rate functions $Q_1(R), \ldots, Q_k(R)$ obtained at block 605, as well as network bandwidth distribution p, models of client selection logic, and distribution of clients of all kinds π. In special cases, such figure of merit function may be equivalent to average quality or average bandwidth usage functions, which can be derived as previously shown.

The functionality of blocks 620 and 625 describes the process of selection of a best solution $\hat{n}_1, \ldots, \hat{n}_k$, $\hat{R}_1^1, \ldots, \hat{R}_1^{\hat{n}_1}, \ldots, \hat{R}_k^1, \ldots, \hat{R}_k^{\hat{n}_k}$ number of points n. The solution selected at this point becomes solution of a complete problem as defined in (2).

Finally, as shown by block 640, the method described in FIG. 6 includes checking if given total number of streams n is sufficient for generating the ladder, and if so, as shown by block 645, the parameters of such ladder for storage or use in streaming system are then output.

Put more generally, the functionality of the method of determining a multi-codec encoding ladder shown in FIG. 6 can be described as
1) Selecting the total number of streams n to be used in the multi-codec ABR ladder;
2) Selecting numbers of streams to be allocated to each codec $n_1, \ldots, n_k$, wherein
   a) such numbers satisfy $n_1 + \ldots + n_k = n$, and
   b) a subset of such numbers may actually be set to 0, implying that for a given content, codecs, clients, networks, and other constraints the use of some of the codecs is not resulting in any advantage; and 3) Selecting rates for each codec $R_1^1, \ldots, R_1^{n_1}, \ldots, R_1^k, \ldots, R_k^{n_k}$, where all such selections are influenced by:
   a) Properties of codecs and content, as captured by quality rate functions $Q_1(R), \ldots, Q_k(R)$,
   b) Properties of networks, as captured by network bandwidth distribution $p(R)$,
   c) Decoding and switching capabilities of clients, and their distribution $\pi$, and
   d) Additional operator-defined constraints, such as constraints on ranges of bitrates, etc.

The description that follows provides some examples of experimental results using the techniques of multi-codec ABR encoding ladder determination provided herein (e.g., as shown in FIG. 6), in which the advantages will be apparent. In these experiments, three video sequences were used, produced by selective catenation of raw 720p50 video clips (available at YUV video sequences, https://media.xiph.org/video/derf/). These sequences are referred to herein as "Easy", "Medium", and "Complex" based on the degree of challenge such sequences present to the encoder. The encoders used open source x264 and x265 projects implementing H.264 and HEVC encoders respectively. Typical codec constraints as suitable for streaming (GOP, HRD, reference and B-frames) were applied in both cases. For measuring quality, SSIM metric was used. When operating H.264 encoder, its operation in baseline and main profiles are considered separately, because they differ considerably in performance.

For modeling of performance of all codecs, the following quality-rate model function was used:

$$Q(R) = \frac{R^\beta}{\alpha^\beta + R^\beta}. \quad (33)$$

Figure 7:
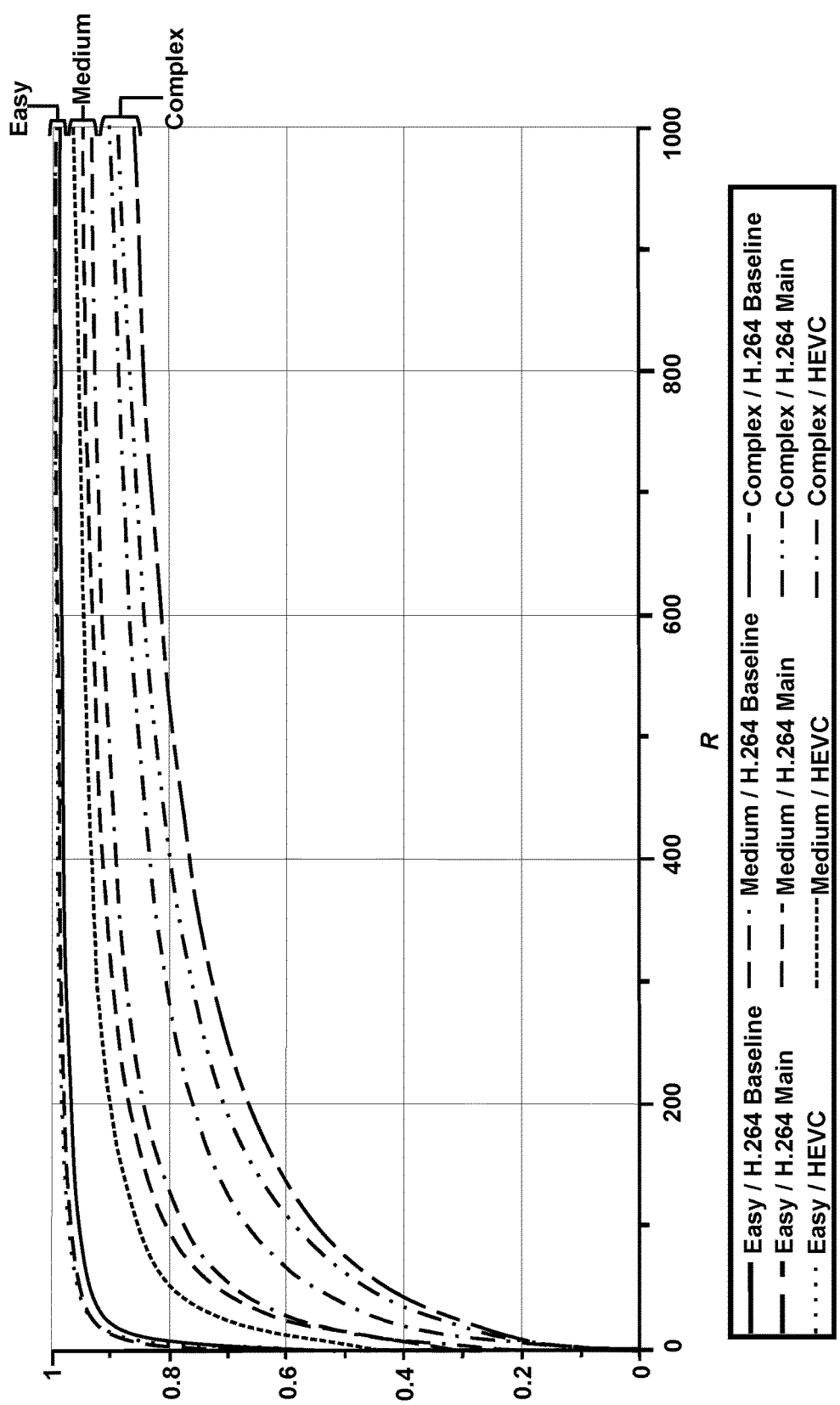
FIG. 7 is a graph in which the shapes of the obtained quality-rate functions of codecs for example source content are shown.

In Table 2, the values of model parameters $\alpha$, $\beta$ obtained for the codecs and content are shown. FIG. 7 shows a graph in which the shapes of the obtained quality-rate functions are shown.

TABLE 2

Parameters of quality-rate models obtained for H.264 and HEVC encoders and 3 types of content.

| Content/Codec | H.264 Baseline | H.264 Main | HEVC |
|---|---|---|---|
| Easy | alpha = .3938883730, beta = .5397917138 | alpha = .1935813211, beta = .5199895735 | alpha = .3644560061, beta = .5673655854 |
| Medium | alpha = 13.59791176, beta = .6137115991 | alpha = 12.04494171, beta = .6622814243 | alpha = 5.155150897, beta = .5946775618 |
| Complex | alpha = 76.83718595, beta = .7050041543 | alpha = 60.99950465, beta = .7294820353 | alpha = 34.76131077, beta = .6548005760 |

As evident from FIG. 7, the gains achievable by HEVC codec over H.264 are highly content-dependent. Thus, for "Easy" content there is little gain at all, while for "Medium" and "Complex" content they are more noticeable. The difference between baseline and main profiles of H.264 is also content-dependent, but to a somewhat lesser degree. Thus, for "Easy" content there is still a difference between corresponding plots shown in FIG. 7.

To obtain network bandwidth models, throughput measurements of LTE network were used, fitted to the following analytic model:

$$p(R) = \alpha f(R, \sigma_1) + (1-\alpha) f(R, \sigma_2), \quad (34)$$

where $$f(R, \sigma) = \frac{x}{\sigma^2} e^{-\frac{x^2}{2\sigma^2}} \quad (35)$$

is the probability density function of Rayleigh distribution, and $\alpha$, $\sigma_1$, $\sigma_2$ are the model parameters.

Figure 8:
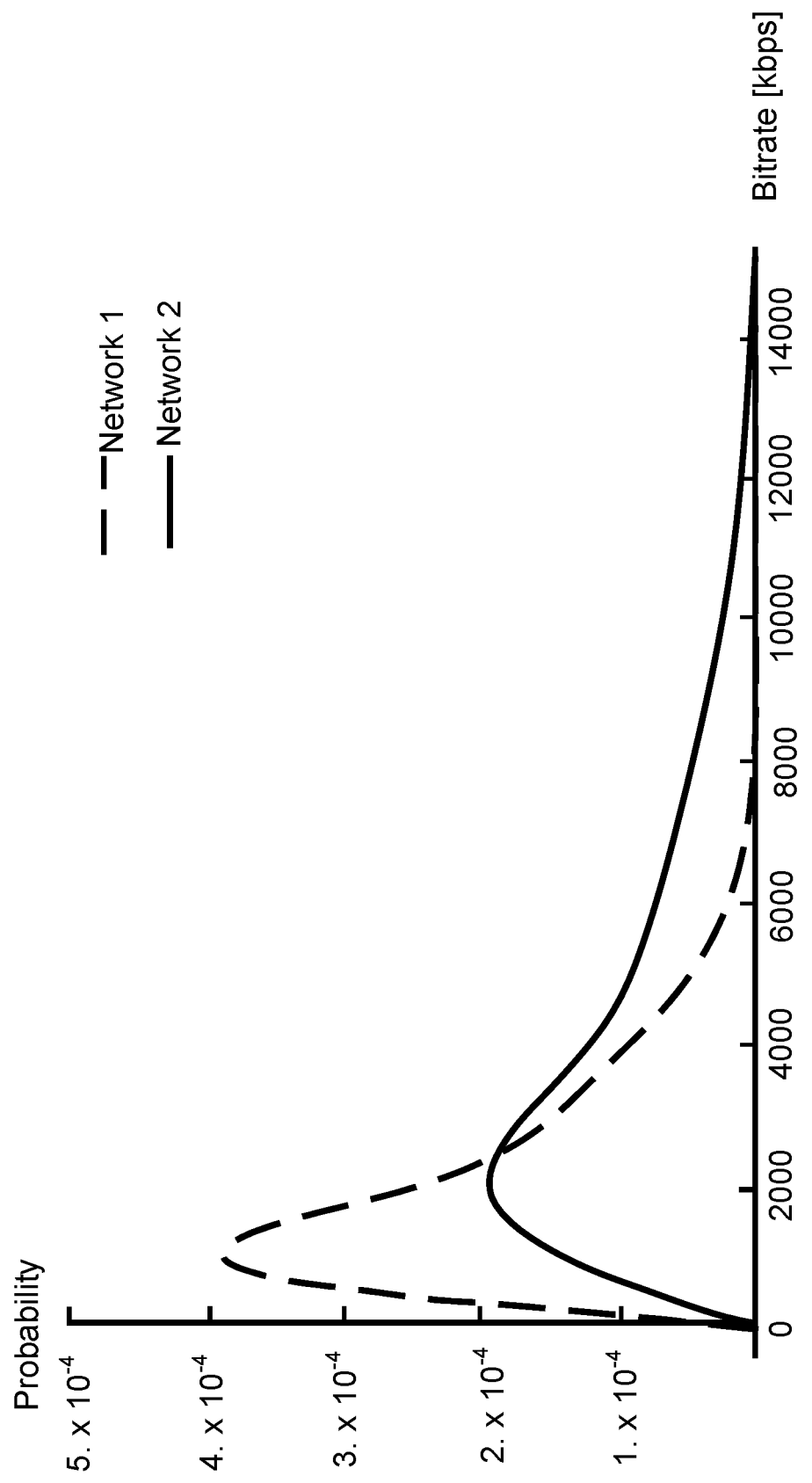
FIG. 8 is a graph of network parameters of two network models used to obtain experimental results described herein.

Two models, called Network 1 and Network 2 herein, are obtained by scaling LTE network throughput by two possible numbers of users in the cell. The resulting model parameters and plots of network models are shown in Table 3 and FIG. 8 respectively.

TABLE 3

Parameters of network models used in the experiments.

| | Model Parameters | | |
|---|---|---|---|
| Network | a | $\sigma_1$ | $\sigma_2$ |
| Network 1 | 0.4287 | 901.10 | 2249.64 |
| Network 2 | 0.4287 | 1802.20 | 4499.27 |

Given the above quality-rate and network models, the optimal encoding ladders can be determined for several practically-relevant configurations of streaming systems. In all the example situations, the following constraints were used:

limit on minimum bitrate: $r_{min}$=50 [kbps], limit on maximum bitrate: $r_{max}$=10000 [kbps], and limit on maximum bitrate of first stream: $r_{max}^1$=500 [kbps].

As optimization criterion, the overall average quality $\overline{Q}_\Sigma$ was considered. Results are reported for quality levels achieved at top renditions $Q^n$, average quality $\overline{Q}$, and quality gaps $\xi$ achievable for all types of clients and overall.

Initially, trivialized examples were considered, where the streaming system uses only one codec. In such cases, there is only one codec, and one ladder, e.g. $\mathcal{L}_1$, and one type of client that can decode streams from this ladder. This results in an optimization problem:

$$\overline{Q}_\Sigma\left(p, \hat{R}_1^1, \ldots, \hat{R}_1^{n_1}\right) = \max_{\substack{R_{min} \leq R_1^1 \leq \ldots \leq R_1^{n_1} \leq R_{max} \\ R_1^1 \leq R_{max}^1}} \overline{Q}_\Sigma(p, R_1^1, \ldots, R_1^{n_1}). \quad (36)$$

Figure 9:
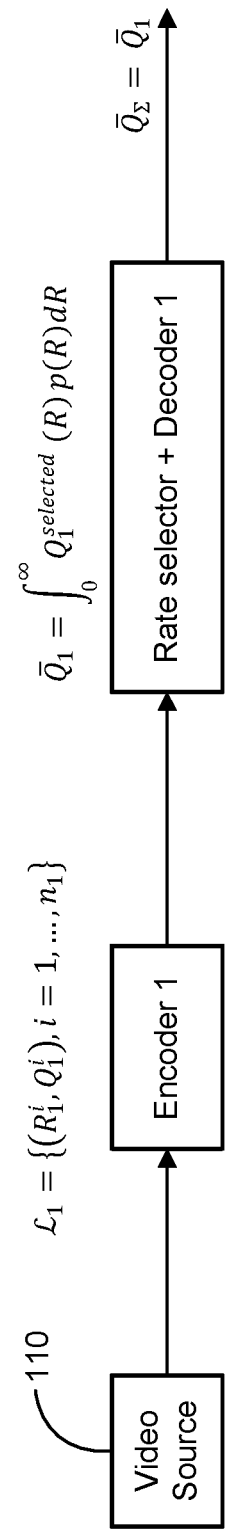
FIG. 9 is a conceptual diagram of a single-codec ABR streaming system used to obtain experimental results described herein.

The ABR streaming system describing derivation of $\overline{Q}_\Sigma$ in this case is shown in FIG. 9.

This system is a single-codec ABR streaming system, which is offered for comparison with multi-codec ABR streaming systems described in more detail below.

The examples of optimal ladders constructed by considering H.264 baseline, H.264 main, and HEVC codecs respectively are shown in Tables 4-6.

TABLE 4

Optimal ladders for H.264 baseline. Left = Network 1, Right = Network 2.

| Content | Ladder N | Bitrates[kbps] | Results for H264 Baseline only clients $Q^n$ | $\bar{Q}$ | $\xi$ | Content | Ladder N | Bitrates[kbps] | Results for H264 Baseline only clients $Q^n$ | $\bar{Q}$ | $\xi$ |
|---|---|---|---|---|---|---|---|---|---|---|---|
| Easy | 2 | 76, 658 | 0.9821 | 0.9757 | 1.22 | Easy | 2 | 126, 1243 | 0.9872 | 0.9827 | 0.894 |
|  | 3 | 50, 363, 1147 | 0.9867 | 0.9807 | 0.715 |  | 3 | 78, 661, 2198 | 0.9906 | 0.9864 | 0.515 |
|  | 4 | 50, 277, 738, 1666 | 0.9891 | 0.9828 | 0.509 |  | 4 | 58, 444, 1322, 3115 | 0.9977 | 0.988 | 0.356 |
|  | 5 | 50, 230, 557, 1078, 2136 | 0.9904 | 0.9838 | 0.4 |  | 5 | 50, 342, 955, 1970, 4019 | 0.9932 | 0.9889 | 0.269 |
|  | 6 | 50, 199, 450, 814, 1368, 2493 | 0.9912 | 0.9845 | 0.335 |  | 6 | 50, 291, 759, 1468, 2557, 4775 | 0.9938 | 0.9894 | 0.217 |
|  | 7 | 50, 177, 380, 660, 1043, 1626, 2769 | 0.9917 | 0.9849 | 0.291 |  | 7 | 50, 255, 631, 1174, 1925, 3070, 5344 | 0.9942 | 0.9897 | 0.183 |
|  | 8 | 50, 161, 332, 560, 854, 1251, 1864, 3001 | 0.992 | 0.9852 | 0.26 |  | 8 | 50, 229, 543, 982, 1559, 2340, 3540, 5813 | 0.9944 | 0.99 | 0.159 |
|  | 9 | 50, 149, 297, 488, 728, 1032, 1444, 2085, 3205 | 0.9923 | 0.9854 | 0.237 |  | 9 | 50, 210, 479, 847, 1316, 1914, 2722, 3976, 6220 | 0.9946 | 0.9902 | 0.141 |
|  | 10 | 50, 140, 270, 435, 637, 884, 1196, 1623, 2286, 3386 | 0.9925 | 0.9856 | 0.219 |  | 10 | 50, 194, 430, 746, 1141, 1627, 2242, 3078, 4378, 6579 | 0.9948 | 0.9903 | 0.127 |
| Medium | 2 | 179, 874 | 0.9279 | 0.8995 | 4.69 | Medium | 2 | 295, 1616 | 0.9494 | 0.929 | 3.45 |
|  | 3 | 123, 520, 1362 | 0.9441 | 0.9157 | 2.97 |  | 3 | 199, 937, 2569 | 0.9615 | 0.9416 | 2.15 |
|  | 4 | 95, 372, 859, 1829 | 0.9529 | 0.9235 | 2.15 |  | 4 | 151, 661, 1600, 3477 | 0.9678 | 0.9475 | 1.54 |
|  | 5 | 77, 288, 630, 1159, 2233 | 0.9581 | 0.928 | 1.67 |  | 5 | 123, 507, 1163, 2197, 4285 | 0.9715 | 0.9508 | 1.19 |
|  | 6 | 65, 234, 496, 863, 1420, 2542 | 0.9612 | 0.9309 | 1.37 |  | 6 | 103, 408, 907, 1624, 2715, 4916 | 0.9738 | 0.953 | 0.967 |
|  | 7 | 57, 197, 408, 690, 1073, 1656, 2792 | 0.9633 | 0.9329 | 1.16 |  | 7 | 89, 339, 736, 1287, 7075, 3147, 5313 | 0.975 | 0.9544 | 0.814 |
|  | 8 | 51, 172, 348, 577, 871, 1267, 1878, 3007 | 0.9649 | 0.9343 | 1 |  | 8 | 78, 291, 620, 1059, 1627, 2389, 3544, 5671 | 0.9759 | 0.9555 | 0.703 |
|  | 9 | 50, 158, 310, 504, 743, 1046, 1456, 2092, 3204 | 0.9662 | 0.9354 | 0.882 |  | 9 | 70, 255, 535, 902, 1362, 1944, 2724, 3908, 5982 | 0.9767 | 0.9563 | 0.619 |
|  | 10 | 50, 148, 282, 449, 651, 897, 1208, 1632, 2289, 3380 | 0.9672 | 0.9363 | 0.79 |  | 10 | 64, 227, 470, 785, 1171, 1644, 2238, 3037, 4249, 6273 | 0.9773 | 0.957 | 0.552 |
| Complex | 2 | 284, 1053 | 0.8636 | 0.8053 | 8.86 | Complex | 2 | 463, 1904 | 0.9058 | 0.8634 | 6.56 |
|  | 3 | 205, 660, 1558 | 0.893 | 0.8317 | 5.87 |  | 3 | 327, 1161, 2864 | 0.9276 | 0.8847 | 4.25 |
|  | 4 | 162, 488, 1002, 2024 | 0.9094 | 0.8452 | 4.34 |  | 4 | 256, 845, 1821, 3760 | 0.9395 | 0.8953 | 3.11 |
|  | 5 | 135, 387, 750, 1295, 2394 | 0.9187 | 0.8533 | 3.43 |  | 5 | 211, 663, 1349, 2397, 4511 | 0.9464 | 0.9015 | 2.44 |
|  | 6 | 115, 322, 602, 981, 1551, 2678 | 0.9244 | 0.8585 | 2.83 |  | 6 | 180, 545, 1071, 1799, 2899, 5100 | 0.9506 | 0.9055 | 2 |
|  | 7 | 101, 276, 505, 797, 1187, 1782, 2902 | 0.9282 | 0.8622 | 2.41 |  | 7 | 158, 463, 888, 1445, 2196, 3336, 5526 | 0.9532 | 0.9083 | 1.7 |
|  | 8 | 91, 242, 436, 675, 974, 1374, 1990, 3085 | 0.9311 | 0.865 | 2.1 |  | 8 | 140, 403, 759, 1210, 1784, 2552, 3723, 5858 | 0.955 | 0.9104 | 1.47 |
|  | 9 | 82, 216, 384, 586, 830, 1134, 1546, 2178, 3243 | 0.9333 | 0.8671 | 1.86 |  | 9 | 128, 360, 668, 1052, 1523, 2117, 2922, 4173, 6365 | 0.9575 | 0.912 | 1.3 |
|  | 10 | 76, 196, 344, 519, 725, 972, 1283, 1705, 2349, 3382 | 0.9351 | 0.8688 | 1.67 |  | 10 | 117, 324, 595, 926, 1323, 1804, 2413, 3243, 4529, 6679 | 0.9588 | 0.9132 | 1.17 |

TABLE 5

Optimal ladders for H.264 main. Left = Network 1, Right = Network 2.

| Content | Ladder N | Bitrates[kbps] | Results for H.264 main only clients $Q^n$ | $\bar{Q}$ | $\xi$ | Content | Ladder N | Bitrates[kbps] | Results for H.264 main only clients $Q^n$ | $\bar{Q}$ | $\xi$ |
|---|---|---|---|---|---|---|---|---|---|---|---|
| Easy | 2 | 66, 636 | 0.9854 | 0.9804 | 0.98 | Easy | 2 | 110, 1206 | 0.9895 | 0.9859 | 0.724 |
|  | 3 | 50, 366, 1155 | 0.9892 | 0.9844 | 0.573 |  | 3 | 68, 636, 2172 | 0.9922 | 0.989 | 0.413 |
|  | 4 | 50, 280, 745, 1680 | 0.9911 | 0.986 | 0.413 |  | 4 | 51, 429, 1309, 3108 | 0.9935 | 0.9902 | 0.284 |
|  | 5 | 50, 232, 562, 1087, 2153 | 0.9922 | 0.9868 | 0329 |  | 5 | 50, 347, 968, 1992, 4060 | 0.9944 | 0.9909 | 0.216 |
|  | 6 | 50, 200, 454, 821, 1380, 2511 | 0.9928 | 0.9873 | 0.278 |  | 6 | 50, 294, 769, 1485, 2582, 4815 | 0.9948 | 0.9913 | 0.175 |
|  | 7 | 50, 179, 384, 667, 1052, 1640, 2787 | 0.9932 | 0.9877 | 0.245 |  | 7 | 50, 258, 639, 1186, 1942, 3087, 5337 | 0.9951 | 0.9916 | 0.148 |
|  | 8 | 50, 163, 336, 566, 862, 1262, 1880, 3020 | 0.9934 | 0.9879 | 0.22 |  | 8 | 50, 232, 550, 992, 1572, 2354, 3549, 5781 | 0.9953 | 0.9918 | 0.129 |
|  | 9 | 50, 151, 300, 494, 735, 1042, 1457, 2103, 3225 | 0.9937 | 0.9881 | 0.202 |  | 9 | 50, 212, 485, 856, 1327, 1926, 2733, 3974, 6162 | 0.9955 | 0.9919 | 0.115 |

TABLE 5-continued

Optimal ladders for H.264 main. Left = Network 1, Right = Network 2.

| Content | Ladder N | Bitrates[kbps] | Results for H.264 main only clients Q″ | $\overline{Q}$ | ξ | Content | Ladder N | Bitrates[kbps] | Results for H264 main only clients Q″ | $\overline{Q}$ | ξ |
|---|---|---|---|---|---|---|---|---|---|---|---|
| | 10 | 50, 141, 272, 440, 644, 893, 1207, 1638, 2305, 3406 | 0.9938 | 0.9882 | 0.188 | | 10 | 50, 196, 435, 754, 1151, 1638, 2253, 3085, 4365, 6501 | 0.9956 | 0.992 | 0.104 |
| Medium | 2 | 167, 836 | 0.9431 | 0.9182 | 4.08 | Medium | 2 | 272, 1536 | 0.9612 | 0.944 | 2.92 |
| | 3 | 114, 489, 1304 | 0.957 | 0.9328 | 2.56 | | 3 | 181, 875, 2452 | 0.9713 | 0.955 | 1.79 |
| | 4 | 88, 348, 815, 1750 | 0.9643 | 0.9396 | 1.84 | | 4 | 138, 610, 1510, 3318 | 0.9764 | 0.96 | 1.27 |
| | 5 | 71, 268, 595, 1108, 2149 | 0.9687 | 0.9436 | 1.43 | | 5 | 112, 465, 1090, 2090, 4107 | 0.9794 | 0.9628 | 0.981 |
| | 6 | 60, 217, 465, 821, 1362, 2464 | 0.9714 | 0.9461 | 1.16 | | 6 | 93, 372, 842, 1530, 2580, 4676 | 0.9811 | 0.9646 | 0.795 |
| | 7 | 53, 182, 381, 653, 1024, 1591, 2713 | 0.9731 | 0.9479 | 0.98 | | 7 | 80, 309, 681, 1202, 1920, 3003, 5100 | 0.9821 | 0.9659 | 0.668 |
| | 8 | 50, 163, 329, 549, 834, 1219, 1813, 2935 | 0.9744 | 0.9491 | 0.848 | | 8 | 71, 264, 570, 988, 1535, 2271, 3382, 5448 | 0.9829 | 0.9668 | 0.576 |
| | 9 | 50, 151, 294, 479, 711, 1004, 1403, 2022, 3129 | 0.9754 | 0.9501 | 0.748 | | 9 | 63, 230, 490, 837, 1278, 1840, 2593, 3729, 5751 | 0.9835 | 0.9674 | 0.506 |
| | 10 | 50, 141, 266, 424, 617, 853, 1150, 1553, 2170, 3204 | 0.9758 | 0.9508 | 0.671 | | 10 | 58, 204, 429, 725, 1094, 1549, 2123, 2893, 4055, 6033 | 0.984 | 0.968 | 0.451 |
| Complex | 2 | 265, 1009 | 0.8856 | 0.8334 | 7.89 | Complex | 2 | 428, 1821 | 0.9225 | 0.8856 | 5.73 |
| | 3 | 190, 625, 1496 | 0.9117 | 0.8579 | 5.18 | | 3 | 300, 1096, 2750 | 0.9415 | 0.9049 | 3.67 |
| | 4 | 150, 460, 959, 1950 | 0.926 | 0.8703 | 3.81 | | 4 | 234, 791, 1737, 3616 | 0.9516 | 0.9143 | 2.67 |
| | 5 | 124, 364, 715, 1246, 2322 | 0.9343 | 0.8776 | 3 | | 5 | 193, 618, 1280, 2302, 4360 | 0.9575 | 0.9197 | 2.09 |
| | 6 | 106, 301, 571, 940, 1497, 2609 | 0.9393 | 0.8824 | 2.48 | | 6 | 164, 506, 1012, 1721, 2795, 4957 | 0.9611 | 0.9233 | 1.71 |
| | 7 | 93, 257, 477, 760, 1140, 1717, 2820 | 0.9425 | 0.8857 | 2.11 | | 7 | 143, 427, 833, 1372, 2102, 3206, 5333 | 0.9631 | 0.9258 | 1.45 |
| | 8 | 84, 225, 410, 640, 931, 1320, 1917, 2996 | 0.9448 | 0.8882 | 1.83 | | 8 | 127, 371, 708, 1143, 1700, 2445, 3574, 5647 | 0.9645 | 0.9276 | 1.26 |
| | 9 | 76, 201, 360, 554, 791, 1087, 1486, 2098, 3148 | 0.9467 | 0.8901 | 1.62 | | 9 | 115, 328, 617, 981, 1431, 1998, 2758, 3909, 5920 | 0.9657 | 0.9289 | 1.11 |
| | 10 | 69, 181, 321, 489, 688, 928, 1230, 1638, 2259, 3275 | 0.9481 | 0.8916 | 1.45 | | 10 | 105, 294, 546, 858, 1236, 1694, 2270, 3042, 4204, 6140 | 0.9666 | 0.93 | 0.993 |

TABLE 5

Optimal ladders for HEVC. Left = Network 1, Right = Network 2.

| Content | Ladder N | Bitrates[kbps] | Results for HEVC only clients Q″ | $\overline{Q}$ | ξ | Content | Ladder N | Bitrates[kbps] | Results for HEVC only clients Q″ | $\overline{Q}$ | ξ |
|---|---|---|---|---|---|---|---|---|---|---|---|
| Easy | 2 | 70, 633 | 0.9857 | 0.9803 | 1.04 | Easy | 2 | 116, 1192 | 0.99 | 0.9862 | 0.749 |
| | 3 | 50, 355, 1126 | 0.9896 | 0.9846 | 0.604 | | 3 | 71, 624, 2128 | 0.9928 | 0.9894 | 0.426 |
| | 4 | 50, 271, 722, 1635 | 0.9916 | 0.9863 | 0.433 | | 4 | 52, 416, 1268, 3023 | 0.9941 | 0.9907 | 0.293 |
| | 5 | 50, 224, 544, 1057, 2100 | 0.9927 | 0.9872 | 0.343 | | 5 | 50, 332, 930, 1927, 3943 | 0.9949 | 0.9914 | 0.222 |
| | 6 | 50, 194, 439, 797, 1345, 2458 | 0.9933 | 0.9877 | 0.289 | | 6 | 50, 282, 737, 1433, 2507, 4698 | 0.9954 | 0.9918 | 0.179 |
| | 7 | 50, 173, 371, 646, 1023, 1599, 2735 | 0.9937 | 0.9881 | 0.253 | | 7 | 50, 247, 610, 1139, 1874, 2988, 5174 | 0.9956 | 0.9921 | 0.151 |
| | 8 | 50, 158, 324, 547, 836, 1228, 1833, 2966 | 0.994 | 0.9883 | 0.227 | | 8 | 50, 222, 524, 950, 1512, 2273, 3428, 5598 | 0.9958 | 0.9923 | 0.132 |
| | 9 | 50, 146, 289, 477, 712, 1012, 1418, 2051, 3169 | 0.9942 | 0.9885 | 0.208 | | 9 | 50, 203, 464, 823, 1283, 1872, 2670, 3907, 6150 | 0.996 | 0.9924 | 0.117 |
| | 10 | 50, 137, 263, 424, 622, 865, 1174, 1595, 2250, 3350 | 0.9944 | 0.9887 | 0.193 | | 10 | 50, 189, 416, 724, 1111, 1589, 2196, 3021, 4306, 6511 | 0.9961 | 0.9926 | 0.106 |
| Medium | 2 | 139, 795 | 0.9524 | 0.9339 | 3.19 | Medium | 2 | 229, 1480 | 0.9666 | 0.9534 | 2.33 |
| | 3 | 93, 459, 1275 | 0.9636 | 0.9456 | 1.97 | | 3 | 150, 833, 2420 | 0.9749 | 0.9624 | 1.41 |
| | 4 | 71, 323, 794, 1736 | 0.9696 | 0.951 | 1.41 | | 4 | 113, 575, 1482, 3283 | 0.9789 | 0.9664 | 1 |
| | 5 | 57, 247, 577, 1097, 2152 | 0.9731 | 0.9541 | 1.09 | | 5 | 91, 438, 1074, 2095, 4161 | 0.9817 | 0.9687 | 0.769 |
| | 6 | 50, 202, 453, 815, 1365, 2481 | 0.9752 | 0.9561 | 0.885 | | 6 | 76, 349, 828, 1534, 2612, 4781 | 0.9831 | 0.9701 | 0.621 |
| | 7 | 50, 180, 384, 662, 1041, 1619, 2755 | 0.9767 | 0.9574 | 0.747 | | 7 | 65, 288, 669, 1206, 1945, 3065, 5255 | 0.984 | 0.9711 | 0.521 |
| | 8 | 50, 164, 336, 561, 853, 1246, 1853, 2984 | 0.9777 | 0.9584 | 0.649 | | 8 | 57, 246, 560, 991, 1556, 2318, 3476, 5643 | 0.9847 | 0.9718 | 0.449 |

TABLE 5-continued

Optimal ladders for HEVC. Left = Network 1, Right = Network 2.

| Content | N | Ladder Bitrates[kbps] | Results for HEVC only clients $Q^n$ | $\overline{Q}$ | $\xi$ | Content | N | Ladder Bitrates[kbps] | Results for HEVC only clients $Q^n$ | $\overline{Q}$ | $\xi$ |
|---|---|---|---|---|---|---|---|---|---|---|---|
| | 9 | 50, 152, 299, 489, 725, 1024, 1428, 2051, 3140 | 0.9784 | 0.9591 | 0.576 | | 9 | 52, 216, 485, 848, 1310, 1900, 2697, 3935, 6170 | 0.9854 | 0.9724 | 0.393 |
| | 10 | 50, 142, 272, 436, 635, 878, 1185, 1603, 2247, 3316 | 0.9791 | 0.9596 | 0.519 | | 10 | 51, 197, 430, 739, 1124, 1597, 2195, 3001, 4237, 6331 | 0.9857 | 0.9728 | 0.351 |
| Complex | 2 | 228, 960 | 0.8978 | 0.8559 | 6.62 | Complex | 2 | 374, 1758 | 0.9288 | 0.8986 | 4.89 |
| | 3 | 161, 587, 1456 | 0.9202 | 0.8773 | 4.29 | | 3 | 258, 1045, 2713 | 0.9455 | 0.9155 | 3.1 |
| | 4 | 126, 428, 928, 1923 | 0.9326 | 0.8878 | 3.14 | | 4 | 200, 750, 1707, 3612 | 0.9544 | 0.9235 | 2.25 |
| | 5 | 103, 336, 688, 1224, 2310 | 0.9398 | 0.894 | 2.47 | | 5 | 163, 582, 1253, 2294, 4392 | 0.9596 | 0.9282 | 1.75 |
| | 6 | 88, 276, 546, 919, 1482, 2607 | 0.9441 | 0.898 | 2.03 | | 6 | 138, 473, 986, 1709, 2804, 5004 | 0.9628 | 0.9313 | 1.43 |
| | 7 | 77, 234, 453, 739, 1124, 1708, 2821 | 0.9468 | 0.9009 | 1.72 | | 7 | 120, 397, 808, 1358, 2103, 3227, 5383 | 0.9645 | 0.9334 | 1.21 |
| | 8 | 68, 204, 388, 621, 915, 1310, 1914, 3005 | 0.9488 | 0.9029 | 1.49 | | 8 | 106, 343, 685, 1129, 1698, 2460, 3613, 5718 | 0.9658 | 0.9349 | 1.05 |
| | 9 | 62, 182, 341, 539, 780, 1085, 1497, 2137, 3241 | 0.9512 | 0.9045 | 1.32 | | 9 | 95, 302, 595, 967, 1428, 2009, 2786, 3965, 6009 | 0.9669 | 0.9361 | 0.924 |
| | 10 | 57, 163, 304, 474, 679, 926, 1237, 1663, 2320, 3403 | 0.9526 | 0.9058 | 1.18 | | 10 | 87, 270, 525, 845, 1232, 1703, 2293, 3086, 6258 | 0.9677 | 0.937 | 0.827 |

Several observations can be made in view of Tables 4-6.

First, optimal encoding ladders designed for different networks look different. Encoding ladders designed for Network model 1 exhibit concentration of bitrates in the vicinity of 1 Mbps, corresponding to peak of bandwidth distribution. Encoding ladders designed for Network model 2 exhibit concentration of bitrates in the vicinity of 2 Mbps, corresponding to peak bandwidth distribution.

Second, optimal ladders designed for different content look different. Complex content generally receives streams with higher bitrates allocated, as compared to medium and easy content. Complex content also requires more ladder points to reach small quality gaps. For example, with Network 1 and H.264 main codec, complex content needs eight streams to reach gap <2%. In comparison, medium content needs only four streams, and with easy content two streams are sufficient.

Third, optimal ladders designed for different codecs also do look different. With more efficient codecs, fewer encoding ladder streams are needed. For example, for Network 1, complex content, and quality gap limit of 2%, the encoding ladder for H.264 baseline has nine streams, H.264 main has eight streams, and HEVC has seven streams.

Figure 10:
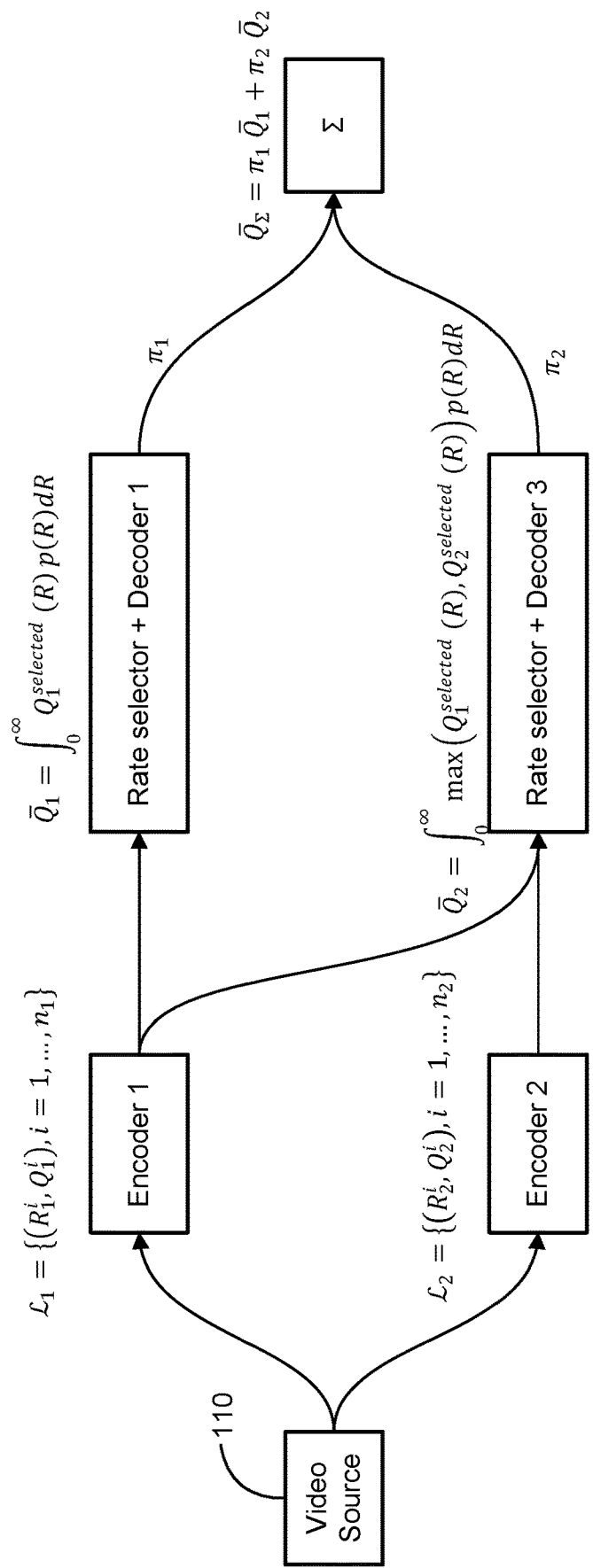
FIG. 10 is a conceptual diagram of a dual-codec ABR streaming system used to obtain experimental results described herein.

Next, a two-codec ABR streaming system is considered, having H.264 baseline and H.264 main, as shown in FIG. 10. Here, there are two types of clients: clients that can only decode H.264 baseline streams (Rate Selector+Decoder 1), and clients that can decode and switch between streams encoded using H.264 baseline and H.264 main codecs (Rate Selector+Decoder 1). The derivation of $\overline{Q}_\Sigma$ in this case is also shown in FIG. 10.

This system is a variant of a problem previously described with respect to FIG. 5, with a caveat that a decoder that can only decode second type of codec (H.264 main) is absent. Such decoder is removed, because in practice, all H.264 main profile decoders are required to be able to decode also H.264 baseline streams.

The examples of optimal encoding ladders constructed for such a system are shown in Tables 7 and 8. In the design of these encoding ladders we have assumed that devices that can only decode H.264 baseline represent 10% of the total population of clients, and 90% can decode both H.264 baseline and H.264 main.

TABLE 6

Optimal 2-codec ladders for H.264 baseline and H.264 main, Network 1.

| Content | N | Ladder bitrates & codecs: H.264 Baseline and Main Baseline | Main | Results for H.264 Baseline-only clients n | $Q_1^n$ | $\overline{Q}_1$ | $\xi_1$ | Results for H264 baseline and main switchable clients n | $Q_2^n$ | $\overline{Q}_2$ | Weighted average across all clients $\xi_2$ | $\overline{Q}_\Sigma$ | $\xi_\Sigma$ |
|---|---|---|---|---|---|---|---|---|---|---|---|---|---|
| Easy | 2 | 76, 658 | | 2 | 0.9821 | 0.9757 | 1.22 | 2 | 0.9821 | 0.9757 | 1.22 | 0.9757 | 1.22 |
| | 3 | 50, 363, 1147 | | 3 | 0.9867 | 0.9807 | 0.715 | 3 | 0.9867 | 0.9807 | 0.715 | 0.9807 | 0.715 |
| | 4 | 50, 277, 738, 1666 | | 4 | 0.9891 | 0.9828 | 0.509 | 4 | 0.9891 | 0.9828 | 0.509 | 0.9828 | 0.509 |
| | 5 | 50, 230, 557, 1078, 2136 | | 5 | 0.9904 | 0.9838 | 0.4 | 5 | 0.9904 | 0.9838 | 0.4 | 0.9838 | 0.4 |
| | 6 | 76, 658 | 50, 280, 745, 1680 | 2 | 0.9821 | 0.9757 | 1.22 | 5 | 0.9911 | 0.9861 | 0.168 | 0.9851 | 0.273 |
| | 7 | 76, 658 | 50, 232, 562, 1087, 2153 | 2 | 0.9821 | 0.9757 | 1.22 | 5 | 0.9922 | 0.9868 | 0.0968 | 0.9857 | 0.209 |
| | 8 | 50, 363, 1147 | 50, 232, 562, 1087, 2153 | 3 | 0.9867 | 0.9807 | 0.715 | 5 | 0.9922 | 0.9868 | 0.0968 | 0.9862 | 0.159 |
| | 9 | 50, 363, 1147 | 50, 200, 454, 821, 1380, 2511 | 3 | 0.9867 | 0.9807 | 0.715 | 7 | 0.9928 | 0.9874 | 0.0417 | 0.9867 | 0.109 |

TABLE 6-continued

Optimal 2-codec ladders for H.264 baseline and H.264 main, Network 1.

| Content | N | Ladder bitrates & codecs: H.264 Baseline and Main | | | Results for H.264 Baseline-only clients | | | | Results for H264 baseline and main switchable clients | | | | Weighted average across all clients | |
|---|---|---|---|---|---|---|---|---|---|---|---|---|---|---|
| | | Baseline | Main | n | $Q_1^n$ | $\overline{Q}_1$ | $\xi_1$ | n | $Q_2^n$ | $\overline{Q}_2$ | $\xi_2$ | $\overline{Q}_\Sigma$ | $\xi_\Sigma$ |
| | 10 | 50, 363, 1147 | 50, 179, 384, 667, 1052, 1640, 2787 | 3 | 0.9867 | 0.9807 | 0.715 | 8 | 0.9932 | 0.9877 | 0.0102 | 0.987 | 0.0807 |
| Medium | 2 | 179, 874 | | 2 | 0.9279 | 0.8995 | 4.69 | 2 | 0.9279 | 0.8995 | 4.69 | 0.8995 | 4.69 |
| | 3 | 123, 520, 1362 | | 3 | 0.9441 | 0.9157 | 2.97 | 3 | 0.9441 | 0.9157 | 2.97 | 0.9157 | 2.97 |
| | 4 | 344 | 114, 489, 1304 | 1 | 0.8791 | 0.8466 | 10.3 | 4 | 0.957 | 0.935 | 2.32 | 0.9262 | 3.11 |
| | 5 | 179, 874 | 114, 489, 1304 | 2 | 0.9279 | 0.8995 | 4.69 | 5 | 0.957 | 0.9348 | 2.35 | 0.9312 | 2.58 |
| | 6 | 179, 874 | 88, 348, 815, 1750 | 2 | 0.9279 | 0.8995 | 4.69 | 5 | 0.9643 | 0.9407 | 1.72 | 0.9366 | 2.02 |
| | 7 | 179, 874 | 71, 268, 595, 1108, 2149 | 2 | 0.9279 | 0.8995 | 4.69 | 6 | 0.9687 | 0.9444 | 1.34 | 0.9399 | 1.67 |
| | 8 | 179, 874 | 60, 217, 465, 821, 1362, 2464 | 2 | 0.9279 | 0.8995 | 4.69 | 7 | 0.9714 | 0.9465 | 1.12 | 0.9418 | 1.47 |
| | 9 | 123, 520, 1362 | 60, 217, 465, 821, 1362, 2464 | 3 | 0.9441 | 0.9157 | 2.97 | 8 | 0.9714 | 0.9466 | 1.11 | 0.9435 | 1.29 |
| | 10 | 123, 520, 1362 | 53, 182, 381, 653, 1024, 1591, 2713 | 3 | 0.9441 | 0.9157 | 2.97 | 8 | 0.9731 | 0.9483 | 0.939 | 0.945 | 1.14 |
| Complex | 2 | 284, 1053 | | 2 | 0.8636 | 0.8053 | 8.86 | 2 | 0.8636 | 0.8053 | 8.86 | 0.8053 | 8.86 |
| | 3 | 205, 660, 1558 | | 3 | 0.893 | 0.8317 | 5.87 | 3 | 0.893 | 0.8317 | 5.87 | 0.8317 | 5.87 |
| | 4 | 495 | 190, 625, 1496 | 1 | 0.7881 | 0.73 | 17.4 | 4 | 0.9117 | 0.8616 | 4.77 | 0.8484 | 6.01 |
| | 5 | 284, 1053 | 190, 625, 1496 | 2 | 0.8636 | 0.8053 | 8.86 | 5 | 0.9117 | 0.8626 | 4.66 | 0.8569 | 5.07 |
| | 6 | 284, 1053 | 150, 460, 959, 1950 | 2 | 0.8636 | 0.8053 | 8.86 | 5 | 0.926 | 0.8725 | 3.57 | 0.8658 | 4.09 |
| | 7 | 284, 1053 | 124, 364, 715, 1246, 2322 | 2 | 0.8636 | 0.8053 | 8.86 | 7 | 0.9343 | 0.8794 | 2.8 | 0.872 | 3.4 |
| | 8 | 284, 1053 | 106, 301, 571, 940, 1497, 2609 | 2 | 0.8636 | 0.8053 | 8.86 | 7 | 0.9393 | 0.8828 | 2.44 | 0.875 | 3.07 |
| | 9 | 205, 660, 1558 | 106, 301, 571, 940, 1497, 2609 | 3 | 0.893 | 0.8317 | 5.87 | 7 | 0.9393 | 0.8834 | 2.37 | 0.8782 | 2.71 |
| | 10 | 205, 660, 1558 | 93, 257, 477, 760, 1140, 1717, 2820 | 3 | 0.893 | 0.8317 | 5.87 | 9 | 0.9425 | 0.8865 | 2.02 | 0.881 | 2.4 |

TABLE 7

Optimal 2-codec ladders for H.264 baseline and H.264 main, Network 2.

| Content | N | Ladder bitrates & codecs: H.264 Baseline and Main | | | Results for H.264 Baseline-only clients | | | | Results for H264 baseline and main switchable clients | | | | Weighted average across all clients | |
|---|---|---|---|---|---|---|---|---|---|---|---|---|---|---|
| | | Baseline | Main | n | $Q_1^n$ | $\overline{Q}_1$ | $\xi_1$ | n | $Q_2^n$ | $\overline{Q}_2$ | $\xi_2$ | $\overline{Q}_\Sigma$ | $\xi_\Sigma$ |
| Easy | 2 | 126, 1243 | | 2 | 0.9872 | 0.9827 | 0.894 | 2 | 0.9872 | 0.9827 | 0.894 | 0.9827 | 0.894 |
| | 3 | 78, 661, 2198 | | 3 | 0.9906 | 0.9864 | 0.515 | 3 | 0.9906 | 0.9864 | 0.515 | 0.9864 | 0.515 |
| | 4 | 58, 444, 1322, 3115 | | 4 | 0.9922 | 0.988 | 0.356 | 4 | 0.9922 | 0.988 | 0.356 | 0.988 | 0.356 |
| | 5 | 50, 342, 955, 1970, 4019 | | 5 | 0.9932 | 0.9889 | 0.269 | 5 | 0.9932 | 0.9889 | 0.269 | 0.9889 | 0.269 |
| | 6 | 126, 1243 | 51, 429, 1309, 3108 | 2 | 0.9872 | 0.9827 | 0.894 | 6 | 0.9935 | 0.9904 | 0.114 | 0.9896 | 0.192 |
| | 7 | 126, 1243 | 50, 347, 968, 1992, 4060 | 2 | 0.9872 | 0.9827 | 0.894 | 6 | 0.9944 | 0.991 | 0.056 | 0.9902 | 0.14 |
| | 8 | 78, 661, 2198 | 50, 347, 968, 1992, 4060 | 3 | 0.9906 | 0.9864 | 0.515 | 6 | 0.9944 | 0.991 | 0.0567 | 0.9905 | 0.103 |
| | 9 | 78, 661, 2198 | 50, 294, 769, 1485, 2582, 4815 | 3 | 0.9906 | 0.9864 | 0.515 | 8 | 0.9948 | 0.9914 | 0.0186 | 0.9909 | 0.0683 |
| | 10 | 78, 661, 2198 | 50, 258, 639, 1186, 1942, 3087, 5337 | 3 | 0.9906 | 0.9864 | 0.515 | 7 | 0.9951 | 0.9916 | −0.00341 | 0.9911 | 0.0484 |
| Medium | 2 | 295, 1616 | | 2 | 0.9494 | 0.929 | 3.45 | 2 | 0.9494 | 0.929 | 3.45 | 0.929 | 3.45 |
| | 3 | 199, 937, 2569 | | 3 | 0.9615 | 0.9416 | 2.15 | 3 | 0.9615 | 0.9416 | 2.15 | 0.9416 | 2.15 |
| | 4 | 500 | 181, 875, 2452 | 1 | 0.9013 | 0.8836 | 8.18 | 4 | 0.9713 | 0.9567 | 1.62 | 0.9493 | 2.27 |
| | 5 | 295, 1616 | 181, 875, 2452 | 2 | 0.9494 | 0.929 | 3.45 | 5 | 0.9713 | 0.9563 | 1.65 | 0.9536 | 1.83 |
| | 6 | 295, 1616 | 138, 610, 1510, 3318 | 2 | 0.9494 | 0.929 | 3.45 | 5 | 0.9764 | 0.9607 | 1.2 | 0.9576 | 1.42 |
| | 7 | 295, 1616 | 112, 465, 1090, 2090, 4107 | 2 | 0.9494 | 0.929 | 3.45 | 6 | 0.9794 | 0.9634 | 0.924 | 0.9599 | 1.17 |
| | 8 | 295, 1616 | 93, 372, 842, 1530, 2580, 4676 | 2 | 0.9494 | 0.929 | 3.45 | 7 | 0.9811 | 0.9649 | 0.765 | 0.9613 | 1.03 |
| | 9 | 199, 937, 2569 | 93, 372, 842, 1530, 2580, 4676 | 3 | 0.9615 | 0.9416 | 2.15 | 8 | 0.9811 | 0.965 | 0.76 | 0.9626 | 0.898 |

TABLE 7-continued

Optimal 2-codec ladders for H.264 baseline and H.264 main, Network 2.

| Content | N | Ladder bitrates & codecs: H.264 Baseline and Main | | Results for H.264 Baseline-only clients | | | | Results for H264 baseline and main switchable clients | | | | Weighted average across all clients | |
|---|---|---|---|---|---|---|---|---|---|---|---|---|---|
| | | Baseline | Main | n | $Q_1''$ | $\overline{Q}_1$ | $\xi_1$ | n | $Q_2''$ | $\overline{Q}_2$ | $\xi_2$ | $\overline{Q}_\Sigma$ | $\xi_\Sigma$ |
| | 10 | 199, 937, 2569 | 80, 309, 681, 1202, 1920, 3003, 5100 | 3 | 0.9615 | 0.9416 | 2.15 | 8 | 0.9821 | 0.9661 | 0.641 | 0.9637 | 0.79 |
| Complex | 2 | 463, 1904 | | 2 | 0.9058 | 0.8634 | 6.56 | 2 | 0.9058 | 0.8634 | 6.56 | 0.8634 | 6.56 |
| | 3 | 327, 1161, 2864 | | 3 | 0.9276 | 0.8847 | 4.25 | 3 | 0.9276 | 0.8847 | 4.25 | 0.8847 | 4.25 |
| | 4 | 256, 845, 1821, 3760 | | 4 | 0.9395 | 0.8953 | 3.11 | 4 | 0.9395 | 0.8953 | 3.11 | 0.8953 | 3.11 |
| | 5 | 463, 1904 | 300, 1096, 2750 | 2 | 0.9058 | 0.8634 | 6.56 | 5 | 0.9415 | 0.9085 | 3.29 | 0.904 | 3.61 |
| | 6 | 463, 1904 | 234, 791, 1737, 3616 | 2 | 0.9058 | 0.8634 | 6.56 | 5 | 0.9516 | 0.9159 | 2.5 | 0.9107 | 2.9 |
| | 7 | 463, 1904 | 193, 618, 1280, 2302, 4360 | 2 | 0.9058 | 0.8634 | 6.56 | 7 | 0.9575 | 0.9211 | 1.94 | 0.9153 | 2.4 |
| | 8 | 463, 1904 | 164, 506, 1012, 1721, 2795, 4957 | 2 | 0.9058 | 0.8634 | 6.56 | 7 | 0.9611 | 0.9236 | 1.67 | 0.9176 | 2.15 |
| | 9 | 327, 1161, 2864 | 164, 506, 1012, 1721, 2795, 4957 | 3 | 0.9276 | 0.8847 | 4.25 | 7 | 0.9611 | 0.924 | 1.63 | 0.9201 | 1.89 |
| | 10 | 327, 1161, 2864 | 143, 427, 833, 1372, 2102, 3206, 5333 | 3 | 0.9276 | 0.8847 | 4.25 | 9 | 0.9631 | 0.9263 | 1.39 | 0.9221 | 1.67 | the results presented in Tables 7 and 8 contradict the common belief that H.264 baseline encodings must always be placed at the lowest rates (and resolutions) in the encoding ladder, and that H.264 main profile encodings must always be done for highest rate (and resolution) streams. Moreover, according to Tables 7 and 8, optimal ladders may not include H.264 main streams at all. This happens, for example, for cases of "Easy" content, and when the number of renditions is less than six. This also happens for "Medium" and "Complex" content as well, albeit for case with fewer streams allowed.

Additionally, according to Tables 7 and 8, at points where there is a switch between single-codec to dual-codec ladders (such as the case of n=4, Medium content), the single H.264 baseline stream is not assigned to the lowest bitrate available. Instead, it is placed in the middle rate, maximizing the total average quality that can be delivered to H.264 baseline clients. With n>=5, and 2 streams allocated to H.264 baseline, their rates again are not placed at the lowest bitrates. Instead, they are placed at intermediate points between rates allocated to H.264 main, such that both types of clients can use them in a meaningful way.

Figure 11:
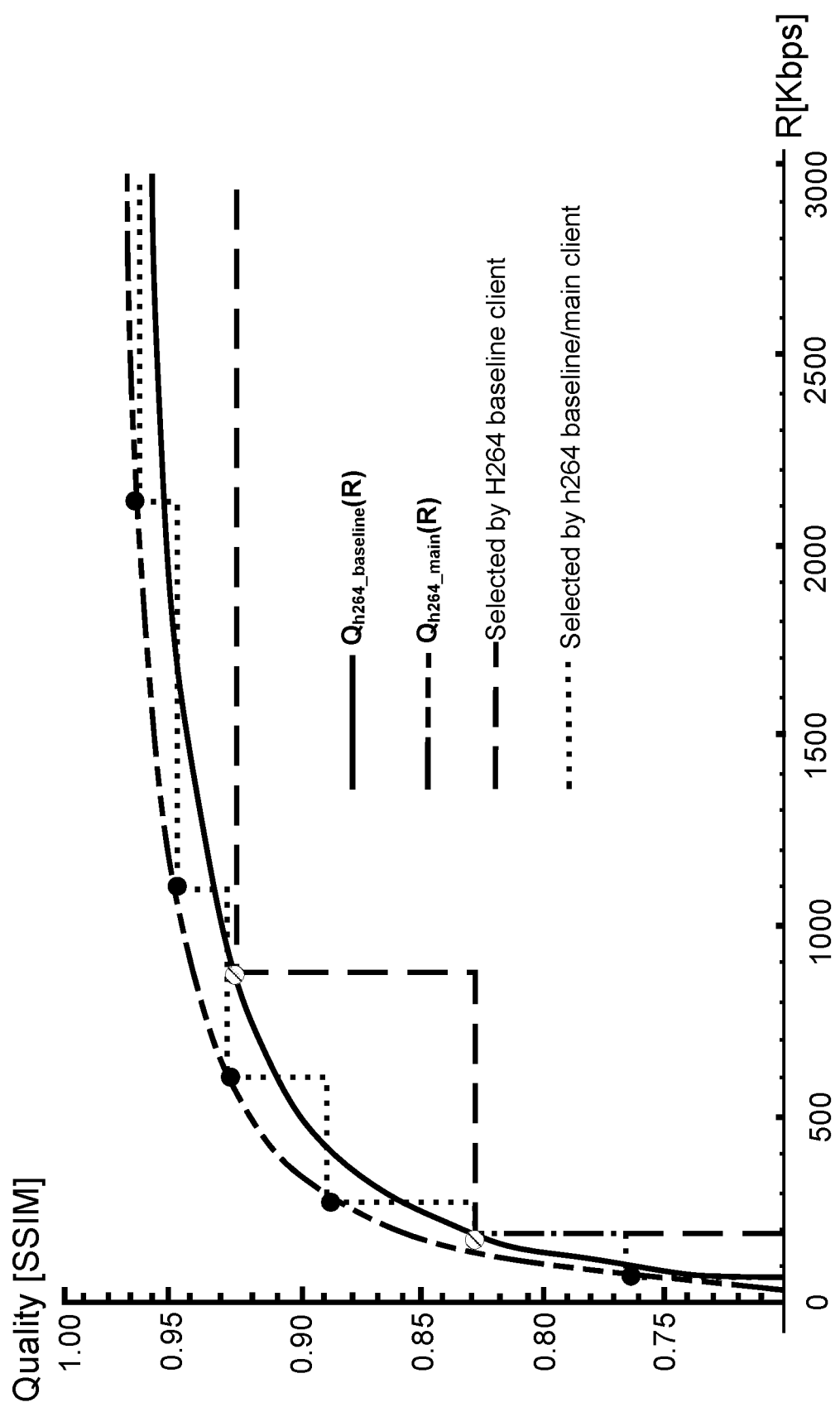
FIG. 11 is a graph showing the encoding ladder points and switching decisions made by H.264 baseline and H.264 baseline/main switchable clients.

FIG. 11 is a graph showing the encoding ladder points and switching decisions made by H.264 baseline and H.264 baseline/main switchable clients. The ladder points in this case correspond to an encoding ladder with eight streams designed for "Medium" content, Network 1 (table 7). This ladder includes 179 and 874 kbps streams encoded by H.264 baseline, and 60, 217, 465, 821, 1362, and 2464 kbps streams encoded by H.264 main.

As further follows from FIG. 11, the client that can only use H.264 baseline, uses both 179 and 874 kbps streams encoded by such codec. At the same time, the client that can decode both H.264 baseline and H.264 main, selects six rates encoded using H.264 main, and 1 rate at 179 kbps, encoded by H.264 baseline. This composition of seven rates allows this client to achieve best quality during streaming.

Again, the selection of only a subset of H.264 baseline streams, and not placement of all such streams at the beginning of the ladder is something that is new, not obvious, and shows that existing practice of allocating rates to H.264 baseline and H.264 main profiles is suboptimal.

Figure 12:
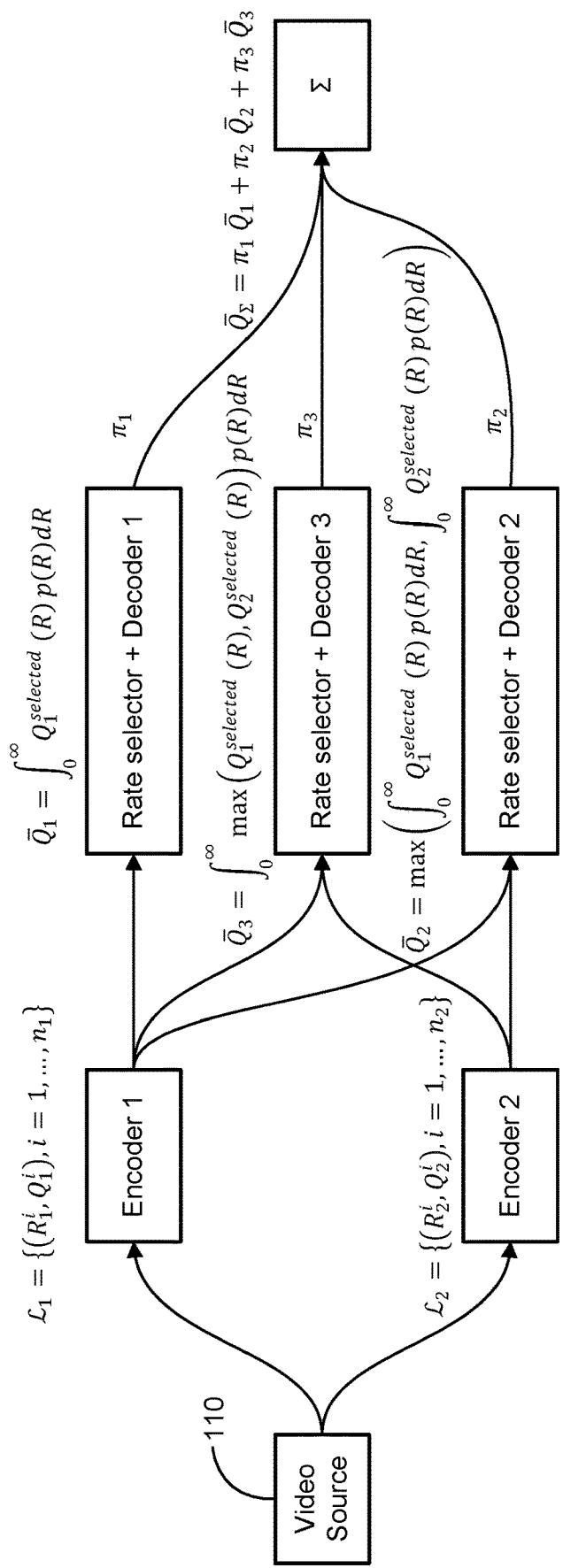
FIG. 12 is a conceptual diagram of a dual-codec ABR streaming system with three client types, used to obtain experimental results described herein.

Next, a two-codec ABR streaming system with three types of clients, as shown in FIG. 12 is considered. As illustrated, the three types of clients are (i) clients that can only decode H.264 streams (Rate Selector+Decoder 1)(e.g., web layers on PCs), (ii) clients that can decode either H.264 streams or HEVC streams, but cannot switch between them (Rate Selector+Decoder 2)(e.g., DASH players on Android™ devices, smart TVs), and (iii) clients that can decode and switch between H.264 and HEVC streams (Rate Selector+Decoder 3)(e.g., native HLS players on recent Apple devices).

The optimization problem in this case is identical to the problem defined in equation (17), except that quality achievable by decoder 2 now becomes:

$$\overline{Q}_2 = \max(\int_0^\infty Q_1^{selected}(R)p(R)dR, \int_0^\infty Q_2^{selected}(R)p(R)dR) \quad (37)$$

According to this max operation, if quality achievable by using second codec (HEVC) is less than one of the first codec (H.264), then it will send H.264 encoded streams to such device.

The system diagram describing derivation of $\overline{Q}_\Sigma$ in this case is shown in FIG. 12.

The examples of optimal ladders constructed for such system are shown in Tables 9-14. For compactness, only the results for Network model 1 are included. However, several different distributions of clients of each kind are considered. Tables 9-11 consider cases when switchable clients represent half of the population of HEVC-capable clients, and Tables 12-14 consider cases when switchable clients are absent.

TABLE 8

Optimal 2-codec ladders. Clients: H264: 30%, H264 or HEVC: 35%, H264/HEVC switchable: 35%.

| Content | N | Ladder bitrates & codecs: H.264 and HEVC | | Results for H.264-only clients | | | | Results for HEVC- or H.264-only clients | |
|---|---|---|---|---|---|---|---|---|---|
| | | H.264 | HEVC | n | $Q_1''$ | $\overline{Q}_1$ | $\xi_1$ | n | $Q_2''$ |
| Easy | 2 | 66, 636 | | 2 | 0.9854 | 0.9804 | 0.98 | 2 | 0.9854 |
| | 3 | 50, 366, 1155 | | 3 | 0.9892 | 0.9844 | 0.573 | 3 | 0.9892 |
| | 4 | 50, 280, 745, 1680 | | 4 | 0.9911 | 0.986 | 0.413 | 4 | 0.9911 |
| | 5 | 50, 232, 562, 1087, 2153 | | 5 | 0.9922 | 0.9868 | 43.329 | 5 | 0.9922 |
| | 6 | 50, 200, 454, 821, 1380, 2511 | | 6 | 0.9928 | 0.9873 | 0.278 | 6 | 0.9928 |
| | 7 | 50, 179, 384, 667, 1052, 1640, 2787 | | 7 | 0.9932 | 0.9877 | 0.245 | 7 | 0.9932 |
| | 8 | 50, 163, 336, 566, 862, 1262, 1880, 3020 | | 8 | 0.9934 | 0.9879 | 0.22 | 8 | 0.9934 |
| | 9 | 50, 151, 300, 494, 735, 1042, 1457, 2103, 3225 | | 9 | 0.9937 | 0.9881 | 0.202 | 9 | 0.9937 |
| | 10 | 50, 141, 272, 440, 644, 893, 1207, 1638, 2305, 3406 | | 10 | 0.9938 | 0.9882 | 0.188 | 10 | 0.9938 |
| | 11 | 50, 133, 250, 397, 574, 784, 1038, 1362, 1808, 2488, 3567 | | 11 | 0994 | 0.9883 | 0.177 | 11 | 0.994 |
| | 12 | 50, 127, 233, 363, 519, 700, 915, 1175, 1507, 1967, 2653, 3712 | | 12 | 0.9941 | 0.9884 | 0.168 | 12 | 0.9941 |
| Medium | 2 | 167, 836 | | 2 | 0.9431 | 0.9182 | 4.08 | 2 | 0.9431 |
| | 3 | 114, 449, 1304 | | 3 | 0957 | 0.9328 | 2.56 | 3 | 0.957 |
| | 4 | 88, 348, 815, 1750 | | 4 | 0.9643 | 0.9396 | 1.84 | 4 | 0.9643 |
| | 5 | 71, 268, 595, 1108, 2149 | | 5 | 0.9687 | 0.9436 | 1.43 | 5 | 0.9687 |
| | 6 | 60, 217, 465, 821, 1362, 2464 | | 6 | 0.9714 | 0.9461 | 1.16 | 6 | 0.9714 |
| | 7 | 53, 182, 381, 653, 1024, 1591, 2713 | | 7 | 0.9731 | 0.9479 | 0.98 | 7 | 0.9731 |
| | 8 | 50, 163, 329, 549, 834, 1219, 1813, 2935 | | 8 | 0.9744 | 0.9491 | 0.848 | 8 | 0.9744 |
| | 9 | 50, 151, 294, 479, 711, 1004, 1403, 2021, 3129 | | 9 | 0.9754 | 0.9501 | 0.748 | 9 | 0.9754 |
| | 10 | 813, 348, 815, 1750 | 50, 202, 453, 815, 1365, 2481 | 4 | 0.9643 | 0.9396 | 1.84 | 6 | 0.9752 |
| | 11 | 71, 268, 595, 1108, 2149 | 50, 202, 453, 815, 1365, 2481 | 5 | 0.9687 | 0.9436 | 1.43 | 6 | 0.9752 |
| | 12 | 71, 268, 595, 1108, 2149 | 50, 180, 384, 662, 1041, 1619, 2755 | 5 | 0.9687 | 0.9436 | 1.43 | 7 | 0.9767 |
| Complex | 2 | 265, 1009 | | 2 | 0.8856 | 0.8334 | 7.89 | 2 | 0.8856 |
| | 3 | 190, 625, 1496 | | 3 | 0.9117 | 0.8579 | 5.18 | 3 | 0.9117 |
| | 4 | 150, 460, 959, 1950 | | 4 | 0.926 | 0.8703 | 3.81 | 4 | 0.926 |
| | 5 | 124, 364, 715, 1246, 2322 | | 5 | 0.9343 | 0.8776 | 3 | 5 | 0.9343 |
| | 6 | 106, 301, 571, 440, 1497, 2609 | | 6 | 0.9393 | 0.8824 | 2.48 | 6 | 0.9393 |
| | 7 | 93, 257, 477, 760, 1140, 1717, 2820 | | 7 | 0.942.5 | 0.8857 | 2.11 | 7 | 0.9425 |
| | 8 | 84, 225, 410, 640, 931, 1320, 1917, 2996 | | 8 | 0.9448 | 0.8882 | 1.83 | 8 | 0.9448 |
| | 9 | 76, 201, 360, 554, 791, 1087, 1486, 2098, 3148 | | 9 | 0.9467 | 0.8901 | 1.62 | 9 | 0.9467 |
| | 10 | 69, 181, 321, 489, 688, 928, 1230, 1638, 2259, 3275 | | 10 | 0.9481 | 0.8916 | 1.45 | 10 | 0.9481 |
| | 11 | 64, 165, 290, 438, 610, 812, 1056, 1362, 1779, 2406, 3387 | | 11 | 0.9493 | 0.8929 | 1.32 | 11 | 0.9493 |
| | 12 | 124, 364, 715, 1246, 2322 | 77, 234, 453, 739, 1124, 1708, 2821 | 5 | 0.9343 | 0.8776 | 3 | 7 | 0.9468 |

TABLE 8-continued

Optimal 2-codec ladders. Clients: H264: 30%, H264 or HEVC: 35%, H264/HEVC switchable: 35%.

| Content | N | Results for HEVC- or H.264-only clients | | Results for HEVC/H264 switchable clients | | | Weighted average across all clients | |
|---|---|---|---|---|---|---|---|---|
| | | $\overline{Q}_2$ | $\xi_2$ | n | $Q_3''$ | $\overline{Q}_3$ | $\xi_3$ | $\overline{Q}_\Sigma$ | $\xi_\Sigma$ |
| Easy | 2 | 0.9804 | 0.98 | 2 | 0.9854 | 0.9804 | 0.98 | 0.9804 | 0.98 |
| | 3 | 0.9844 | 0.573 | 3 | 0.9892 | 0.9844 | 0.573 | 0.9844 | 0.573 |
| | 4 | 0.986 | 0.413 | 4 | 0.9911 | 0.986 | 0.413 | 0.986 | 0.413 |
| | 5 | 0.9868 | 0.329 | 5 | 0.9922 | 0.9868 | 0.329 | 0.9868 | 0329 |
| | 6 | 0.9873 | a 278 | 6 | 0.9928 | 0.9873 | 0.278 | 0.9873 | 0.278 |
| | 7 | 0.9877 | 0.245 | 7 | 0.9932 | 0.9877 | 6.245 | 0.9877 | 0.245 |
| | 8 | 0.9879 | 0.22 | 8 | 0.9934 | 0.9879 | 0.22 | 0.9.879 | 0.22 |
| | 9 | 0.9881 | 0.202 | 9 | 0.9937 | 0.9881 | 0.202 | 0.9.881 | 0.202 |
| | 10 | 0.9882 | 0.1138 | 10 | 0.9938 | 0.9882 | 0.188 | 0.9882 | 0.188 |
| | 11 | 0.9883 | 0.188 | 11 | 0.994 | 0.9883 | 0.177 | 0.9883 | 0.181 |
| | 12 | 0.9884 | 0.168 | 12 | 0.9941 | 0.9884 | 0.168 | 0.9.884 | 0.168 |
| Medium | 2 | 0.9182 | 4.08 | 2 | 0.9431 | 0.9182 | 4.08, | 0.9182 | 4.08 |
| | 3 | 0.9328 | 156 | 3 | 0.957 | 0.9328 | 156 | 0.9328 | 2.56 |
| | 4 | 0.9396 | 1.84 | 4 | 0.9643 | 0.9396 | 1.84 | 0.9396 | 1.84 |
| | 5 | 0.9436 | 1.43 | 5 | 0.9687 | 0.9436 | 1.43 | 0.9436 | 1.43 |
| | 6 | 0.9361 | 1.16 | 6 | 0.9714 | 0.9461 | 1.16 | 0.9461 | 1.16 |
| | 7 | 0.9479 | 0.98 | 7 | 0.9731 | 0.9479 | 0.98 | 0.9479 | 0.98 |
| | 8 | 0.9491 | 0.848 | 8 | 0.9744 | 0.9491 | 0.848 | 0.9491 | 0.848 |
| | 9 | 0.9501 | 0.748 | 9 | 0.9754 | 0.9501 | 0.748 | 0.9501 | 0.748 |
| | 10 | 0.9561 | 0.885 | 7 | 0.9752 | 0.9562 | 0.875 | 0.9512 | 1.17 |
| | 11 | 0.9561 | 0.885 | 7 | 0.9752 | 0.9564 | 0.859 | 0.9524 | 1.04 |
| | 12 | 0.9574 | 0.747 | 9 | 0.9767 | 0.9575 | 0.739 | 0.9533 | 0.949 |
| Complex | 2 | 0.8334 | 7.89 | 2 | 0.8856 | 0.8334 | 7.89 | 0.8334 | 7.89 |
| | 3 | 0.8579 | 5.18 | 3 | 0.9117 | 0.8579 | 5.1& | 0.8579 | 5.18 |
| | 4 | 0.8703 | 3.81 | 4 | 0.926 | 0.&703 | 3.81 | 0.8703 | 3.81 |
| | 5 | 0.8776 | 3 | 5 | 0.9343 | 0.8776 | 3 | 0.8776 | 3 |
| | 6 | 0.8824 | 2.48 | 6 | 0.9393 | 0.8824 | 2.44 | 0.8824 | 2.48 |
| | 7 | 0.8857 | 2.11 | 7 | 0.9425 | 0.8857 | 2.11 | 0.8857 | 2.11 |
| | 8 | 0.8882 | 1.83 | 8 | 0.9448 | 0.8882 | 1.83 | 0.8882 | 1.83 |
| | 9 | 0.8901 | 1.62 | 9 | 0.9467 | 0.8901 | 1.62 | 0.8901 | 1.62 |
| | 10 | 0.8916 | 1.45 | 10 | 0.9481 | 0.8916 | 1.45 | 0.8916 | 1.45 |
| | 11 | 0.8929 | 1.45 | 11 | 0.9493 | 0.8929 | 1.32 | 0.8929 | 1.36 |
| | 12 | 0.9009 | 1.72 | 11 | 0.9468 | 0.9018 | 1.62 | 0.8942 | 2.07 |

TABLE 9

Optimal 2-codec ladders. Clients: H264: 20%, H264 or HEVC: 40%, H264/HEVC switchable: 40%.

| Content | N | Ladder Bitrates & Codecs: H.264 and HEVC | | Results for H.264-only clients | | | Results for HEVC- or H.264-only clients | |
|---|---|---|---|---|---|---|---|---|
| | | H.264 | HEVC | n | $Q_1''$ | $\overline{Q}_1$ | $\xi_1$ | n | $Q_2''$ |
| Easy | 2 | 66, 636 | | 2 | 0.9854 | 0.9804 | 0.98 | 2 | 0.9854 |
| | 3 | 50, 366, 1155 | | 3 | 0.9892 | 0.9844 | 0.573 | 3 | 0.9892 |
| | 4 | 50, 280, 745, 1680 | | 4 | 0.9911 | 0.986 | 0.413 | 4 | 0.9911 |
| | 5 | 50, 232, 462, 1087, 2153 | | 5 | 0.9922 | 0.9868 | 0.329 | 5 | 0.9922 |
| | 6 | 50, 200, 454, 821, 1380, 2511 | | 6 | 0.9928 | 0.9873 | 0.278 | 6 | 0.9928 |
| | 7 | 50, 179, 384, 667, 1052, 1640, 2787 | | 7 | 0.9932 | 0.9877 | 0.245 | 7 | 0.9932 |
| | 8 | 50, 163, 336, 566, 862, 1262, 1880, 3020 | | 8 | 0.9934 | 0.9879 | 0.22 | 8 | 0.9934 |
| | 9 | 50, 151, 300, 494, 735, 1042, 1457, 2103, 3225 | | 9 | 0.9937 | 0.9881 | 0.202 | 9 | 0.9937 |
| | 10 | 50, 141, 272, 440, 644, 893, 1207, 1638, 2305, 3406 | | 10 | 0.9938 | 0.9882 | 0.188 | 10 | 0.9938 |
| | 11 | 50, 133, 250, 397, 574, 784, 1038, 1362, 1808, 2488, 3567 | | 11 | 0.994 | 0.9883 | 0.177 | 11 | 0.994 |
| | 12 | 50, 127, 233, 363, 519, 700, 915, 1175, 1507, 1967, 2653, 3712 | | 12 | 0.9941 | 0.9884 | 0.168 | 12 | 0.9941 |
| Medium | 2 | 167, 836 | | 2 | 0.9431 | 0.9182 | 4.08 | 2 | 0.9431 |
| | 3 | 114, 489, 1304 | | 3 | 0.957 | 0.9328 | 2.56 | 3 | 0.957 |
| | 4 | 88, 348, 815, 1750 | | 4 | 0.9643 | 0.9396 | 1.84 | 4 | 0.9643 |
| | 5 | 71, 268, 595, 1108, 2149 | | 5 | 0.9687 | 0.9461 | 1.43 | 5 | 0.9687 |

TABLE 9-continued

Optimal 2-codec ladders. Clients: H264: 20%, H264 or HEVC: 40%, H264/HEVC switchable: 40%.

|  |  |  |  |  |  |  |  |  |
|---|---|---|---|---|---|---|---|---|
|  | 6 | 60, 217, 465, 821, 1362, 2464 |  | 6 | 0.9714 | 0.9479 | 1.16 | 6 | 0.9714 |
|  | 7 | 53, 182, 381, 653, 1024, 1591, 2713 |  | 7 | 0.9731 | 0.9479 | 0.98 | 7 | 0.9731 |
|  | 8 | 114, 489, 1304 | 57, 247, 577, 1097, 2152 | 3 | 0.957 | 0.9328 | 2.56 | 5 | 0.9731 |
|  | 9 | 114, 489, 1304 | 50, 202, 453, 815, 1365, 2481 | 3 | 0.957 | 0.9328 | 2.56 | 6 | 0.9752 |
|  | 10 | 88, 348, 815, 1750 | 50, 202, 453, 815, 1365, 2481 | 4 | 0.9643 | 0.9396 | 1.84 | 6 | 0.9752 |
|  | 11 | 88, 348, 815, 1750 | 50, 180, 384, 662, 1041, 1619, 2755 | 4 | 0.9643 | 0.9396 | 1.84 | 7 | 0.9767 |
|  | 12 | 71, 268, 595, 1108, 2149 | 50, 180, 384, 662, 1041, 1619, 2755 | 5 | 0.9687 | 0.9436 | 1.43 | 7 | 0.9767 |
| Complex | 2 | 265, 1009 |  | 2 | 0.8856 | 0.8334 | 7.89 | 2 | 0.8856 |
|  | 3 | 190, 625, 1496 |  | 3 | 0.9117 | 0.8579 | 5.18 | 3 | 0.9117 |
|  | 4 | 150, 460, 959, 1950 |  | 4 | 0.926 | 0.8703 | 3.81 | 4 | 0.926 |
|  | 5 | 124, 364, 715, 1246, 2322 |  | 5 | 0.9343 | 0.8776 | 3 | 5 | 0.9343 |
|  | 6 | 106, 301, 571, 940, 1497, 2609 |  | 6 | 0.9393 | 0.8824 | 2.48 | 6 | 0.9393 |
|  | 7 | 93, 257, 477, 760, 1140, 1717, 2820 |  | 7 | 0.9425 | 0.8857 | 2.11 | 7 | 0.9425 |
|  | 8 | 84, 225, 410, 640, 931, 1320, 1917, 2996 |  | 8 | 0.9448 | 0.8882 | 1.83 | 8 | 0.9448 |
|  | 9 | 190, 625, 1496 | 88, 276, 564, 919, 1482, 2607 | 3 | 0.9117 | 0.8579 | 5.18 | 6 | 0.9441 |
|  | 10 | 150, 460, 959, 1950 | 88, 276, 564, 919, 1482, 2607 | 4 | 0.926 | 0.8703 | 3.81 | 6 | 0.9441 |
|  | 11 | 150, 460, 959, 1950 | 77, 234, 453, 739, 1124, 1708, 2821 | 4 | 0.926 | 0.8703 | 3.81 | 7 | 0.9468 |
|  | 12 | 124, 364, 715, 1246, 2322 | 77, 234, 453, 739, 1124, 1708, 2821 | 5 | 0.9343 | 0.8776 | 3 | 7 | 0.9468 |

| Content | N | Results for HEVC- or H.264-only clients | | Results for HEVC/H264 switchable clients | | | | Weighted average across all clients | |
|---|---|---|---|---|---|---|---|---|---|
|  |  | $\overline{Q}_2$ | $\xi_2$ | n | $Q_3''$ | $\overline{Q}_3$ | $\xi_3$ | $\overline{Q}_\Sigma$ | $\xi_\Sigma$ |
| Easy | 2 | 0.9804 | 0.98 | 2 | 0.9854 | 0.9804 | 0.98 | 0.9804 | 0.98 |
|  | 3 | 0.9844 | 0.573 | 3 | 0.9892 | 0.9844 | 0.573 | 0.9844 | 0.573 |
|  | 4 | 0.986 | 0.413 | 4 | 0.9911 | 0.986 | 0.413 | 0.986 | 0.413 |
|  | 5 | 0.9868 | 0.329 | 5 | 0.9922 | 0.9868 | 0.329 | 0.9868 | 0.329 |
|  | 6 | 0.9873 | 0.278 | 6 | 0.9928 | 0.9873 | 0.278 | 0.9873 | 0.278 |
|  | 7 | 0.9877 | 0.245 | 7 | 0.9932 | 0.9877 | 0.245 | 0.9877 | 0.245 |
|  | 8 | 0.9879 | 0.22 | 8 | 0.9934 | 0.9879 | 0.22 | 0.9879 | 0.22 |
|  | 9 | 0.9881 | 0.202 | 9 | 0.9937 | 0.9881 | 0.202 | 0.9881 | 0.202 |
|  | 10 | 0.9882 | 0.188 | 10 | 0.9938 | 0.9882 | 0.188 | 0.9882 | 0.188 |
|  | 11 | 0.9883 | 0.188 | 11 | 0.994 | 0.9883 | 0.177 | 0.9883 | 0.182 |
|  | 12 | 0.9884 | 0.168 | 12 | 0.9941 | 0.9884 | 0.168 | 0.9884 | 0.168 |
| Medium | 2 | 0.9182 | 4.08 | 2 | 0.9431 | 0.9182 | 4.08 | 0.9182 | 4.08 |
|  | 3 | 0.9328 | 2.56 | 3 | 0.957 | 0.9328 | 2.56 | 0.9328 | 2.56 |
|  | 4 | 0.9396 | 1.84 | 4 | 0.9643 | 0.9396 | 1.84 | 0.9396 | 1.84 |
|  | 5 | 0.9436 | 1.43 | 5 | 0.9687 | 0.9436 | 1.43 | 0.9436 | 1.43 |
|  | 6 | 0.9461 | 1.16 | 6 | 0.9714 | 0.9461 | 1.16 | 0.9461 | 1.16 |
|  | 7 | 0.9479 | 0.98 | 7 | 0.9731 | 0.9479 | 0.98 | 0.9479 | 0.98 |
|  | 8 | 0.9541 | 1.09 | 7 | 0.9731 | 0.9546 | 1.04 | 0.95 | 1.36 |
|  | 9 | 0.9561 | 0.885 | 8 | 0.9752 | 0.9564 | 0.856 | 0.9515 | 1.21 |
|  | 10 | 0.9561 | 0.885 | 7 | 0.9752 | 0.9562 | 0.875 | 0.9528 | 1.07 |
|  | 11 | 0.9574 | 0.885 | 8 | 0.9767 | 0.9575 | 0.739 | 0.9539 | 1.02 |
|  | 12 | 0.9574 | 0.747 | 9 | 0.9767 | 0.9575 | 0.739 | 0.9547 | 0.88 |
| Complex | 2 | 0.8334 | 7.89 | 2 | 0.8856 | 0.8334 | 7.89 | 0.8334 | 7.89 |
|  | 3 | 0.8579 | 5.18 | 3 | 0.9117 | 0.8579 | 5.18 | 0.8579 | 5.18 |
|  | 4 | 0.8703 | 3.81 | 4 | 0.926 | 0.8703 | 3.81 | 0.8703 | 3.81 |
|  | 5 | 0.8776 | 3 | 5 | 0.9343 | 0.8776 | 3 | 0.8776 | 3 |
|  | 6 | 0.8824 | 2.48 | 6 | 0.9393 | 0.8824 | 2.48 | 0.8824 | 2.48 |
|  | 7 | 0.8857 | 2.11 | 7 | 0.9425 | 0.8857 | 2.11 | 0.8857 | 2.11 |
|  | 8 | 0.8882 | 1.83 | 8 | 0.9448 | 0.8882 | 1.83 | 0.8882 | 1.83 |
|  | 9 | 0.898 | 2.03 | 7 | 0.9441 | 0.8986 | 1.96 | 0.8903 | 2.63 |
|  | 10 | 0.898 | 2.03 | 9 | 0.9441 | 0.8993 | 1.88 | 0.893 | 2.33 |
|  | 11 | 0.9009 | 2.03 | 9 | 0.9468 | 0.9012 | 1.68 | 0.8949 | 2.24 |
|  | 12 | 0.9009 | 1.72 | 11 | 0.9468 | 0.9018 | 1.62 | 0.8966 | 1.94 |

TABLE 10

Optimal 2-codec ladders. Clients: H264: 10%, H264 or HEVC: 45%, H264/HEVC switchable: 45%.

| Content | N | Ladder bitrates & codecs: H.264 and HEVC | | Results for H.261-only clients | | | | Results for HEVC- or H.264-only clients | |
|---|---|---|---|---|---|---|---|---|---|
| | | H.264 | HEVC | n | $Q_1^n$ | $\overline{Q}_1$ | $\xi_1$ | n | $Q_2^n$ |
| Easy | 2 | 66, 636 | | 2 | 0.9854 | 0.9804 | 0.98 | 2 | 0.9854 |
| | 3 | 50, 366, 1155 | | 3 | 0.9892 | 0.9844 | 0.573 | 3 | 0.9892 |
| | 4 | 50, 240, 745, 1680 | | 4 | 0.9911 | 0.986 | 0.413 | 4 | 0.9911 |
| | 5 | 50, 232, 562, 1087, 2153 | | 5 | 0.9922 | 0.9868 | 0.329 | 5 | 0.9922 |
| | 6 | 50, 200, 454, 821, 1380, 2511 | | 6 | 0.9928 | 0.9873 | 0.278 | 6 | 0.9928 |
| | 7 | 50, 179, 384, 667, 1052, 1640, 2787 | | 7 | 0.9932 | 0.9877 | 0.245 | 7 | 0.9932 |
| | 8 | 50, 163, 336, 566, 862, 1262, 1180, 3020 | | 8 | 0.9934 | 0.9879 | 0.22 | 8 | 0.9934 |
| | 9 | 50, 151, 300, 494, 735, 1042, 1457, 2103, 3225 | | 9 | 0.9937 | 0.9881 | 0.202 | 9 | 0.9937 |
| | 10 | 50, 141, 272, 440, 644, 893, 1207, 1638, 2305, 3406 | | 10 | 0.9938 | 0.9882 | 0.188 | 10 | 0.9938 |
| | 11 | 50, 133, 250, 397, 574, 784, 1038, 1362, 1808, 2488, 3567 | | 11 | 0.994 | 0.9883 | 0.177 | 11 | 0.954 |
| | 12 | 50, 127, 233, 363, 519, 700, 915, 1175, 1507, 1967, 2653, 3712 | | 12 | 0.9941 | 0.9884 | 0.168 | 12 | 0.9941 |
| Medium | 2 | 167, 836 | | 2 | 0.9431 | 0.9182 | 4.08 | 2 | 0.9431 |
| | 3 | 114, 409, 1304 | | 3 | 0.957 | 0.9328 | 2.56 | 3 | 0.957 |
| | 4 | 38, 348, 815, 1750 | | 4 | 0.9643 | 0.9396 | 1.84 | 4 | 0.9643 |
| | 5 | 71, 268, 595, 1108, 2149 | | 5 | 0.9687 | 0.9436 | 1.43 | 5 | 0.9687 |
| | 6 | 167, 836 | 71, 323, 794, 1736 | 2 | 0.9431 | 0.9182 | 4.08 | 4 | 0.9696 |
| | 7 | 161, 836 | 57, 247, 577, 1097, 2152 | 2 | 0.9431 | 0.9182 | 4.08 | 5 | 0.9731 |
| | 8 | 161, 836 | 50, 202, 453, 815, 1365, 2481 | 2 | 0.9431 | 0.9182 | 4.08 | 6 | 0.9752 |
| | 9 | 114, 489, 1304 | 50, 202, 453, 815, 1365, 2481 | 3 | 0.957 | 0.9328 | 2.56 | 6 | 0.9752 |
| | 10 | 114, 489, 1304 | 50, 180, 384, 662, 1041, 1619, 2755 | 3 | 0.957 | 0.9328 | 2.56 | 7 | 0.9767 |
| | 11 | 114, 489, 1304 | 50, 164, 336, 561, 853, 1246, 1853, 2984 | 3 | 0.957 | 0.9328 | 2.56 | 8 | 0.9777 |
| | 12 | 88, 348, 815, 1750 | 50, 164, 336, 561, 853, 1246, 1853, 2984 | 4 | 0.9643 | 0.9396 | 1.84 | 8 | 0.9777 |
| Complex | 2 | 265, 1009 | | 2 | 0.8856 | 0.8334 | 7.89 | 2 | 0.8856 |
| | 3 | 190, 625, 1496 | | 3 | 0.9117 | 0.8579 | 5.18 | 3 | 0.9117 |
| | 4 | 150, 460, 959, 1950 | | 4 | 0.926 | 0.3703 | 3.81 | 4 | 0.926 |
| | 5 | 124, 364, 715, 1246, 2322 | | 5 | 0.9343 | 0.8776 | 3 | 5 | 0.9343 |
| | 6 | 265, 1009 | 126, 428, 928, 1923 | 2 | 0.8856 | 0.8334 | 7.89 | 4 | 0.9326 |
| | 7 | 265, 1009 | 103, 336, 688, 1224, 2310 | 2 | 0.8856 | 0.8334 | 7.89 | 5 | 0.9398 |
| | 8 | 265, 1009 | 88, 276, 546, 919, 1482, 2607 | 2 | 0.8856 | 0.8334 | 7.89 | 6 | 0.9441 |
| | 9 | 190, 625, 1496 | 88, 276, 546, 919, 1482, 2607 | 3 | 0.9117 | 0.8579 | 5.18 | 6 | 0.9441 |
| | 10 | 190, 625, 1496 | 77, 234, 453, 739, 1124, 1708, 2821 | 3 | 0.9117 | 0.8579 | 5.18 | 7 | 0.9468 |
| | 11 | 190, 625, 1496 | 68, 204, 388, 621, 915, 1310, 1914, 3005 | 3 | 0.9117 | 0.8579 | 5.18 | 8 | 0.9488 |

TABLE 10-continued

Optimal 2-codec ladders. Clients: H264: 10%, H264 or HEVC: 45%, H264/HEVC switchable: 45%.

| | | | | | | | | | |
|---|---|---|---|---|---|---|---|---|---|
| 12 | 190, 625, 1496 | 62, 182, 341, 539, 780, 1085, 1497, 2137, 3241 | 3 | 0.9117 | 0.8579 | 5.18 | 9 | 0.9512 | |

| | | Results for HEVC- or H.264-only clients | | Results for HEVC/H264 switchable clients | | | Weighted average across all clients | |
|---|---|---|---|---|---|---|---|---|
| Content | N | $\overline{Q}_2$ | $\xi_2$ | n | $Q_3''$ | $\overline{Q}_3$ | $\xi_3$ | $\overline{Q}_\Sigma$ | $\xi_\Sigma$ |
| Easy | 2 | 0.9804 | 0.98 | 2 | 0.9854 | 0.9804 | 0.98 | 0.9804 | 0.98 |
| | 3 | 0.9844 | 0.573 | 3 | 0.9892 | 0.9844 | 0.573 | 0.9844 | 0.573 |
| | 4 | 0.986 | 0.413 | 4 | 0.9911 | 0.986 | 0.413 | 0.986 | 0.413 |
| | 5 | 0.9868 | 0.329 | 5 | 0.9922 | 0.9868 | 0.329 | 0.9868 | 0.329 |
| | 6 | 0.9873 | 0.278 | 6 | 0.9928 | 0.9873 | 0.278 | 0.9873 | 0.278 |
| | 7 | 0.9877 | 0.245 | 7 | 0.9932 | 0.9877 | 0.245 | 0.9877 | 0.245 |
| | 8 | 0.9879 | 0.22 | 3 | 0.9934 | 0.9879 | 0.22 | 0.9879 | 0.22 |
| | 9 | 0.9881 | 0.202 | 9 | 0.9937 | 0.9881 | 0.202 | 0.9881 | 0.202 |
| | 10 | 0.9882 | 0.188 | 0 | 0.9938 | 0.9882 | 0.188 | 0.9882 | 0.188 |
| | 11 | 0.9883 | 0.188 | 1 | 0.994 | 0.9883 | 0.177 | 0.9883 | 0.182 |
| | 12 | 0.9884 | 0.168 | 2 | 0.9941 | 0.9884 | 0.168 | 0.9884 | 0.168 |
| Medium | 2 | 0.9182 | 4.08 | 2 | 0.9431 | 0.9182 | 4.08 | 0.9182 | 4.08 |
| | 3 | 0.9328 | 2.56 | 3 | 0.957 | 0.9328 | 2.56 | 0.9328 | 2.56 |
| | 4 | 0.9396 | 1.84 | 4 | 0.9643 | 0.9396 | 1.84 | 0.9396 | 1.84 |
| | 5 | 0.9436 | 1.43 | 5 | 0.9687 | 0.9436 | 1.43 | 0.9436 | 1.43 |
| | 6 | 0.951 | 1.41 | 5 | 0.9696 | 0.9516 | 1.35 | 0.948 | 1.65 |
| | 7 | 0.9541 | 1.09 | 7 | 0.9731 | 0.9546 | 1.04 | 0.9507 | 1.37 |
| | 8 | 0.9561 | 0.885 | 7 | 0.9152 | 0.9563 | 0.861 | 0.9524 | 1.19 |
| | 9 | 0.9561 | 0.885 | 3 | 0.9752 | 0.9564 | 0.856 | 0.9539 | 1.04 |
| | 10 | 0.9574 | 0.747 | 8 | 0.9767 | 0.9576 | 0.733 | 0.955 | 0.922 |
| | 11 | 0.9584 | 0.747 | 9 | 0.9777 | 0.9585 | 0.639 | 0.9559 | 0.88 |
| | 12 | 0.9584 | 0.649 | 0 | 0.9777 | 0.9584 | 0.646 | 0.9565 | 0.767 |
| Complex | 2 | 0.8334 | 7.89 | 2 | 0.8856 | 0.8334 | 7.89 | 0.8334 | 7.89 |
| | 3 | 0.8579 | 5.18 | 3 | 0.9117 | 0.8579 | 5.18 | 0.8579 | 5.18 |
| | 4 | 0.8703 | 3.81 | 4 | 0.926 | 0.8703 | 3.81 | 0.8703 | 3.81 |
| | 5 | 0.8776 | 3 | 5 | 0.9343 | 0.8776 | 3 | 0.8776 | 3 |
| | 6 | 0.8878 | 3.14 | 5 | 0.9326 | 0.8894 | 2.97 | 0.8831 | 3.54 |
| | 7 | 0.894 | 2.47 | 7 | 0.9398 | 0.8958 | 2.27 | 0.8887 | 2.92 |
| | 8 | 0.898 | 2.03 | 7 | 0.9441 | 0.8982 | 2.01 | 0.8917 | 2.6 |
| | 9 | 0.898 | 2.03 | 7 | 0.9441 | 0.8986 | 1.96 | 0.8943 | 2.31 |
| | 10 | 0.9009 | 1.72 | 10 | 0.9468 | 0.9017 | 1.63 | 0.8969 | 2.03 |
| | 11 | 0.9029 | 1.72 | 9 | 0.9488 | 0.9031 | 1.48 | 0.8985 | 1.96 |
| | 12 | 0.9045 | 1.32 | 10 | 0.9512 | 0.9045 | 1.32 | 0.8999 | 1.7 |

Based on these tables, several observations can be made:

First, this shows that for certain types of content, the use of HEVC may not increase quality, and so for such content it will be proper to generate ladders including only H.264-encoded content.

Second, the inclusion of HEVC streams may only make sense when the percentage of HEVC-capable devices is significant. The Table 9 starts with assumption that about 70% of all devices can decode HEVC and that seems like a borderline, when with 12 or more streams allowed, some of them may be dedicated to HEVC. Please also note, that in this case we consider the situation when half of HEVC-capable clients can also switch. Switching is not allowed (as will be exemplified in Tables 12-14) the deployment of HEVC-capable devices may need to be even higher before it can practically improve performance of the system overall.

Third, for inclusion of HEVC, the overall number of streams in ladder may need to be sufficiently large. We see that at least 10 streams are needed for medium content and at least 12 are needed for complex, when HEVC is available at 70% of devices. With a higher percentage of HEVC clients deployed such number of renditions may be lower. E.g. when HEVC is available at 90% of devices, we see that the number of ladder points needed to start including it goes down to about 6 renditions. However, considering that currently, with H.264-only encodes it is usually sufficient to use about 5 streams, it becomes clear that deployment of HEVC will come with a cost of extra renditions even when the number of devices capable of decoding it will be high.

The next tables now consider cases when H.264/HEVC switchable clients are absent.

TABLE 11

Optimal 2-codec ladders. Clients: H264: 30%, H264 or HEVC: 70%, H264/HEVC switchable: 0%.

| | | Ladder bitrates & codecs: H264 and HEVC | | Results for H264-only clients | | | Results for HEVC- or H.264-only clients | |
|---|---|---|---|---|---|---|---|---|
| Content | N | H.264 | HEVC | n | $Q_1''$ | $\overline{Q}_1$ | $\xi_1$ | n | $Q_2''$ |
| Easy | 2 | 66, 636 | | 2 | 0.9854 | 0.9804 | 0.98 | 2 | 0.9854 |
| | 3 | 50, 366, 1155 | | 3 | 0.9892 | 0.9844 | 0.573 | 3 | 0.9892 |
| | 4 | 50, 280, 745, 1680 | | 4 | 0.9911 | 0.986 | 0.413 | 4 | 0.9911 |

TABLE 11-continued

Optimal 2-codec ladders. Clients: H264: 30%, H264 or HEVC: 70%, H264/HEVC switchable: 0%.

|  |  |  |  |  |  |  |  |  |
|---|---|---|---|---|---|---|---|---|
|  | 5 | 50, 232, 562, 1087, 2153 |  | 5 | 0.9922 | 0.9868 | 0.329 | 5 | 0.9922 |
|  | 6 | 50, 200, 454, 821, 1380, 2511 |  | 6 | 0.9928 | 0.9873 | 0.278 | 6 | 0.9928 |
|  | 7 | 50, 179, 384, 667, 1052, 1640, 2787 |  | 7 | 0.9932 | 0.9877 | 0.245 | 7 | 0.9932 |
|  | 8 | 50, 163, 336, 566, 862, 1262, 1880, 3020 |  | 8 | 0.9934 | 0.9879 | 0.22 | 8 | 0.9934 |
|  | 9 | 50, 151, 300, 494, 735, 1042, 1457, 2103, 3225 |  | 9 | 0.9937 | 0.9881 | 0.202 | 9 | 0.9937 |
|  | 10 | 50, 141, 272, 440, 644, 893, 1207, 1638, 2305, 3406 |  | 10 | 0.9938 | 0.9882 | 0.188 | 10 | 0.9938 |
|  | 11 | 50, 133, 250, 397, 574, 784, 1038, 1362, 1808, 2488, 3567 |  | 11 | 0.994 | 0.9883 | 0.177 | 11 | 0.994 |
|  | 12 | 50, 127, 233, 363, 519, 700, 915, 1175, 1507, 1967, 2653, 3712 |  | 12 | 0.9941 | 0.9884 | 0.168 | 12 | 0.9941 |
| Medium | 2 | 167, 836 |  | 2 | 0.9431 | 0.9182 | 4.08 | 2 | 0.9431 |
|  | 3 | 114, 489, 1304 |  | 3 | 0.957 | 0.9328 | 2.56 | 3 | 0.957 |
|  | 4 | 88, 348, 815, 1750 |  | 4 | 0.9643 | 0.9396 | 1.84 | 4 | 0.9643 |
|  | 5 | 71, 268, 595, 1108, 2149 |  | 5 | 0.9687 | 0.9436 | 1.43 | 5 | 0.9687 |
|  | 6 | 60, 217, 465, 821, 1362, 2464 |  | 6 | 0.9714 | 0.9461 | 1.16 | 6 | 0.9714 |
|  | 7 | 53, 182, 381, 653, 1024, 1591, 2713 |  | 7 | 0.9731 | 0.9479 | 0.98 | 7 | 0.9731 |
|  | 8 | 50, 163, 329, 549, 834, 1219, 1813, 2935 |  | 8 | 0.9744 | 0.9491 | 0.848 | 8 | 0.9744 |
|  | 9 | 50, 151, 294, 479, 711, 1004, 1403, 2022, 3129 |  | 9 | 0.9754 | 0.9501 | 0.748 | 9 | 0.9754 |
|  | 10 | 88, 348, 815, 1750 | 50, 202, 453, 815, 1365, 2481 | 4 | 0.9643 | 0.9396 | 1.84 | 6 | 0.9752 |
|  | 11 | 71, 268, 595, 1108, 2149 | 50, 202, 453, 815, 1365, 2481 | 5 | 0.9687 | 0.9436 | 1.43 | 6 | 0.9752 |
|  | 12 | 71, 268, 595, 1108, 2149 | 50, 180, 384, 662, 1041, 1619, 2755 | 5 | 0.9687 | 0.9436 | 1.43 | 7 | 0.9767 |
| Complex | 2 | 265, 1009 |  | 2 | 0.8856 | 0.8334 | 7.89 | 2 | 0.8856 |
|  | 3 | 190, 625, 1496 |  | 3 | 0.9117 | 0.8579 | 5.18 | 3 | 0.9117 |
|  | 4 | 150, 460, 959, 1950 |  | 4 | 0.926 | 0.8703 | 3.81 | 4 | 0.926 |
|  | 5 | 124, 364, 715, 1246, 2322 |  | 5 | 0.9343 | 0.8776 | 3 | 5 | 0.9343 |
|  | 6 | 106, 301, 571, 940, 1497, 2609 |  | 6 | 0.9393 | 0.8824 | 2.48 | 6 | 0.9393 |
|  | 7 | 93, 257, 477, 760, 1140, 1717, 2820 |  | 7 | 0.9425 | 0.8857 | 2.11 | 7 | 0.9425 |
|  | 8 | 84, 225, 410, 640, 931, 1320, 1917, 2996 |  | 8 | 0.9448 | 0.8882 | 1.83 | 8 | 0.9448 |
|  | 9 | 76, 201, 360, 554, 791, 1087, 1486, 2098, 3148 |  | 9 | 0.9467 | 0.8901 | 1.62 | 9 | 0.9467 |
|  | 10 | 69, 181, 321, 489, 688, 928, 1230, 1638, 2259, 3275 |  | 10 | 0.9481 | 0.8916 | 1.45 | 10 | 0.9481 |
|  | 11 | 64, 165, 290, 438, 610, 812, 1056, 1362, 1779, 2406, 3387 |  | 11 | 0.9493 | 0.8929 | 1.32 | 11 | 0.9493 |
|  | 12 | 60, 152, 265, 397, 549, 724, 928, 1175, 1486, 1911, 2539, 3489 |  | 12 | 0.9504 | 0.8939 | 1.2 | 12 | 0.9504 |

TABLE 11-continued

Optimal 2-codec ladders. Clients: H264: 30%, H264 or HEVC: 70%, H264/HEVC switchable: 0%.

| | | Results for HEVC- or H.264-only clients | | Results for HEVC/H264 switchable clients | | | Weighted average across all clients | |
|---|---|---|---|---|---|---|---|---|
| Content | N | $\overline{Q}_2$ | $\xi_2$ | n | $Q_3''$ | $\overline{Q}_3$ | $\xi_3$ | $\overline{Q}_\Sigma$ | $\xi_\Sigma$ |
| Easy | 2 | 0.9804 | 0.98 | 2 | 0.9854 | 0.9804 | 0.98 | 0.9804 | 0.98 |
| | 3 | 0.9844 | 0.573 | 3 | 0.9892 | 0.9844 | 0.573 | 0.9844 | 0.573 |
| | 4 | 0.986 | 0.413 | 4 | 0.9911 | 0.986 | 0.413 | 0.986 | 0.413 |
| | 5 | 0.9868 | 0.329 | 5 | 0.9922 | 0.9868 | 0.329 | 0.9868 | 0.329 |
| | 6 | 0.9873 | 0.278 | 6 | 0.9928 | 0.9873 | 0.278 | 0.9873 | 0.278 |
| | 7 | 0.9877 | 0.245 | 7 | 0.9932 | 0.9877 | 0.245 | 0.9877 | 0.245 |
| | 8 | 0.9879 | 0.22 | 8 | 0.9934 | 0.9879 | 0.22 | 0.9879 | 0.22 |
| | 9 | 09881 | 0.202 | 9 | 0.9937 | 0.9881 | 0.202 | 0.9881 | 0.202 |
| | 10 | 0.9882 | 0.188 | 10 | 0.9938 | 0.9882 | 0.188 | 0.9882 | 0.188 |
| | 11 | 0.9883 | 0.188 | 11 | 0.994 | 0.9883 | 0.177 | 0.9883 | 0.185 |
| | 12 | 0.9884 | 0.168 | 12 | 0.9941 | 0.9884 | 0.168 | 0.9884 | 0.168 |
| Medium | 2 | 0.9182 | 4.08 | 2 | 0.9431 | 0.9182 | 4.08 | 0.9182 | 4.08 |
| | 3 | 0.9328 | 2.56 | 3 | 0.957 | 0.9328 | 2.56 | 0.9328 | 2.56 |
| | 4 | 0.9396 | 1.84 | 4 | 0.9643 | 0.9396 | 1.84 | 0.9396 | 1.84 |
| | 5 | 0.9436 | 1.43 | 5 | 0.9687 | 0.9436 | 1.43 | 0.9436 | 1.43 |
| | 6 | 0.9461 | 1.16 | 6 | 0.9714 | 0.9461 | 1.16 | 0.9461 | 1.16 |
| | 7 | 09479 | 0.98 | 7 | 0.9731 | 0.9479 | 0.98 | 0.9479 | 0.98 |
| | 8 | 0.9491 | 0.848 | 8 | 0.9744 | 0.9491 | 0.848 | 0.9491 | 0.848 |
| | 9 | 0.9501 | 0.748 | 9 | 0.9754 | 0.9501 | 0.748 | 0.9501 | 0.748 |
| | 10 | 0.9561 | 0.885 | 7 | 0.9752 | 0.9562 | 0.875 | 0.9512 | 1.17 |
| | 11 | 0.9561 | 0.885 | 7 | 0.9752 | 0.9564 | 0.859 | 0.9523 | 1.05 |
| | 12 | 0.9574 | 0.747 | 9 | 0.9767 | 0.9575 | 0.739 | 0.9533 | 0.951 |
| Complex | 2 | 0.8334 | 7.89 | 2 | 0.8856 | 0.8334 | 7.89 | 0.8334 | 7.89 |
| | 3 | 0.8579 | 5.18 | 3 | 0.9117 | 0.8579 | 5.18 | 0.8579 | 5.18 |
| | 4 | 0.8703 | 3.81 | 4 | 0.926 | 0.8703 | 3.81 | 0.8703 | 3.81 |
| | 5 | 0.8776 | 3 | 5 | 0.9343 | 0.8776 | 3 | 0.8776 | 3 |
| | 6 | 0.8824 | 2.48 | 6 | 0.9393 | 0.8824 | 2.48 | 0.8824 | 2.48 |
| | 7 | 0.8857 | 2.11 | 7 | 0.9425 | 0.8857 | 2.11 | 0.8857 | 2.11 |
| | 8 | 0.8882 | 1.83 | 8 | 0.9448 | 0.8882 | 1.83 | 0.8882 | 1.83 |
| | 9 | 0.8901 | 1.62 | 9 | 0.9467 | 0.8901 | 1.62 | 0.8901 | 1.62 |
| | 10 | 0.8916 | 1.45 | 10 | 0.9481 | 0.8916 | 1.45 | 0.8916 | 1.45 |
| | 11 | 0.8929 | 1.45 | 11 | 0.9493 | 0.8929 | 1.32 | 0.8929 | 1.41 |
| | 12 | 0.8939 | 1.2 | 12 | 0.9504 | 0.8939 | 1.2 | 0.8939 | 1.2 |

TABLE 12

Optimal 2-codec ladders. Clients: H264: 20%, H264 or HEVC: 80%, H264/HEVC switchable: 0%.

| | | Ladder bitrates & codecs: H264 and HEVC | | Results for H264-only clients | | | | Results for HEVC- or H.264-only clients | |
|---|---|---|---|---|---|---|---|---|---|
| Content | N | H.264 | HEVC | n | $Q_1''$ | $\overline{Q}_1$ | $\xi_1$ | n | $Q_2''$ |
| Easy | 2 | 66, 636 | | 2 | 0.9854 | 0.9804 | 0.98 | 2 | 0.9854 |
| | 3 | 50, 366, 1155 | | 3 | 0.9892 | 0.9844 | 0.573 | 3 | 0.9892 |
| | 4 | 50, 280, 745, 1680 | | 4 | 0.9911 | 0.986 | 0.413 | 4 | 0.9911 |
| | 5 | 50, 232, 562, 1087, 2153 | | 5 | 0.9922 | 0.9868 | 0.329 | 5 | 0.9922 |
| | 6 | 50, 200, 454, 821, 1380, 2511 | | 6 | 0.9928 | 0.9873 | 0.278 | 6 | 0.9928 |
| | 7 | 50, 179, 384, 667, 1052, 1640, 2787 | | 7 | 0.9932 | 0.9877 | 0.245 | 7 | 0.9932 |
| | 8 | 50, 163, 336, 566, 862, 1262, 1880, 3020 | | 8 | 0.9934 | 0.9879 | 0.22 | 8 | 0.9934 |
| | 9 | 50, 151, 300, 494, 735, 1042, 1457, 2103, 3225 | | 9 | 0.9937 | 0.9881 | 0.202 | 9 | 0.9937 |
| | 10 | 50, 141, 272, 440, 644, 893, 1207, 1638, 2305, 3406 | | 10 | 0.9938 | 0.9882 | 0.188 | 10 | 0.9938 |
| | 11 | 50, 133, 250, 397, 574, 784, 1038, 1362, 1808, 2488, 3567 | | 11 | 0.994 | 0.9883 | 0.177 | 11 | 0.994 |
| | 12 | 50, 127, 233, 363, 519, 700, | | 12 | 0.9941 | 0.9884 | 0.168 | 12 | 0.9941 |

TABLE 12-continued

Optimal 2-codec ladders. Clients: H264: 20%, H264 or HEVC: 80%, H264/HEVC switchable: 0%.

| Content | N | (col A) | (col B) | n | Q | Q' | ξ | n' | Q'' |
|---|---|---|---|---|---|---|---|---|---|
| Medium | | 915, 1175, 1507, 1967, 2653, 3712 | | | | | | | |
| | 2 | 167, 836 | | 2 | 0.9431 | 0.9182 | 4.08 | 2 | 0.9431 |
| | 3 | 114, 489, 1304 | | 3 | 0.957 | 0.9328 | 2.56 | 3 | 0.957 |
| | 4 | 88, 348, 815, 1750 | | 4 | 0.9643 | 0.9396 | 1.84 | 4 | 0.9643 |
| | 5 | 71, 268, 595, 1108, 2149 | | 5 | 0.9687 | 0.9436 | 1.43 | 5 | 0.9687 |
| | 6 | 60, 217, 465, 821, 1362, 2464 | | 6 | 0.9714 | 0.9461 | 1.16 | 6 | 0.9714 |
| | 7 | 53, 182, 381, 653, 1024, 1591, 2713 | | 7 | 0.9731 | 0.9479 | 0.98 | 7 | 0.9731 |
| | 8 | 114, 489, 1304 | 57, 247, 574, 1097, 2152 | 3 | 0.957 | 0.9328 | 2.56 | 5 | 0.9731 |
| | 9 | 114, 489, 1304 | 50, 202, 454, 815, 1365, 2481 | 3 | 0.957 | 0.9328 | 2.56 | 6 | 0.9752 |
| | 10 | 88, 348, 815, 1750 | 50, 202, 453, 815, 1365, 2481 | 4 | 0.9643 | 0.9396 | 1.84 | 6 | 0.9752 |
| | 11 | 88, 348, 815, 1750 | 50, 180, 384, 662, 1041, 1619, 2755 | 4 | 0.9643 | 0.9396 | 1.84 | 7 | 0.9767 |
| | 12 | 71, 268, 595, 1108, 2149 | 50, 180, 384, 662, 1041, 1619, 2755 | 5 | 0.9687 | 0.9436 | 1.43 | 7 | 0.9767 |
| Complex | 2 | 265, 1009 | | 2 | 0.8856 | 0.8334 | 7.89 | 2 | 0.8856 |
| | 3 | 190, 625, 1496 | | 3 | 09117 | 0.8579 | 5.18 | 3 | 0.9117 |
| | 4 | 150, 460, 959, 1950 | | 4 | 0.926 | 0.8703 | 3.81 | 4 | 0.926 |
| | 5 | 124, 364, 715, 1246, 2322 | | 5 | 0.9343 | 0.8776 | 3 | 5 | 0.9343 |
| | 6 | 106, 301, 571, 940, 1497, 2609 | | 6 | 0.9393 | 0.8824 | 2.48 | 6 | 0.9393 |
| | 7 | 93, 257, 477, 760, 1140, 1717, 2820 | | 7 | 0.9425 | 0.8857 | 2.11 | 7 | 0.9425 |
| | 8 | 84, 225, 410, 640, 931, 1320, 1917, 2996 | | 8 | 0.9448 | 0.8882 | 1.83 | 8 | 0.9448 |
| | 9 | 76, 201, 360, 554, 791, 1087, 1486, 2098, 3148 | | 9 | 0.9467 | 0.8901 | 1.62 | 9 | 0.9467 |
| | 10 | 150, 460, 959, 1950 | 81, 276, 546, 919, 1482, 2607 | 4 | 0.926 | 0.8703 | 3.81 | 6 | 0.9441 |
| | 11 | 150, 460, 959, 1950 | 77, 234, 453, 739, 1124, 1708, 2821 | 4 | 0.926 | 0.8703 | 3.81 | 7 | 0.9468 |
| | 12 | 150, 460, 959, 1950 | 68, 204, 388, 621, 915, 1310, 1914, 3005 | 4 | 0.926 | 0.8703 | 3.81 | 8 | 0.9488 |

| | | Results for HEVC- or H.264-only clients | | Results for HEVC/H264 switchable clients | | | Weight average across all clients | |
|---|---|---|---|---|---|---|---|---|
| Content | N | $\bar{Q}_2$ | $\xi_2$ | n | $Q_3''$ | $\bar{Q}_3$ | $\xi_3$ | $\bar{Q}_\Sigma$ | $\xi_\Sigma$ |
| Easy | 2 | 0.9804 | 0.98 | 2 | 0.9854 | 0.9804 | 0.98 | 0.9804 | 0.98 |
| | 3 | 0.9844 | 0.573 | 3 | 0.9892 | 0.9844 | 0.573 | 0.9844 | 0.573 |
| | 4 | 0.986 | 0.413 | 4 | 0.9911 | 0.986 | 0.413 | 0.986 | 0.413 |
| | 5 | 0.9868 | 0.329 | 5 | 0.9922 | 0.9868 | 0.329 | 0.9868 | 0.329 |
| | 6 | 0.9873 | 0.278 | 6 | 0.9928 | 0.9873 | 0.278 | 0.9873 | 0.278 |
| | 7 | 0.9877 | 0.245 | 7 | 0.9932 | 0.9877 | 0.245 | 0.9877 | 0.245 |
| | 8 | 0.9879 | 0.22 | 8 | 0.9934 | 0.9879 | 0.22 | 0.9879 | 0.22 |
| | 9 | 0.9881 | 0.202 | 9 | 0.9937 | 0.9881 | 0.202 | 0.9881 | 0.202 |
| | 10 | 0.9882 | 0.188 | 10 | 0.9938 | 0.9882 | 0.188 | 0.9882 | 0.188 |
| | 11 | 0.9883 | 0.188 | 11 | 0.994 | 0.9883 | 0.177 | 0.9883 | 0.186 |
| | 12 | 0.9884 | 0.168 | 12 | 0.9941 | 0.9884 | 0.168 | 0.9884 | 0.168 |
| Medium | 2 | 0.9182 | 4.08 | 2 | 0.9431 | 0.9182 | 4.08 | 0.9182 | 4.08 |
| | 3 | 0.9328 | 2.56 | 3 | 0.957 | 0.9328 | 2.56 | 0.9328 | 2.56 |
| | 4 | 0.9396 | 1.84 | 4 | 0.9643 | 0.9396 | 1.84 | 0.9396 | 1.84 |
| | 5 | 0.9436 | 1.43 | 5 | 0.9687 | 0.9436 | 1.43 | 0.9436 | 1.43 |
| | 6 | 0.9461 | 1.16 | 6 | 0.9714 | 0.9461 | 1.16 | 0.9461 | 1.16 |
| | 7 | 0.9479 | 0.98 | 7 | 0.9731 | 0.9479 | 0.98 | 0.9479 | 0.98 |
| | 8 | 0.9541 | 1.09 | 7 | 0.9731 | 0.9546 | 1.04 | 0.9499 | 1.38 |
| | 9 | 0.9561 | 0.885 | 8 | 0.9752 | 0.9564 | 0.856 | 0.9514 | 1.22 |
| | 10 | 0.9561 | 0.885 | 7 | 0.9752 | 0.9562 | 0.875 | 0.9528 | 1.08 |
| | 11 | 0.9574 | 0.885 | 8 | 0.9767 | 0.9575 | 0.739 | 0.9539 | 1.08 |
| | 12 | 0.9574 | 0.747 | 9 | 0.9767 | 0.9575 | 0.739 | 09547 | 0.883 |

TABLE 12-continued

Optimal 2-codec ladders. Clients: H264: 20%, H264 or HEVC: 80%, H264/HEVC switchable: 0%.

| | | | | | | | | | |
|---|---|---|---|---|---|---|---|---|---|
| Complex | 2 | 0.8334 | 7.89 | 2 | 0.8856 | 0.8334 | 7.89 | 0.8334 | 7.89 |
| | 3 | 0.8579 | 5.18 | 3 | 0.9117 | 0.8579 | 5.18 | 0.8579 | 5.18 |
| | 4 | 0.8703 | 3.81 | 4 | 0.926 | 0.8703 | 3.81 | 0.8703 | 3.81 |
| | 5 | 0.8776 | 3 | 5 | 0.9343 | 0.8776 | 3 | 0.8776 | 3 |
| | 6 | 0.8824 | 2.48 | 6 | 0.9393 | 0.8824 | 2.48 | 0.8824 | 2.48 |
| | 7 | 0.8857 | 2.11 | 7 | 0.9425 | 0.8857 | 2.11 | 0.8857 | 2.11 |
| | 8 | 0.8882 | 1.83 | 8 | 0.9448 | 0.8882 | 1.83 | 0.8882 | 1.83 |
| | 9 | 0.8901 | 1.62 | 9 | 09467 | 0.8901 | 1.62 | 0.8901 | 1.62 |
| | 10 | 0.898 | 2.03 | 9 | 0.9441 | 0.8993 | 1.88 | 0.8925 | 2.38 |
| | 11 | 0.9009 | 2.03 | 9 | 0.9468 | 0.9012 | 1.68 | 0.8947 | 2.38 |
| | 12 | 0.9029 | 1.49 | 9 | 0.9488 | 09032 | 1.46 | 0.8964 | 1.96 |

TABLE 13

Optimal 2-codec ladders. Clients: H264:10%, H264 or HEVC: 90%, H264/HEVC switchable: 0%.

| | | Ladder bitrates & codecs: H.264 and HEVC | | Results for H.264-only clients | | | Results for HEVC- or H.264-only clients | |
|---|---|---|---|---|---|---|---|---|
| Content | N | H.264 | HEVC | n | $Q_1''$ | $\overline{Q_1}$ | $\xi_1$ | n | $Q_2''$ |
| Easy | 2 | 66, 636 | | 2 | 0.9854 | 0.9804 | 0.98 | 2 | 0.9854 |
| | 3 | 50, 366, 1155 | | 3 | 0.9892 | 0.9844 | 0.573 | 3 | 0.9892 |
| | 4 | 50, 230, 745, 1680 | | 4 | 0.9911 | 0.986 | 0.413 | 4 | 0.9911 |
| | 5 | 50, 232, 562, 1087, 2153 | | 5 | 0.9922 | 0.9868 | 0.329 | 5 | 0.9922 |
| | 6 | 50, 200, 454, 821, 1380, 2511 | | 6 | 0.9928 | 0.9873 | 0.278 | 6 | 0.9928 |
| | 7 | 50, 179, 384, 667, 1052, 1640, 2787 | | 7 | 0.9932 | 0.9877 | 0.245 | 7 | 0.9932 |
| | 8 | 50, 163, 336, 566, 862, 1262, 1880, 3020 | | 8 | 0.9934 | 0.9879 | 0.22 | 8 | 0.9934 |
| | 9 | 50, 151, 300, 494, 735, 1042, 1457, 2103, 3225 | | 9 | 0.9937 | 0.9881 | 0.202 | 9 | 0.9937 |
| | 10 | 50, 141, 272, 440, 644, 893, 1207, 1638, 2305, 3406 | | 10 | 0.9938 | 0.9882 | 0.188 | 10 | 0.9938 |
| | 11 | 50, 133, 250, 397, 574, 780, 1038, 1362, 1808, 2488, 3567 | | 11 | 0.994 | 0.9883 | 0.177 | 11 | 0.994 |
| | 12 | 50, 127, 233, 363, 519, 700, 915, 1175, 1507, 1967, 2653, 3712 | | 12 | 0.9941 | 0.9884 | 0.168 | 12 | 0.9941 |
| Medium | 2 | 167, 836 | | 2 | 0.9431 | 0.9182 | 4.08 | 2 | 0.9431 |
| | 3 | 114, 489, 1304 | | 3 | 0.957 | 0.9328 | 2.56 | 3 | 0.957 |
| | 4 | 88, 348, 815, 1750 | | 4 | 0.9643 | 0.9396 | 1.84 | 4 | 0.9643 |
| | 5 | 71, 268, 595, 1108, 2149 | | 5 | 0.9687 | 0.9436 | 1.43 | 5 | 0.9687 |
| | 6 | 167, 836 | 71, 323, 794, 1736 | 2 | 0.9431 | 0.9182 | 4.08 | 4 | 0.9696 |
| | 7 | 167, 836 | 57, 247, 577, 1097, 2152 | 2 | 0.9431 | 0.9182 | 4.08 | 5 | 0.9731 |
| | 8 | 167, 836 | 50, 202, 453, 815, 1365, 2481 | 2 | 0.9431 | 0.9182 | 4.08 | 6 | 0.9752 |
| | 9 | 114, 489, 1304 | 50, 202, 453, 315, 1365, 2481 | 3 | 0.957 | 0.9328 | 2.56 | 6 | 0.9752 |
| | 10 | 114, 489, 1304 | 512, 180, 384, 662, 1041, 1619, 2755 | 3 | 0.957 | 0.9328 | 2.56 | 7 | 0.9767 |
| | 11 | 114, 489, 1304 | 50, 164, 336, 561, 853, 1246, 1853, 2984 | 3 | 0.957 | 0.9328 | 2.56 | 8 | 0.9777 |

TABLE 13-continued

Optimal 2-codec ladders. Clients: H264:10%, H264 or HEVC: 90%, H264/HEVC switchable: 0%.

|  |  |  |  |  |  |  |  |  |
|---|---|---|---|---|---|---|---|---|
|  | 12 | 813, 348, 815, 1750 | 50, 164, 336, 561, 853, 1246, 1853, 2934 | 4 | 0.9643 | 0.9396 | 1.84 | 8 | 0.9777 |
| Complex | 2 | 265, 1009 |  | 2 | 0.8856 | 0.8334 | 7.89 | 2 | 0.8856 |
|  | 3 | 190, 625, 1496 |  | 3 | 0.9117 | 0.8579 | 5.18 | 3 | 0.9117 |
|  | 4 | 150, 460, 959, 1950 |  | 4 | 0.926 | 0.8703 | 3.81 | 4 | 0.926 |
|  | 5 | 124, 364, 715, 1246, 2322 |  | 5 | 0.9343 | 0.8776 | 3 | 5 | 0.9343 |
|  | 6 | 106, 301, 571, 940, 1497, 2609 |  | 6 | 0.9393 | 0.8824 | 2.48 | 6 | 0.9393 |
|  | 7 | 265, 1009 | 103, 336, 688, 1224, 2310 | 2 | 0.8856 | 08334 | 7.89 | 5 | 0.9398 |
|  | 8 | 265, 1009 | 88, 276, 546, 919, 1482, 2607 | 2 | 0.8856 | 0.8334 | 7.89 | 6 | 0.9441 |
|  | 9 | 265, 1009 | 77, 234, 453, 739, 1124, 1708, 2821 | 2 | 0.8856 | 0.8334 | 7.89 | 7 | 0.9468 |
|  | 10 | 190, 625, 1496 | 77, 234, 453, 739, 1124, 1708, 2821 | 3 | 0.9117 | 0.8579 | 5.18 | 7 | 0.9468 |
|  | 11 | 190, 625, 1496 | 68, 204, 388, 621, 915, 1310, 1914, 3005 | 3 | 0.9117 | 0.8579 | 5.18 | 8 | 0.9488 |
|  | 12 | 190, 625, 1496 | 62, 182, 341, 539, 780, 1085, 1497, 2137, 3241 | 3 | 0.9117 | 0.8579 | 5.18 | 9 | 0.9512 |

| Content | N | Results for HEVC- or H.264-only clients | | Results for HEVC/H264 switchable clients | | | Weighted average across all clients | |
|---|---|---|---|---|---|---|---|---|
| | | $\overline{Q}_2$ | $\xi_2$ | n | $Q_3^n$ | $\overline{Q}_3$ | $\xi_3$ | $\overline{Q}_\Sigma$ | $\xi_\Sigma$ |
| Easy | 2 | 0.9804 | 0.98 | 2 | 0.9854 | 0.9804 | 0.98 | 0.9804 | 0.98 |
|  | 3 | 0.9844 | 0.573 | 3 | 0.9892 | 0.9844 | 0.573 | 0.9844 | 0.573 |
|  | 4 | 0.986 | 0.413 | 4 | 0.9911 | 0.986 | 0.413 | 0.986 | 0.413 |
|  | 5 | 0.9868 | 0.329 | 5 | 0.9922 | 0.9868 | 0.329 | 0.9868 | 0.329 |
|  | 6 | 0.9873 | 0.278 | 6 | 0.9928 | 0.9873 | 0.278 | 0.9873 | 0.278 |
|  | 7 | 0.9877 | 0.245 | 7 | 0.9932 | 0.9877 | 0.245 | 0.9877 | 0.245 |
|  | 8 | 0.9879 | 0.22 | 8 | 0.9934 | 0.9879 | 0.22 | 0.9879 | 0.22 |
|  | 9 | 0.9881 | 0.202 | 9 | 0.9937 | 0.9881 | 0.202 | 0.9881 | 0.202 |
|  | 10 | 0.9832 | 0.188 | 0 | 0.9938 | 0.9882 | 0.188 | 0.9882 | 0.188 |
|  | 11 | 0.9883 | 0.188 | 1 | 0.994 | 0.9883 | 0.177 | 0.9883 | 0.187 |
|  | 12 | 0.9884 | 0.168 | 2 | 0.9941 | 0.9884 | 0.168 | 0.9884 | 0.168 |
| Medium | 2 | 0.9182 | 4.08 | 2 | 0.9431 | 0.9182 | 4.08 | 0.9182 | 4.08 |
|  | 3 | 0.9328 | 2.56 | 3 | 0.957 | 0.9328 | 2.56 | 0.9328 | 2.56 |
|  | 4 | 0.9396 | 1.84 | 4 | 0.9643 | 0.9396 | 1.84 | 0.9396 | 1.84 |
|  | 5 | 0.9436 | 1.43 | 5 | 0.9687 | 0.9436 | 1.43 | 0.9436 | 143 |
|  | 6 | 0.951 | 1.41 | 5 | 0.9696 | 0.9516 | 1.35 | 0.9477 | 1.68 |
|  | 7 | 0.9541 | 1.09 | 7 | 0.9731 | 0.9546 | 1.04 | 0.9505 | 1.39 |
|  | 8 | 0.9561 | 0.885 | 7 | 0.9152 | 0.9563 | 0361 | 0.9523 | 1.2 |
|  | 9 | 0.9561 | 0.885 | 8 | 0.9752 | 0.9564 | 0.856 | 0.9538 | 1.05 |
|  | 10 | 0.9574 | 0.747 | 8 | 0.9767 | 0.9576 | 0.733 | 0.955 | 0.928 |
|  | 11 | 0.9584 | 0.747 | 9 | 0.9777 | 0.9585 | 0.639 | 0.9558 | 0.928 |
|  | 12 | 0.9584 | 0.649 | 0 | 0.9777 | 0.9584 | 0.646 | 0.9565 | 0.768 |
| Complex | 2 | 0.8334 | 7.89 | 2 | 0.8856 | 0.8334 | 7.89 | 0.8334 | 7.89 |
|  | 3 | 0.8579 | 5.18 | 3 | 0.9117 | 0.8579 | 5.18 | 0.8579 | 5.18 |
|  | 4 | 0.8703 | 3.81 | 4 | 0.926 | 0.8703 | 3.81 | 0.8703 | 3.81 |
|  | 5 | 0.8776 | 3 | 5 | 0.9343 | 0.8776 | 3 | 0.8776 | 3 |
|  | 6 | 0.8824 | 2.48 | 6 | 0.9393 | 0.8824 | 2.48 | 0.8824 | 2.48 |
|  | 7 | 0.894 | 2.47 | 7 | 0.9398 | 0.8958 | 2.27 | 0.8879 | 3.01 |
|  | 8 | 0.898 | 2.03 | 7 | 0.9441 | 0.8982 | 2.01 | 0.8916 | 2.61 |
|  | 9 | 0.9009 | 1.72 | 8 | 0.9468 | 0.9011 | 1.7 | 0.8941 | 2.34 |
|  | 10 | 0.9009 | 1.72 | 10 | 0.9468 | 0.9017 | 1.63 | 0.8966 | 2.06 |
|  | 11 | 0.9029 | 1.72 | 9 | 0.9488 | 0.9031 | 1.48 | 0.8984 | 2.06 |
|  | 12 | 0.9045 | 1.32 | 10 | 0.9512 | 0.9045 | 1.32 | 0.8999 | 1.7 |

Based on results in Tables 12-14, it can be noted that not using H264/HEVC switching capability in clients has a detrimental effect on system performance. First, the number of streams for supporting HEVC would need to be higher. E.g., for complex content, 12 streams may be no longer enough with 70% deployment of HEVC, and at least seven streams would be needed for 90% deployment. Furthermore, the overall quality and quality gap with the same number of streams is also a bit lower.

The above differences explain the reasons why using switching clients in practice can be useful, and also why it is further useful to generate ladders for such clients in consideration of factors such as % of population of such clients in overall client pool, properties of content, networks, etc.

Figure 13:
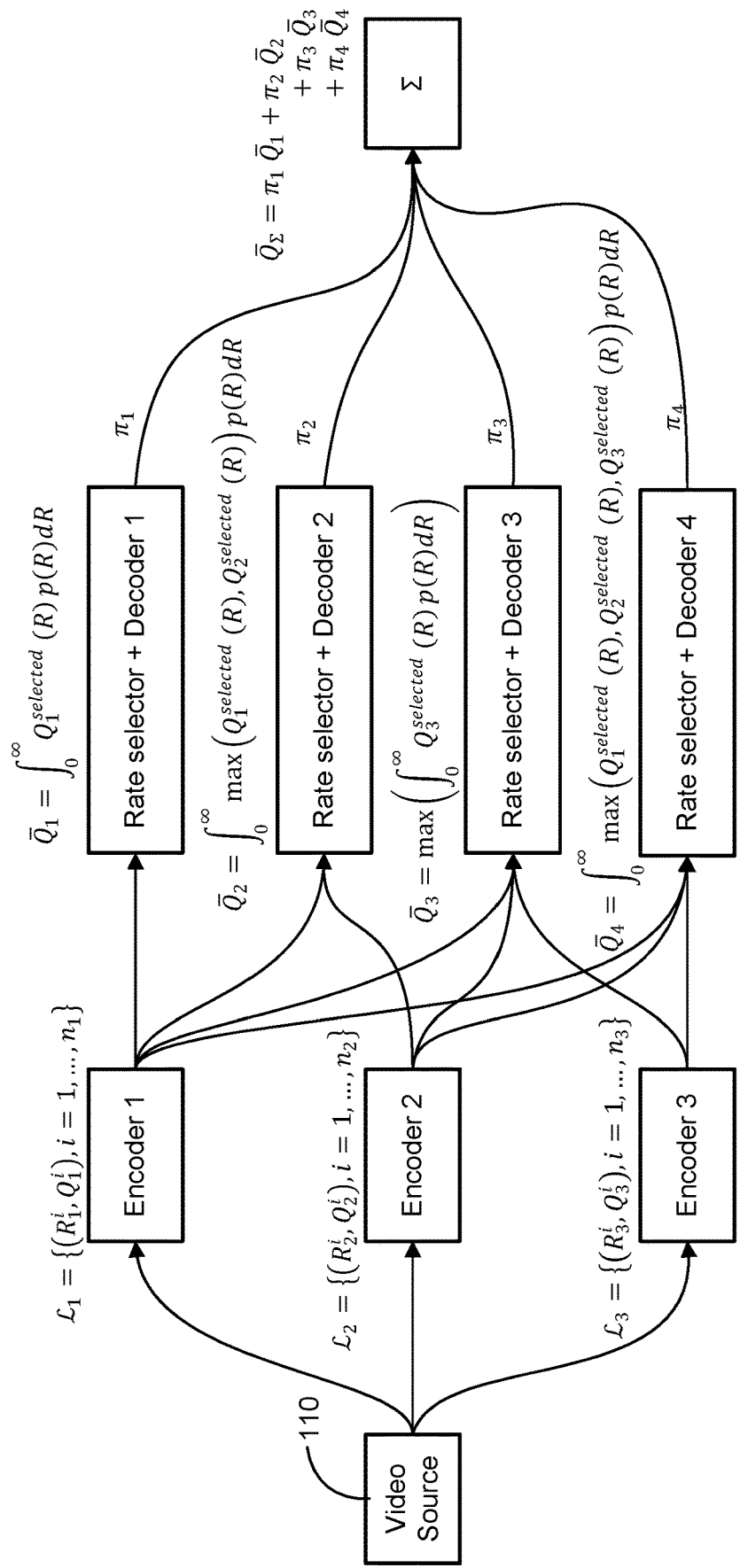
FIG. 13 is a conceptual diagram of a multi-codec ABR streaming system with four client types, used to obtain experimental results described herein.

A final example ABR streaming system for consideration is shown in FIG. 13. In this example, H.264 Baseline and H.264 Main profiles are treated as separate codecs, and HEVC is considered as yet another codec that systems must support. Furthermore, the example ABR streaming system includes four types of clients: (i) clients that can only decode H.264 baseline streams (Rate Selector+Decoder 1)(e.g., legacy portable devices), (ii) clients that can only decode and switch between H.264 baseline and H.264 main streams (Rate Selector+Decoder 2)(e.g., web players on PCs), (iii) clients that can decode all H.264 and HEVC streams, and which can switch between H.264 baseline and H.264 main, but cannot switch between H.264 and HEVC (Rate Selector+Decoder 3)(e.g., DASH players on Android devices, smart TVs), and (iv) clients that can decode and switch between all streams (Rate Selector+Decoder 4)(e.g., native HLS players on recent Apple devices).

The optimization problem in this case is a generalization of the problem defined above in equation (17), with final outputs at each client and overall flow explained in FIG. 13. Further, the method for solving the optimization problem as described previously applies in this case.

The examples of optimal ladders constructed for system illustrated in FIG. 13 are shown in Tables 15 and 16. For compactness of presentation we only include results for Network model 1.

TABLE 14

Optimal 3-codec ladders. Clients: H264 baseline: 10%, H.264: 30%, H264 or HEVC: 30%, H264/HEVC switchable: 30%.

| Content | N | Ladder bitrates & codecs: H.264 and HEVC | | | Results for H.264 baseline-only clients | | | | Results for H.264 baseline or main capable clients | | |
|---|---|---|---|---|---|---|---|---|---|---|---|
| | | H.264 Baseline | H.264 Main | HEVC | n | Qn | Q | Xi | n | Qn | Q |
| Easy | 2 | 76, 658 | | | 2 | 0.9821 | 0.9757 | 1.22 | 2 | 0.9821 | 0.9757 |
| | 3 | 50, 363, 1147 | | | 3 | 0.9867 | 0.9807 | 0.715 | 3 | 0.9867 | 0.9807 |
| | 4 | 50, 277, 738, 1666 | | | 4 | 0.9891 | 0.9828 | 0.509 | 4 | 0.9891 | 0.9828 |
| | 5 | 50, 230, 557, 1078, 2136 | | | 5 | 0.9904 | 0.9838 | 0.4 | 5 | 0.9904 | 0.9838 |
| | 6 | 76, 658 | 50, 280, 745, 1680 | | 2 | 0.9821 | 0.9757 | 1.22 | 5 | 09911 | 0.9851 |
| | 7 | 76, 658 | 50, 232, 562, 1087, 2153 | | 2 | 0.9821 | 0.9757 | 1.22 | 5 | 0.9922 | 0.9868 |
| | 8 | 50, 363, 1147 | 50, 232, 562, 1087, 2153 | | 3 | 0.9867 | 0.9807 | 0.715 | 5 | 0.9922 | 0.9868 |
| | 9 | 50, 363, 1147 | 50, 200, 454, 821, 1380, 2511 | | 3 | 0.9867 | 0.9807 | 0.715 | 7 | 0.9928 | 0.9874 |
| | 10 | 50, 363, 1147 | 50, 179, 384, 667, 1052, 1640, 2787 | | 3 | 0.9867 | 0.9807 | 0.715 | 8 | 0.9932 | 0.9877 |
| | 11 | 50, 363, 1147 | 50, 163, 336, 566, 862, 1262, 1880, 3020 | | 3 | 0.9867 | 0.9807 | 0.715 | 8 | 0.9934 | 0.9879 |
| | 12 | 50, 277, 738, 1666 | 50, 163, 336, 566, 862, 1262, 1880, 3020 | | 4 | 0.9891 | 0.9828 | 0.509 | 9 | 0.9934 | 0.9879 |
| Medium | 2 | 179, 874 | | | 2 | 0.9846 | 0.8995 | 4.69 | 2 | 0.9279 | 0.8995 |
| | 3 | 123, 520, 1362 | | | 3 | 0.9879 | 0.9157 | 2.97 | 3 | 0.9441 | 0.9157 |
| | 4 | 95, 372, 859, 1829 | | | 4 | 0.9896 | 0.9235 | 2.15 | 4 | 0.9529 | 0.9235 |
| | 5 | 179, 874 | 114, 489, 1304 | | 2 | 0.9846 | 0.8995 | 4.69 | 5 | 0.957 | 0.9348 |
| | 6 | 179, 874 | 88, 348, 815, 1750 | | 2 | 0.9846 | 0.8995 | 4.69 | 5 | 0.9643 | 0.9407 |
| | 7 | 179, 874 | 71, 268, 595, 1108, 2149 | | 2 | 0.9846 | 0.8995 | 4.69 | 6 | 0.9687 | 0.9444 |
| | 8 | 179, 874 | 60, 217, 465, 821, 1362, 2464 | | 2 | 0.9846 | 0.8995 | 4.69 | 7 | 0.9714 | 0.9465 |
| | 9 | 123, 520, 1362 | 60, 217, 465, 821, 1362, 2464 | | 3 | 0.9879 | 0.9157 | 2.97 | 8 | 0.9714 | 0.9466 |
| | 10 | 123, 520, 1362 | 53, 182, 381, 653, 1024, 1591, 2713 | | 3 | 0.9879 | 0.9157 | 2.97 | 8 | 0.9731 | 0.9483 |
| | 11 | 123, 520, 1362 | 50, 163, 329, 549, 834, 1219, 1813, 2935 | | 3 | 0.9879 | 0.9157 | 2.97 | 10 | 0.9744 | 0.9494 |

TABLE 14-continued

Optimal 3-codec ladders. Clients: H264 baseline: 10%, H.264: 30%, H264 or HEVC: 30%, H264/HEVC switchable: 30%.

|  |  |  |  |  |  |  |  |  |  |
|---|---|---|---|---|---|---|---|---|---|
|  | 12 | 123, 520, 1362 | 50, 151, 294, 479, 711, 1004, 1403, 2022, 3129 | 3 | 0.9879 | 0.9157 | 2.97 | 10 | 0.9754 | 0.9503 |
| Complex | 2 | 284, 1053 |  | 2 | 0.9861 | 0.8053 | 8.86 | 2 | 0.8636 | 0.8053 |
|  | 3 | 205, 660, 1558 |  | 3 | 0.9887 | 0.8317 | 5.87 | 3 | 0.893 | 0.8317 |
|  | 4 | 162, 488, 1002, 2024 |  | 4 | 0.9902 | 0.8452 | 4.34 | 4 | 0.9094 | 0.8452 |
|  | 5 | 284, 1053 | 190, 625, 1496 | 2 | 0.9861 | 0.8053 | 8.86 | 5 | 0.9117 | 0.8626 |
|  | 6 | 284, 1053 | 150, 460, 959, 1950 | 2 | 0.9861 | 0.8053 | 8.86 | 5 | 0.926 | 0.8725 |
|  | 7 | 284, 1053 | 124, 364, 715, 1246, 2322 | 2 | 0.9861 | 0.8053 | 8.86 | 7 | 0.9343 | 0.8794 |
|  | 8 | 284, 1053 | 106, 301, 571, 940, 1497, 2609 | 2 | 0.9861 | 0.8053 | 8.86 | 7 | 0.9393 | 0.8828 |
|  | 9 | 205, 660, 1558 | 106, 301, 571, 940, 1497, 2609 | 3 | 0.9887 | 0.8317 | 5.87 | 7 | 0.9393 | 0.8834 |
|  | 10 | 205, 660, 1558 | 93, 257, 477, 760, 1140, 1717, 2820 | 3 | 0.9887 | 0.8317 | 5.87 | 9 | 0.9425 | 0.8865 |
|  | 11 | 205, 660, 1558 | 84, 225, 410, 640, 931, 1320, 1917.2996 | 3 | 0.9887 | 0.8317 | 5.87 | 9 | 0.9448 | 0.8885 |
|  | 12 | 162, 488, 1002, 2024 | 84, 225, 410, 640, 931, 1320, 1917, 2996 | 4 | 0.9902 | 0.8452 | 4.34 | 9 | 0.9448 | 0.8888 |

| | | Results for H.264 baseline or main capable clients | | Results for HEVC- or H264-only clients | | | | Results for HEVC/H264 switchable clients | | | | Weighted average across all clients | |
|---|---|---|---|---|---|---|---|---|---|---|---|---|---|
| Content | N | $X_i$ | n | $Q_n$ | Q | $X_i$ | n | $Q_n$ | Q | $X_i$ | Q | $X_i$ |
| Easy | 2 | 1.22 | 2 | 0.9821 | 0.9757 | 1.22 | 2 | 0.9821 | 0.9757 | 1.22 | 0.9757 | 1.22 |
|  | 3 | 0.715 | 3 | 0.9867 | 0.9807 | 0.715 | 3 | 0.9867 | 0.9807 | 0.715 | 0.9807 | 0.715 |
|  | 4 | 0.509 | 4 | 0.9891 | 0.9828 | 0.509 | 4 | 0.9891 | 0.9828 | 0.509 | 0.9828 | 0.509 |
|  | 5 | 0.4 | 5 | 0.9904 | 0.9838 | 0.4 | 5 | 0.9904 | 0.9838 | 0.4 | 0.9838 | 0.4 |
|  | 6 | 0.4 | 5 | 0.9904 | 0.9838 | 0.4 | 5 | 0.9911 | 0.9861 | 0.4 | 0.9851 | 0.482 |
|  | 7 | 0.329 | 5 | 0.9922 | 0.9868 | 0.329 | 5 | 0.9922 | 0.9868 | 0.329 | 0.9857 | 0.418 |
|  | 8 | 0.329 | 5 | 0.9922 | 0.9868 | 0.329 | 5 | 0.9922 | 0.9868 | 0.329 | 0.9862 | 0.368 |
|  | 9 | 0.274 | 7 | 0.9928 | 0.9874 | 0.274 | 7 | 0.9928 | 0.9874 | 0.274 | 0.9867 | 0.318 |
|  | 10 | 0.243 | 8 | 0.9932 | 0.9877 | 0.243 | 8 | 0.9932 | 0.9877 | 0.243 | 0.987 | 0.29 |
|  | 11 | 0.22 | 8 | 0.9934 | 0.9879 | 0.22 | 8 | 0.9934 | 0.9879 | 0.22 | 0.9872 | 0.27 |
|  | 12 | 0.219 | 9 | 0.9934 | 0.9879 | 0.219 | 9 | 0.9934 | 0.9879 | 0.219 | 0.9874 | 0.248 |
| Medium | 2 | 4.69 | 2 | 0.9279 | 0.8995 | 4.69 | 2 | 0.9279 | 0.8995 | 4.69 | 0.8995 | 4.69 |
|  | 3 | 2.97 | 3 | 0.9441 | 0.9157 | 2.97 | 3 | 0.9441 | 0.9157 | 2.97 | 0.9157 | 2.97 |
|  | 4 | 2.15 | 4 | 0.9529 | 0.9235 | 2.15 | 4 | 0.9529 | 0.9235 | 2.15 | 0.9235 | 2.15 |
|  | 5 | 2.35 | 5 | 0.957 | 0.9348 | 2.35 | 5 | 0.957 | 0.9348 | 2.35 | 0.9312 | 2.58 |
|  | 6 | 1.72 | 5 | 0.9643 | 0.9407 | 1.72 | 5 | 0.9643 | 0.9407 | 1.72 | 0.9366 | 2.02 |
|  | 7 | 1.34 | 6 | 0.9687 | 0.9444 | 1.34 | 6 | 0.9687 | 0.9444 | 1.34 | 0.9399 | 1.68 |
|  | 8 | 1.12 | 7 | 0.9714 | 0.9465 | 1.12 | 7 | 0.9714 | 0.9465 | 1.12 | 0.9418 | 1.48 |
|  | 9 | 1.11 | 8 | 0.9714 | 0.9466 | 1.11 | 8 | 0.9714 | 0.9466 | 1.11 | 0.9435 | 1.3 |
|  | 10 | 0.939 | 8 | 0.9731 | 0.9483 | 0.939 | 8 | 0.9731 | 0.9483 | 0.939 | 0.945 | 1.14 |
|  | 11 | 0.816 | 10 | 0.9744 | 0.9494 | 0.816 | 10 | 0.9744 | 0.9494 | 0.816 | 0.9461 | 1.03 |
|  | 12 | 0.729 | 10 | 0.9754 | 0.9503 | 0.729 | 10 | 0.9754 | 0.9503 | 0.729 | 0.9468 | 0.954 |
| Complex | 2 | 8.86 | 2 | 0.8636 | 0.8053 | 8.86 | 2 | 0.8636 | 0.8053 | 8.86 | 0.8053 | 8.86 |
|  | 3 | 5.87 | 3 | 0.893 | 0.8317 | 5.87 | 3 | 0.893 | 0.8317 | 5.87 | 0.8317 | 5.87 |
|  | 4 | 4.34 | 4 | 0.9094 | 0.8452 | 4.34 | 4 | 0.9094 | 0.8452 | 4.34 | 0.8452 | 4.34 |
|  | 5 | 4.66 | 5 | 0.9117 | 0.8626 | 4.66 | 5 | 0.9117 | 0.8626 | 4.66 | 0.8569 | 5.08 |
|  | 6 | 3.57 | 5 | 0.926 | 0.8725 | 3.57 | 5 | 0.926 | 0.8725 | 3.57 | 0.8658 | 4.1 |
|  | 7 | 2.8 | 7 | 0.9343 | 0.8794 | 2.8 | 7 | 0.9343 | 0.8794 | 2.8 | 0.872 | 3.41 |
|  | 8 | 2.44 | 7 | 0.9393 | 0.8828 | 2.44 | 7 | 0.9393 | 0.8828 | 2.44 | 0.875 | 3.08 |
|  | 9 | 2.37 | 7 | 0.9393 | 0.8834 | 2.37 | 7 | 0.9393 | 0.8834 | 2.37 | 0.8782 | 2.72 |
|  | 10 | 2.02 | 9 | 0.9425 | 0.8865 | 2.02 | 9 | 0.9425 | 0.8865 | 2.02 | 0.881 | 2.41 |
|  | 11 | 1.8 | 9 | 0.9448 | 0.8885 | 1.8 | 9 | 0.9448 | 0.8885 | 1.8 | 0.8828 | 2.21 |
|  | 12 | 1.77 | 9 | 0.9448 | 0.8888 | 1.77 | 9 | 0.9448 | 0.8888 | 1.77 | 0.8844 | 2.03 |

TABLE 15

Optimal 3-codec ladders. Clients: H264 baseline: 10%, H.264: 20%, H264 or HEVC: 35%, H264/HEVC switchable: 35%.

| | | Ladder bitrates & codecs: 14264 and HEVC | | | Results for H.264 baseline-only clients | | | | Results for H.264 baseline or main capable clients | | |
|---|---|---|---|---|---|---|---|---|---|---|---|
| Content | N | H.264 Baseline | H.264 Main | HEVC | n | Qn | Q | Xi | n | On | Q |
| Easy | 2 | 76, 658 | | | 2 | 0.9821 | 0.9757 | 1.22 | 2 | 0.9821 | 0.9757 |
| | 3 | 50, 363, 1147 | | | 3 | 0.9867 | 0.9807 | 0.715 | 3 | 0.9867 | 0.9807 |
| | 4 | 50, 277, 738, 1666 | | | 4 | 0.9891 | 0.9828 | 0.509 | 4 | 0.9891 | 0.9828 |
| | 5 | 50, 230, 557, 1078, 2136 | | | 5 | 0.9904 | 0.9838 | 0.4 | 5 | 0.9904 | 0.9838 |
| | 6 | 76, 658 | 50, 280, 745, 1680 | | 2 | 0.9821 | 0.9757 | 1.22 | 5 | 0.9911 | 0.9861 |
| | 7 | 76, 658 | 50, 232, 562, 1087, 2153 | | 2 | 0.9821 | 0.9757 | 1.22 | 5 | 0.9922 | 0.9868 |
| | 8 | 50, 363, 1147 | 50, 232, 562, 1057, 2153 | | 3 | 0.9867 | 0.9807 | 0.715 | 5 | 0.9922 | 0.9868 |
| | 9 | 50, 363, 1147 | 50, 200, 454, 821, 1380, 2511 | | 3 | 0.9867 | 0.9807 | 0.715 | 7 | 0.9928 | 0.9874 |
| | 10 | 50, 363, 1147 | 50, 179, 384, 667, 1052, 1640, 2787 | | 3 | 0.9867 | 0.9807 | 0.715 | 8 | 0.9932 | 0.9877 |
| | 11 | 50, 363, 1147 | 50, 163, 336, 566, 862, 1262, 1880, 3020 | | 3 | 0.9867 | 09807 | 0715 | 8 | 0.9934 | 0.9ST9 |
| | 12 | 50, 277, 738, 1666 | 50, 163, 336, 566, 862, 1262, 1880, 3020 | | 4 | 0.9891 | 0.9828 | 0.509 | 9 | 0.9934 | 0.9879 |
| Medium | 2 | 179, 874 | | | 2 | 0.9846 | 0.8995 | 4.69 | 2 | 0.9279 | 0.8995 |
| | 3 | 123, 520, 1362 | | | 3 | 0.9879 | 0.9157 | 2.97 | 3 | 0.9441 | 0.9157 |
| | 4 | 179, 874 | | 139, 795 | 2 | 0.9846 | 0.8995 | 4.69 | 2 | 0.9279 | 0.8995 |
| | 5 | 179, 874 | | 93, 459, 1275 | 2 | 0.9846 | 0.8995 | 4.69 | 2 | 0.9279 | 0.8995 |
| | 6 | 123, 520, 1362 | | 93, 459, 1275 | 3 | 0.9879 | 0.9157 | 2.97 | 3 | 0.9441 | 0.9157 |
| | 7 | 123, 520, 1362 | | 71, 323, 744, 1736 | 3 | 0.9879 | 0.9157 | 2.97 | 3 | 0.9441 | 0.9157 |
| | 8 | 95, 372, 859, 1829 | | 71, 323, 794, 1736 | 4 | 0.9896 | 0.9235 | 2.15 | 4 | 0.9529 | 0.9235 |
| | 9 | 95, 372, 859, 1829 | | 57, 247, 577, 1097, 2152 | 4 | 0.9896 | 0.9235 | 2.15 | 4 | 0.9529 | 0.9235 |
| | 10 | 95, 372, 859, 1829 | | 50, 202, 453, 815, 1365, 2481 | 4 | 0.9896 | 0.9235 | 2.15 | 4 | 0.9529 | 0.9235 |
| | 11 | 77, 288, 630, 1159, 2233 | | 50, 202, 453, 815, 1365, 2481 | 5 | 0.9907 | 0.928 | 1.67 | 5 | 0.9581 | 0.928 |
| | 12 | 77, 288, 630, 1159, 2233 | | 50, 180, 314, 662, 1041, 1619, 2755 | 5 | 0.9907 | 0.928 | 1.67 | 5 | 0.9581 | 0.928 |
| Complex | 2 | 284, 1053 | | | 2 | 0.9861 | 0.8053 | 8.86 | 2 | 0.8636 | 0.8053 |
| | 3 | 205, 660, 1558 | | | 3 | 0.9887 | 0.8317 | 5.87 | 3 | 0.893 | 0.8317 |
| | 4 | 162, 488, 1002, 2024 | | | 4 | 0.9902 | 0.8452 | 4.34 | 4 | 0.9094 | 0.8452 |
| | 5 | 284, 1053 | 190, 625, 1496 | | 2 | 0.9861 | 0.8053 | 8.86 | 5 | 0.9117 | 0.8626 |
| | 6 | 284, 1053 | 150, 460, 959, 1950 | | 2 | 0.9861 | 0.8053 | 8.86 | 5 | 0.926 | 0.8725 |
| | 7 | 284, 1053 | 124, 364, 715, 1246, 2322 | | 2 | 0.9861 | 0.8053 | 8.86 | 7 | 0.9343 | 0.8794 |
| | 8 | 205, 660, 1558 | | 103, 336, 688, 1224, 2310 | 3 | 0.9887 | 0.8317 | 5.87 | 3 | 0.893 | 0.8317 |
| | 9 | 162, 488, 1002, 2024 | | 103, 336, 688, 1224, 2310 | 4 | 0.9902 | 0.8452 | 4.34 | 4 | 0.9094 | 0.8452 |
| | 10 | 162,488, 1002, 2024 | | 88, 276, 546, 919, 1482, 2607 | 4 | 0.9902 | 0.8452 | 4.34 | 4 | 0.9094 | 0.8452 |
| | 11 | 135, 387, 750, 1295, 2394 | | 80, 276, 546, 919, 1482, 2607 | 5 | 0.991 | 0.8533 | 3.43 | 5 | 0.9187 | 0.8533 |
| | 12 | 135, 387, 750, 1295, 2394 | | 77, 234, 453, 739, 1124, 1708, 2821 | 5 | 0.991 | 0.8533 | 3.43 | 5 | 0.9187 | 0.8533 |

| | | Results for H.264 baseline or main capable clients | Results for HEVC or H264-only clients | | | | Results for HEVC/H264 switchable clients | | | Weighted average across all clients | |
|---|---|---|---|---|---|---|---|---|---|---|---|
| Content | N | Xi | n | Qn | Q | Xi | n | Qn | Q | Xi | Q | Xi |
| Easy | 2 | 1.22 | 2 | 0.9821 | 0.9757 | 1.222 | | 0.9821 | 0.9757 | 1.22 | 0.9757 | 122 |
| | 3 | 0.715 | 3 | 0.9867 | 0.9807 | 0.715 | | 0.9867 | 0.9807 | 0.715 | 0.9807 | 0.715 |
| | 4 | 0.509 | 4 | 0.9891 | 0.9828 | 0.509 | | 0.9891 | 0.9828 | 0.509 | 0.9828 | 0.509 |
| | 5 | 0.4 | 5 | 0.9904 | 0.9838 | 0.4 | 5 | 0.0904 | 0.9838 | 0.4 | 0.9838 | 0.4 |

TABLE 15-continued

Optimal 3-codec ladders. Clients: H264 baseline: 10%, H.264: 20%, H264 or HEVC: 35%, H264/HEVC switchable: 35%.

|  |  |  |  |  |  |  |  |  |  |  |  |
|---|---|---|---|---|---|---|---|---|---|---|---|
|  | 6 | 0.4 | 5 | 0.9911 | 0.9861 | 0.4 | 5 | 0.9911 | 0.9861 | 0.4 | 0.9851 | 0.482 |
|  | 7 | 0.329 | 5 | 0.9922 | 0.9868 | 0.329 | 5 | 0.9922 | 0.9868 | 0.329 | 0.9857 | 0.418 |
|  | 8 | 0.329 | 5 | 0.9922 | 0.9868 | 0.329 | 5 | 0.9922 | 0.9868 | 0.329 | 0.9862 | 0.368 |
|  | 9 | 0.274 | 7 | 0.9928 | 0.9874 | 0.274 | 7 | 0.9928 | 0.9874 | 0.274 | 0.9867 | 0.318 |
|  | 10 | 0.243 | 8 | 0.9932 | 0.9877 | 0.243 | 8 | 0.9932 | 0.9877 | 0.243 | 0.987 | 0.29 |
|  | 11 | 0.22 | 8 | 0.9934 | 0.9879 | 0.22 | 8 | 0.9934 | 0.9879 | 0.22 | 0.9872 | 0.27 |
|  | 12 | 0.219 | 9 | 0.9934 | 0.9879 | 0.219 | 9 | 0.9934 | 0.9879 | 0.219 | 0.9874 | 0.248 |
| Medium | 2 | 4.69 | 2 | 0.9279 | 0.8995 | 4.69 | 2 | 0.9279 | 0.8995 | 4.69 | 0.8995 | 4.69 |
|  | 3 | 2.97 | 3 | 0.9441 | 0.9157 | 2.97 | 3 | 0.9441 | 0.9157 | 2.97 | 0.9157 | 2.97 |
|  | 4 | 4.69 | 2 | 0.9524 | 0.9339 | 3.19 | 2 | 0.9524 | 0.9339 | 3.19 | 0.9236 | 3.64 |
|  | 5 | 4.69 | 3 | 0.9636 | 0.9456 | 1.97 | 3 | 0.9636 | 0.9456 | 1.97 | 0.9318 | 2.79 |
|  | 6 | 2.97 | 3 | 0.9636 | 0.9456 | 1.97 | 3 | 0.9636 | 0.9456 | 1.97 | 0.9366 | 2.27 |
|  | 7 | 2.97 | 4 | 0.9696 | 0.951 | 1.41 | 4 | 0.9696 | 0.951 | 1.41 | 0.9404 | 1.88 |
|  | 8 | 2.15 | 4 | 0.9696 | 0.951 | 1.41 | 4 | 0.9696 | 0.951 | 1.41 | 0.9428 | 1.63 |
|  | 9 | 2.15 | 5 | 0.9731 | 0.9541 | 1.09 | 5 | 0.9731 | 0.9541 | 1.09 | 0.9449 | 1.41 |
|  | 10 | 2.15 | 6 | 0.9752 | 0.9561 | 0.885 | 6 | 0.9752 | 0.9561 | 0.835 | 0.9463 | 1.26 |
|  | 11 | 1.67 | 6 | 0.9752 | 0.9561 | 0.885 | 6 | 0.9752 | 0.9561 | 0.885 | 0.9477 | 1.12 |
|  | 12 | 1.67 | 7 | 0.9767 | 0.9574 | 0.747 | 7 | 0.9767 | 0.9574 | 0.747 | 0.9486 | 1.03 |
| Complex | 2 | 8.86 | 2 | 0.8636 | 0.8053 | 8.86 | 2 | 0.8636 | 0.8053 | 8.86 | 0.8053 | 8.86 |
|  | 3 | 5.87 | 3 | 0.893 | 0.8317 | 5.87 | 3 | 0.893 | 0.8317 | 5.87 | 0.8317 | 5.87 |
|  | 4 | 4.34 | 4 | 0.9094 | 0.8452 | 4.34 | 4 | 0.9094 | 0.8452 | 4.34 | 0.8452 | 4.34 |
|  | 5 | 4.66 | 5 | 0.9117 | 0.8626 | 4.66 | 5 | 0.9117 | 0.8626 | 4.66 | 0.8569 | 5.08 |
|  | 6 | 3.57 | 5 | 0.926 | 0.8725 | 3.57 | 5 | 0.926 | 0.8725 | 3.57 | 0.8658 | 4.1 |
|  | 7 | 2.8 | 7 | 0.9343 | 0.8794 | 2.8 | 7 | 0.9343 | 0.8794 | 2.8 | 0.872 | 3.41 |
|  | 8 | 5.87 | 5 | 0.9398 | 0.894 | 2.47 | 6 | 0.9398 | 0.8941 | 2.46 | 0.8753 | 3.48 |
|  | 9 | 4.34 | 5 | 0.9398 | 0.894 | 2.47 | 5 | 0.9398 | 0.894 | 2.47 | 0.8794 | 3.03 |
|  | 10 | 4.34 | 6 | 0.9441 | 0.898 | 2.03 | 6 | 0.9441 | 0.898 | 2.03 | 0.8822 | 2.72 |
|  | 11 | 3.43 | 6 | 0.9441 | 0.898 | 2.03 | 6 | 0.9441 | 0.898 | 2.03 | 0.8846 | 2.45 |
|  | 12 | 3.43 | 7 | 0.9468 | 0.9009 | 1.72 | 7 | 0.9468 | 0.9009 | 1.72 | 0.8866 | 2.23 |

Observations from Tables 15 and 16 are as follows.

First, consistent with earlier results for H.264/HEVC system, the percentage of HEVC capable devices must be high, and that for some content HEVC still will not be used. In Table 14, the total percentage of HEVC-capable devices was 60% and no streams were allocated to HEVC. In Table 15, the total percentage of HEVC capable devices was 70%, and that was sufficient for inclusion of HEVC streams in ladders for medium and complex content.

Additionally, in cases when HEVC gets included, it apparently comes at the cost of replacing H.264 main renditions, and leaving H.264 baseline ones in. Hence, it seems that with limited number of renditions, the best ladders that could be generated to support HEVC-capable clients will likely include either H.264 baseline and H.264 main profile renditions, or H.264 baseline and HEVC renditions. But this is not the case when all 3 codecs are being used.

Optimization between these two mixes of codecs appears to be content dependent, and it is also influenced by the total number of renditions n that is allowed to be included.

This again demonstrates the power of this optimization technique, and shows that treatment of the H.264 baseline profile as a separate codec has significant impact on structure and shape of final profiles in multi-codec use cases.

Naturally, the proposed method can also be applied for different codecs, such as VP9, AV1, VVC, etc.

Figure 14:
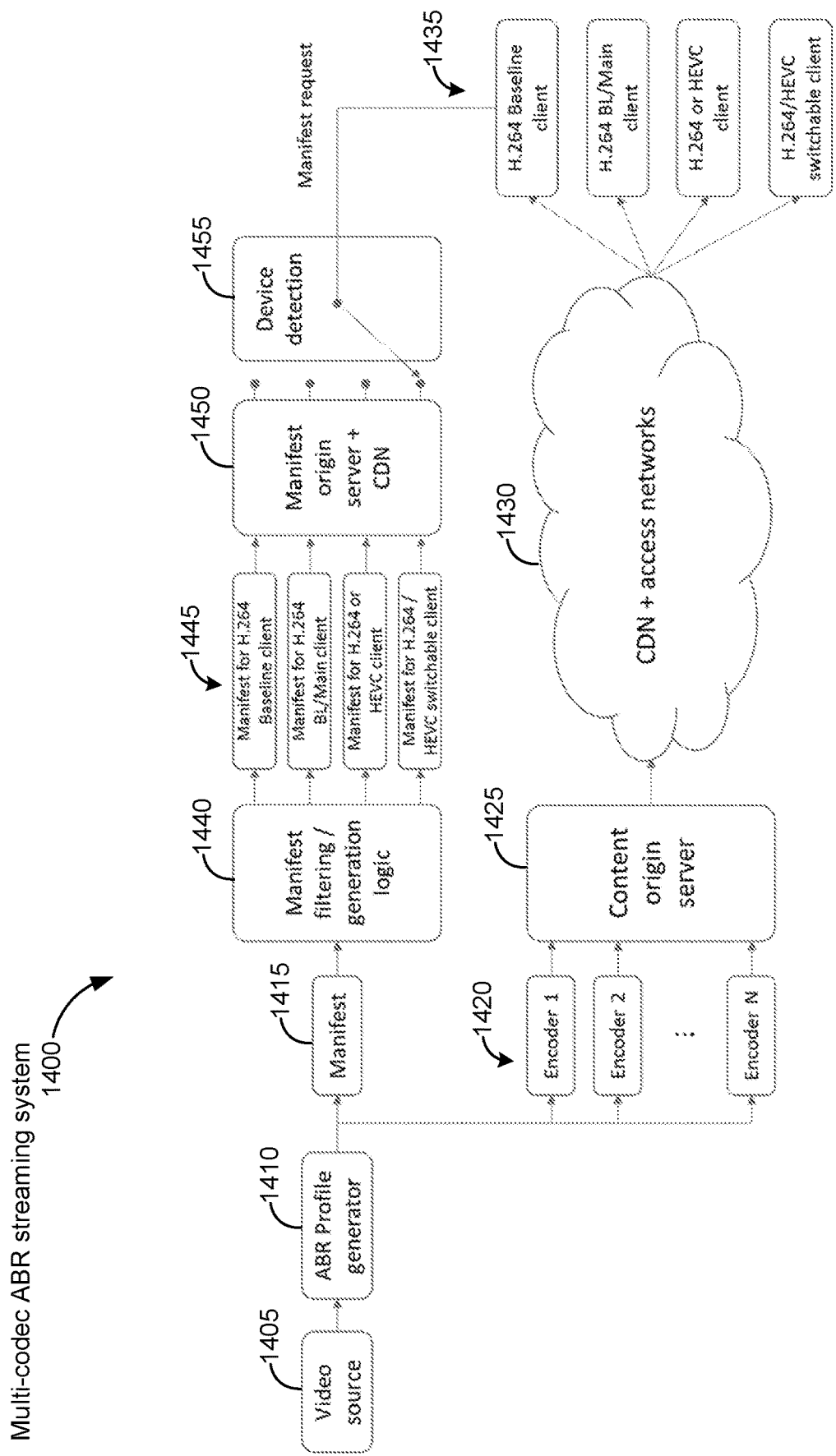
FIG. 14 is a block diagram of a multi-codec ABR streaming system incorporating multi-codec ABR ladder generation using the methods described herein, according to an embodiment.

FIG. 14 is a block diagram of a multi-codec ABR streaming system 1400 incorporating multi-codec ABR ladder generation using the methods described herein, according to an embodiment. As can be seen, components shown in FIG. 14 may correspond to the ABR Streaming System 100 of FIG. 1. FIG. 14, includes additional detail with regard to components used for multi-codec encoding ladder determination and streaming. Moreover, as with FIG. 1, embodiments may have any number of individual components, which may be distributed in various geographical locations and/or executed by any number of computers (e.g., computer servers).

The video in the multi-codec ABR streaming system 1400 arrives from a video source 1405. Depending on desired functionality, this source may comprise an origin server, storing video encoded in some intermediate format, or it could be a live stream, e.g., delivered by RTMP protocol.

This video, along with some additional information is then received by the multi-codec ABR profile generator 1410, which produces the description of an entire encoding ladder, presented as a manifest 1415, and specific encoding instructions are delivered to encoders 1420 (encoders 1-N), which are tasked with encoding each stream. The manifest 1415 and encoding instruction may include, for example, codec type, target bitrate, resolution, framerate, and other parameters of streams to generate. The encoded streams are subsequently placed on the content origin server 1425 and pushed to CDN+access networks 1430 for delivery to clients 1435.

The manifest 1415 produced by the multi-codec ABR profile generator 1410 may be further processed by the manifest filtering/generation logic 1440, which, based on the capabilities of each type of clients in streaming system, may leave only renditions that are relevant to such clients. For example, it may leave only H.264-baseline encoded renditions for clients that can only decode H.264 baseline content. Or, for example, considering an H.264/HEVC switchable codec, it may leave an ordered subset of renditions, such that for each next rate $R^{i+1} \geq R^i$ it will guarantee to deliver better quality than previous rate $Q^{i+1} \geq Q^i$, regardless of the codec being used. This naturally may omit some of the rate points, but would otherwise produce the best possible ladder for such switchable codec to use. The logic of such filtering could be understood in view of FIG. 4B, which shows that the 595 kbps H.264 stream in this case should be omitted. Once filtered, the final encoding ladders may be stored as DASH or HLS manifests 1445 on a manifest origin+CDN 1450.

During the playback, once clients 1435 of each kind try to access the link to the content, their requests may be analyzed by the device detection logic 1455 to identify the type of the client 1435 asking for the content. Such detection can be done either by the receiving server or JavaScript® logic embedded in the webpage. Such detection can be based on several generally available parameters of client system: type and version of the web browser, type and version of the OS, device vendor and model, chipset vendor and model, etc.

Once the type of client 1435 is identified, it can be directed to the appropriately-filtered manifest, containing a set of steams that client can support. Once the manifest is received, each client 1435 can operate as normally expected in the ABR streaming system.

Some features of this multi-codec ABR streaming system 1400 that are not in traditional ABR streaming systems include:

- A multi-codec ABR profile generator 1410 that produces an output manifest 1415, including streams encoded by multiple codecs;
- Manifest filtering/generation logic 1440, which filters output of multi-codec ABR profile generator 1410 and customizes ladders to the capabilities of each of the clients 1435 in the system (specifically, the filtering process may leave only streams encoded using a single codec or a combination of streams encoded by multiple codecs, such that a bitrate-sorted sequence of them also produces monotonically increasing sequence of quality levels);
- Device detection 1455, identifying the type of the client 1435, and selecting the manifest that 1445 was filtered/generated for the detected type of client 1435; and
- The clients 1435 that subsequently receive and play content described in the filtered manifest.

According to some embodiments, the manifest filtering/generation logic 1440 may rely on quality annotations generated by the ABR profile generator 1410, or "quality_rank" identifiers as defined by DASH standard. If "quality_rank" identifiers are used, they must be properly assigned across adaptation sets for all codecs. Additional annotations, enabling switching across adaptation sets in case of DASH manifests must also be included in cases of switchable clients.

Figure 15:
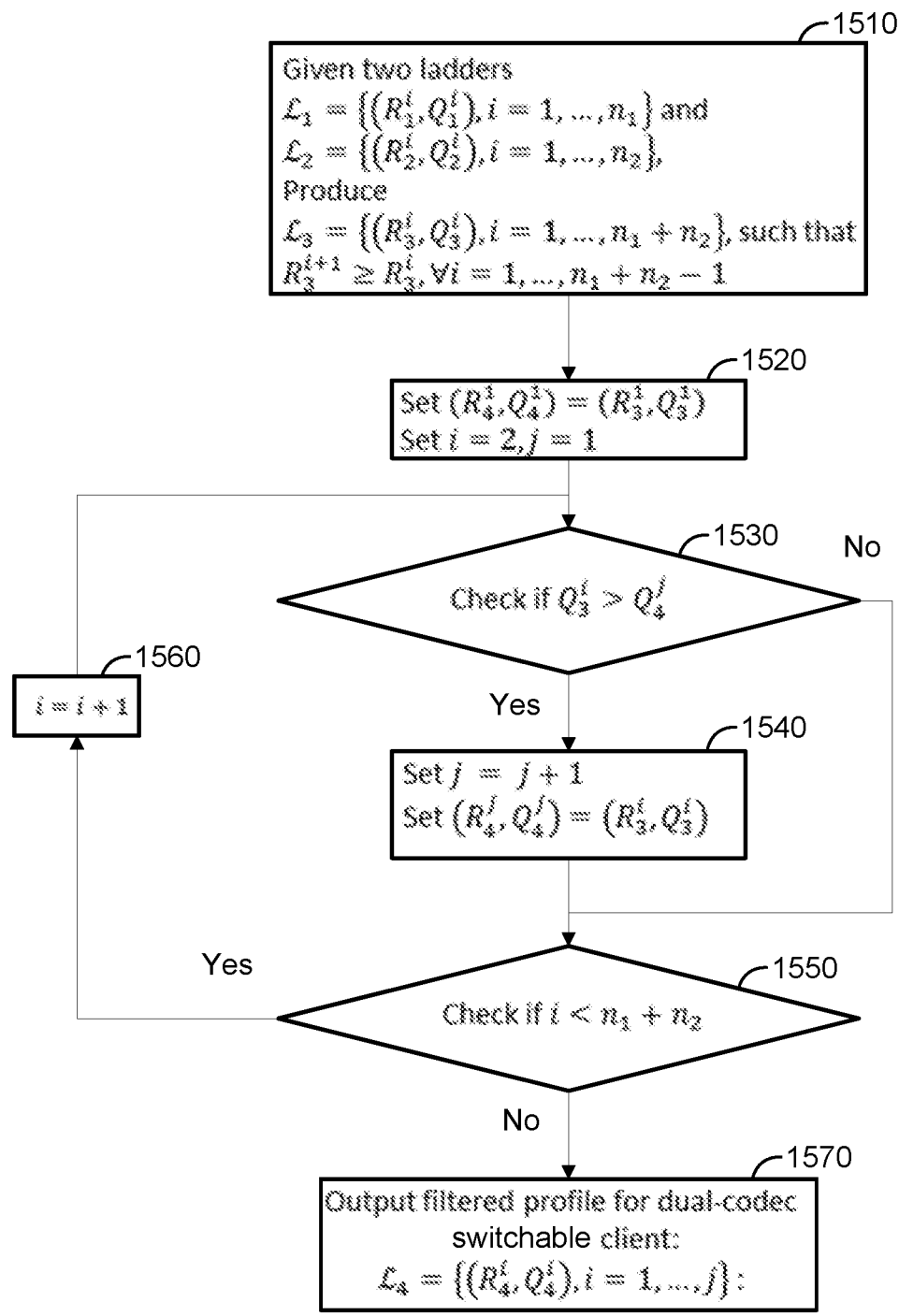
FIG. 15 is a flow chart of a method for determining a monotonically increasing set of points (streams in an encoding ladder) in terms of rate and quality.

A specific example of manifest filtering algorithm, leaving a monotonically increasing set of points in terms of rate and quality is shown in FIG. 15. Given ladder points for two codecs, it starts at block 1510 by simply merging and sorting them according to the rate. Then, it follows by selection loop 1520-1560, where at each step, only points of the rate-sorted list, which also provide increments in terms of quality 1530 are subsequently stored 1540. The final filtered ladder is obtained and sent to output in step 1570.

In the example of FIG. 15, codec 1 could, for example, be H.264 and codec 2-HEVC. A similar algorithm can also be applied recursively by considering more than one codec. In this case, for example, it can be first applied to merge rates from H.264 baseline and H.264 main profiles, and subsequently to merge all H.264 ladder points with HEVC ladder points. This way a ladder can be generated for codec that can switch between all 3 codecs (H.264 baseline, H.264 main, and HEVC).

Figure 17:
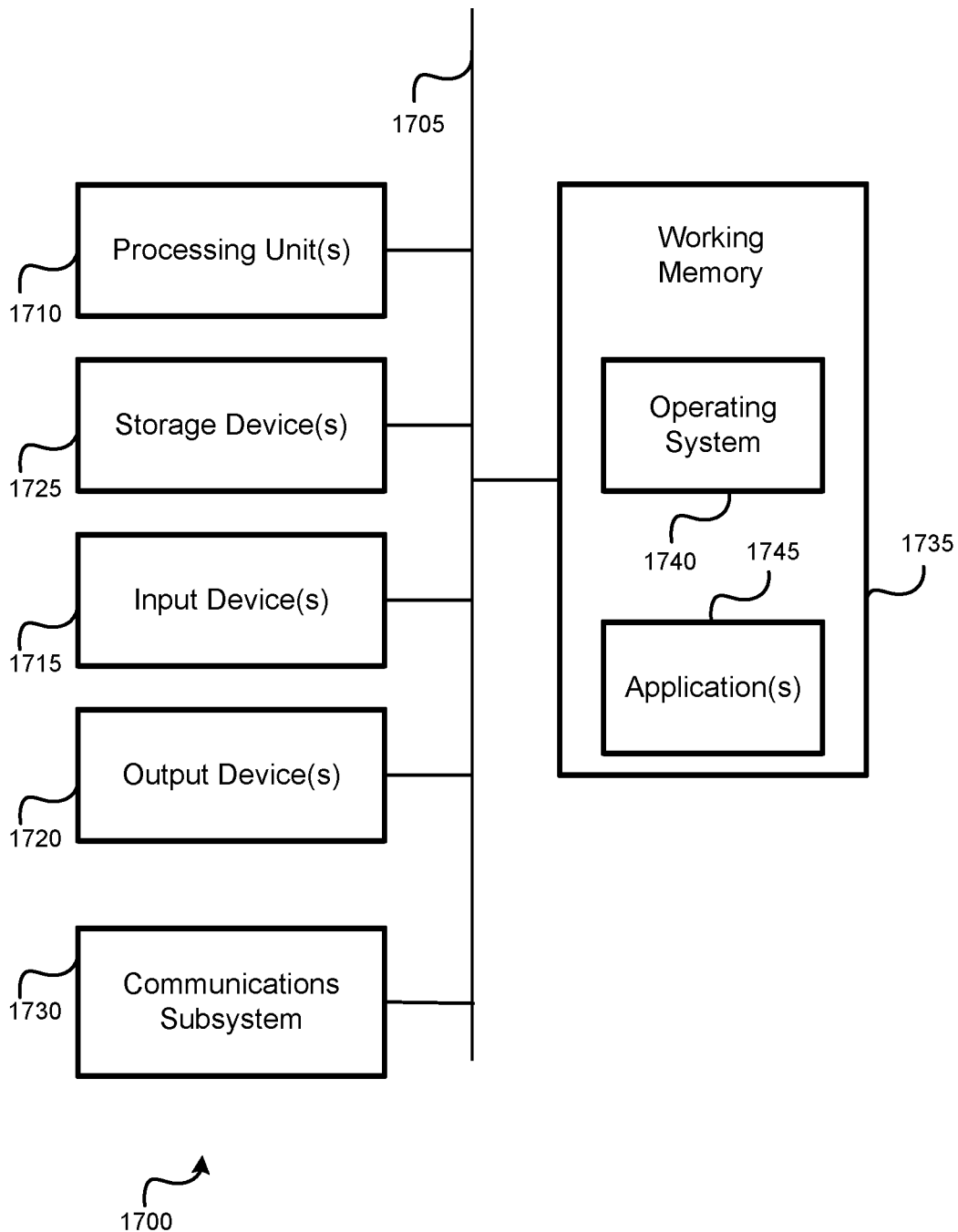
FIG. 17 is a block diagram of an embodiment of a computer system.

Depending on circumstances the proposed embodiments for ABR profile generation as well as profile filtering can be implemented in software and/or hardware (e.g., one or more hardware or software components of a computer, as illustrated in FIG. 17 and described below), or compiled and stored in computer medium as computer instruction code. Such code, in turn, can be either executed on local computers, containing the media to be transcoded, or remotely (e.g., in cloud instance). It may also be executed in multiple such cloud instances simultaneously processing different media, or different chunks of the same media. The execution of such operations can be orchestrated by means of creating and using web APIs.

Figure 16:
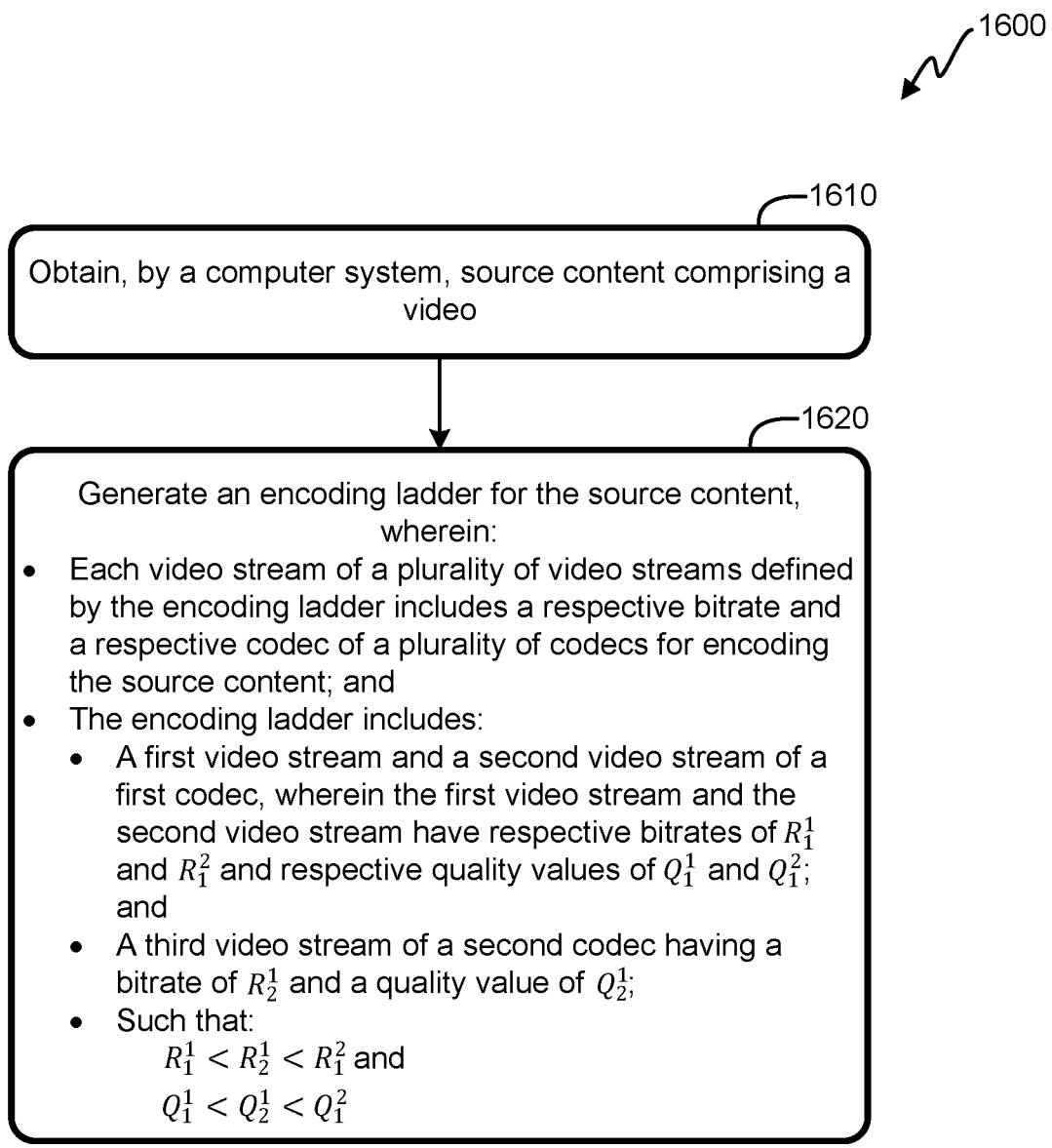
FIG. 16 is a flow diagram illustrating a method of creating a multi-codec encoding ladder, according to an embodiment.

FIG. 16 is a flow diagram illustrating a method 1600 of creating a multi-codec encoding ladder, according to an embodiment, which can use one or more of the optimization techniques described above. It will be understood that the functionality provided in the blocks shown in FIG. 16 is provided as an example. Alternative embodiments may add, omit, combine, separate, and otherwise alter the functions as shown. The functions of one or more of the blocks illustrated in FIG. 16 may be performed, for example, by an ABR profile generator 1410, encoder 120, or other component of a multi-codec ABR streaming system as described herein. As such, these functions may be implemented using software and/or hardware means of a computer system, such as the computer system illustrated in FIG. 17 described in more detail below.

At block 1610, the method 1600 can begin by obtaining, by a computer system, source content comprising a video. The source content may be provided in any of a variety of formats, including a digital master, mezzanine file, input stream (e.g., a live stream), separated video elementary stream, or the like. As noted, the source content may be obtained from a video source 110, which may comprise an origin server.

At block 1620, the functionality includes generating an encoding ladder for the source content, where each video stream of a plurality of video streams defined by the encoding ladder includes a respective bitrate and respective codec of a plurality of codecs for each encoding the source content. Further, the encoding ladder includes a first video stream and a second video stream of a first codec, wherein the first video stream and the second video stream have respective bitrates of $R_1^1$ and $R_1^2$ and respective quality values of $Q_1^1$ and $Q_1^2$, and a third video stream of a second codec having a bitrate of $R_2^1$ and a quality value of $Q_2^1$, such that: $R_1^1 < R_2^1 < R_1^2$ and $Q_1^1 < Q_2^1 < Q_1^2$. As shown in the graphs of FIG. 4B and FIG. 11, for example, the techniques provided herein can enable the creation of encoding ladders in which the streams of different codecs are interleaved such that the quality and rate of the streams can be monotonically increasing. That is, each step in the encoding ladder (with two or more codecs) can represent an increase in both bitrate and quality. Depending on desired functionality, $Q_1^1$, $Q_1^2$, or $Q_2^1$, or any combination thereof, each may comprise an SSIM value, a PSNR value, a MS-SSIM value, or a VMAF value.

As indicated in the previously-described examples and embodiments, the process of creating the encoding ladder may be optimized to take into account any of a variety of factors. In some embodiments, for example, the method 1600 may further comprise, for each codec of a plurality of codecs, obtaining a quality rate function of the respective codec for the source content, indicative of a relationship between bitrates and quality values for the source content, wherein generating the encoding ladder for the source content is based on the quality rate function of the respective codec, $Q_1^1$ and $Q_1^2$ are determined by the quality rate function of the first codec, and $Q_2^1$ is determined by the quality rate function of the second codec. Moreover, some embodiments may also involve determining these quality rate functions for the source content. That is, in some embodiments, the quality rate function for each codec of the plurality of codecs is determined from one or more probing coatings of the source content for each codec of the plurality of codecs.

Alternative embodiments may include additional or alternative considerations and/or optimization algorithms. For example, in some embodiments, the encoding ladder is further based on a network bandwidth distribution, and a distribution of clients capable of streaming the source content once the source content is encoded using the encoding ladder, wherein the distribution of clients includes clients capable of switching between the first codec and the second codec. Additionally or alternatively, generating the encoding ladder may comprise determining the plurality of video streams using an iterative process in which an initial number is selected, and the steps of (1) determining a figure of merit function for the selected number and (2) increasing the value of the selected number for the next iteration, are repeated until the figure of merit function reaches a maximum. In some embodiments, the figure of merit function is based on the quality rate function for each codec of the plurality of codecs, the network bandwidth distribution, or the distribution of clients, or any combination thereof. The network bandwidth distribution may comprise a probability density function determined based on bandwidth statistics collected in consideration of a device type, a CDN, or a delivery region, or any combination thereof.

Finally, some embodiments of the method 1600 may further include encoding the content based on the encoding ladder. That is, some embodiments may further comprise, for each stream of the encoding ladder, creating respective encoding content by encoding the source content using the codec and the bitrate of the respective stream, and storing the respective encoded content. As noted in the embodiments above, the encoding and storage of encoded content may be respectively performed by one or more encoders and a content origin server (which may then send the encoded content to CDN+access networks).

FIG. 17 is a block diagram of an embodiment of a computer system 1700, which may be used, in whole or in part, to perform one or more of the functions of the methods described herein, including the methods shown in FIGS. 6, 15, and 16. The computer system 1700 may be to implement one or more of the components of an ABR streaming system (e.g., ABR streaming system 100 of FIG. 1 and/or multi-codec ABR streaming system 1400 of FIG. 14), including an ABR profile generator and/or encoder. It should be noted that FIG. 17 is meant only to provide a generalized illustration of various components, any or all of which may be utilized as appropriate. FIG. 17, therefore, broadly illustrates how individual system elements may be implemented in a relatively separated or relatively more integrated manner. In addition, it can be noted that components illustrated by FIG. 17 can be localized to a single device and/or distributed among various networked devices, which may be disposed at different geographical locations. As noted, components of an ABR streaming system may be executed in the cloud. And thus, the computer system 1700 may be one of many computer systems (e.g., computer servers) configured to implement the various components of an ABR streaming system.

The computer system 1700 is shown comprising hardware elements that can be electrically coupled via a bus 1705 (or may otherwise be in communication, as appropriate). The hardware elements may include processing unit(s) 1710, which may comprise without limitation one or more general-purpose processors, one or more special-purpose processors (such as digital signal processing chips, graphics accelera-tion processors, and/or the like), and/or other processing structure, which can be configured to perform one or more of the methods described herein. The computer system 1700 also may comprise one or more input devices 1715, which may comprise without limitation a mouse, a keyboard, a camera, a microphone, and/or the like; and one or more output devices 1720, which may comprise without limitation a display device, a printer, and/or the like.

The computer system 1700 may further include (and/or be in communication with) one or more non-transitory storage devices 1725, which can comprise, without limitation, local and/or network accessible storage, and/or may comprise, without limitation, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like. Such data stores may include database(s) and/or other data structures used to store and administer messages and/or other information to be sent to one or more devices, as described herein.

The computer system 1700 might also include a communications subsystem 1730, which may comprise wireless communication technologies managed and controlled by a wireless communication interface, as well as wired technologies (such as Ethernet, coaxial communications, universal serial bus (USB), and the like). As such, the communications subsystem 1730 may comprise a modem, a network card (wireless or wired), an infrared communication device, a wireless communication device, and/or a chipset, and/or the like, which may enable the computer system 1700 to communicate on one or more communication networks with any device on the respective network, including other computer systems and/or any other electronic devices (including operations and/or applications executed thereon) described herein. Hence, the communications subsystem 1730 may be used to receive and send data as described in the embodiments herein.

In many embodiments, the computer system 1700 will further comprise a working memory 1735, which may comprise a RAM or ROM device, as described above. Software elements, shown as being located within the working memory 1735, may comprise an operating system 1740, device drivers, executable libraries, and/or other code, such as one or more applications 1745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1725 and/or working memory 1735 described above. In some cases, the storage medium might be incorporated within a computer system, such as computer system 1700. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1700 and/or might take the form of source and/or installable code, which, upon compilation and/or installation on the computer system 1700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that may comprise memory may comprise non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining," or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof

What is claimed is:

1. A method for creating a multi-codec encoding ladder for streaming a video, the method comprising:

obtaining, by a computer system, source content comprising the video;
generating an encoding ladder for the source content, wherein:
  each video stream of a plurality of video streams defined by the encoding ladder includes a respective bitrate and a respective codec of a plurality of codecs for encoding the source content; and
  the encoding ladder includes:
    a first video stream and a second video stream of a first codec, wherein the first video stream and the second video stream are encoded using the first codec having respective bitrates of $R_1^1$ and $R_1^2$ and respective quality values of $Q_1^1$ and $Q_1^2$; and
    a third video stream encoded using a second codec having a bitrate of $R_2^1$ and a quality value of $Q_2^1$;
  such that:

$$R_1^1 < R_2^1 < R_1^2 \text{ and}$$

$$Q_1^1 < Q_2^1 < Q_1^2; \text{ and}$$

streaming the video adaptively to switch among the first, second and third video streams to render the source content for a viewer.

2. The method of claim 1, further comprising, for each codec of the plurality of codecs, obtaining a quality rate function of the respective codec for the source content, indicative of a relationship between bitrates and quality values for the source content, wherein:
  generating the encoding ladder for the source content is based on the quality rate function of the respective codec;
  $Q_1^1$ and $Q_1^2$ are determined using the quality rate function of the first codec; and
  $Q_2^1$ is determined using the quality rate function of the second codec.

3. The method of claim 2, wherein the quality rate function for each codec of the plurality of codecs is determined from one or more probe encodings of the source content for each codec of the plurality of codecs.

4. The method of claim 2, the encoding ladder is further based on:
  a network bandwidth distribution; and
  a distribution of clients capable of streaming the source content once the source content is encoded using the encoding ladder, wherein the distribution of clients includes clients capable of switching between the first codec and the second codec.

5. The method of claim 4, wherein:
generating the encoding ladder comprises determining the plurality of video streams using an iterative process in which an initial number is selected, and the steps of
(1) determining a figure of merit function for the selected number, and
(2) increasing a value of the selected number for the next iteration, are repeated until the figure of merit function reaches a maximum.

6. The method of claim 5, wherein the figure of merit function is based on:
  the quality rate function for each codec of the plurality of codecs,
  the network bandwidth distribution, or
  the distribution of client types,
  or any combination thereof.

7. The method of claim 4, wherein the network bandwidth distribution comprises a probability density function determined based on bandwidth statistics collected regarding:
  a device type;
  a content delivery network (CDN); or
  a delivery region; or
  any combination thereof.

8. The method of claim 1, wherein the bitrate and a corresponding quality value of each video stream of the plurality of video streams are monotonically increasing within the encoding ladder.

9. The method of claim 1, wherein $Q_1^1$, $Q_1^2$, or $Q_2^1$, or any combination thereof, each comprise:
  a Structural Similarity Index Metric (SSIM) value,
  a Peak-Signal-to-Noise Ratio (PSNR) value,
  a Multi-Scale SSIM (MS-SSIM) value, or
  a Video Multimethod Assessment Fusion (VMAF) value.

10. The method of claim 1, further comprising, for each stream of the encoding ladder:
  creating respective encoded content by encoding the source content using the codec and the bitrate of the respective stream; and
  storing respective encoded content.

11. A computer system for creating a multi-codec encoding ladder for streaming a video, the computer system comprising:
  a memory; and
  one or more processing units communicatively coupled with the memory and configured to:
    obtain source content comprising the video;
    generate an encoding ladder for the source content, such that:
      each video stream of a plurality of video streams defined by the encoding ladder includes a respective bitrate and a respective codec of a plurality of codecs for encoding the source content; and
      the encoding ladder includes:
        a first video stream and a second video stream of a first codec, wherein the first video stream and the second video stream are encoded using the first codec having respective bitrates of $R_1^1$ and $R_1^2$ and respective quality values of $Q_1^1$ and $Q_1^2$; and
        a third video stream encoded using a second codec having a bitrate of $R_2^1$ and a quality value of $Q_2^1$;
      such that:

$$R_1^1 < R_2^1 < R_1^2 \text{ and}$$

$$Q_1^1 < Q_2^1 < Q_1^2; \text{ and}$$

stream the video adaptively to switch among the first, second and third video streams to render the source content for a viewer.

12. The computer system of claim 11, wherein the one or more processing units are further configured to:
  for each codec of the plurality of codecs, obtain a quality rate function of the respective codec for the source content, indicative of a relationship between bitrates and quality values for the source content;
  generate the encoding ladder for the source content based on the quality rate function of the respective codec;
  determine $Q_1^1$ and $Q_1^2$ using the quality rate function of the first codec; and
  determine $Q_2^1$ using the quality rate function of the second codec.

13. The computer system of claim 12, wherein the one or more processing units are further configured to determine the quality rate function for each codec of the plurality of codecs from one or more probe encodings of the source content for each codec of the plurality of codecs.

14. The computer system of claim 12, wherein the one or more processing units are further configured to generate the encoding ladder for the source content further based on:
 a network bandwidth distribution; and
 a distribution of clients capable of streaming the source content once the source content is encoded using the encoding ladder, wherein the distribution of clients includes clients capable of switching between the first codec and the second codec.

15. The computer system of claim 14, wherein:
 to generate the encoding ladder, the one or more processing units are configured to determine the plurality of video streams using an iterative process in which an initial number is selected, and the steps of
 (1) determining a figure of merit function for the selected number, and
 (2) increasing a value of the selected number for the next iteration,
 are repeated until the figure of merit function reaches a maximum.

16. The computer system of claim 15, wherein the one or more processing units are further configured to base the figure of merit function on:
 the quality rate function for each codec of the plurality of codecs,
 the network bandwidth distribution, or
 the distribution of client types,
 or any combination thereof.

17. The computer system of claim 14, wherein the one or more processing units are further configured to determine the network bandwidth distribution based on bandwidth statistics collected regarding:
 a device type;
 a content delivery network (CDN); or
 a delivery region; or
 any combination thereof.

18. The computer system of claim 11, wherein the one or more processing units are configured to generate the encoding ladder for the source content such that a bitrate and a corresponding quality value of each video stream of the plurality of video streams are monotonically increasing within the encoding ladder.

19. The computer system of claim 11, wherein the one or more processing units are configured to determine $Q_1^1$, $Q_1^2$, or $Q_2^1$, or any combination thereof, based on:
 a Structural Similarity Index Metric (SSIM) value,
 a Peak-Signal-to-Noise Ratio (PSNR) value,
 a Multi-Scale SSIM (MS-SSIM) value, or
 a Video Multimethod Assessment Fusion (VMAF) value.

20. A non-transitory computer-readable medium having instructions stored therewith for creating a multi-codec encoding ladder for streaming a video, wherein the instructions, when executed by one or more processing units, cause the one or more processing units to:
 obtain source content comprising the video;
 generate an encoding ladder for the source content, such that:
  each video stream of a plurality of video streams defined by the encoding ladder includes a respective bitrate and a respective codec of a plurality of codecs for encoding the source content; and
 the encoding ladder includes:
  a first video stream and a second video stream of a first codec, wherein the first video stream and the second video stream are encoded using the first codec having respective bitrates of $R_1^1$ and $R_1^2$ and respective quality values of $Q_1^1$ and $Q_1^2$; and
  a third video stream encoded using a second codec having a bitrate of $R_2^1$ and a quality value of $Q_2^1$;
  such that:
   $R_1^1 < R_2^1 < R_1^2$ and
   $Q_1^1 < Q_2^1$; and
 stream the video adaptively to switch among the first, second and third video streams to render the source content for a viewer.

21. The method of claim 1, wherein:
 generating the encoding ladder for the source content comprises merging ladder points of the first codec and the second codec with ladder points of a third codec, and
 the ladder points correspond to the plurality of video streams, and the encoding ladder is generated for a codec that switches between the first codec, the second codec and the third codec.

* * * * *